United States Patent
Yamamoto et al.

(10) Patent No.: US 8,687,514 B2
(45) Date of Patent: Apr. 1, 2014

(54) BASE STATION DEVICE AND INTERFERENCE SUPPRESSION METHOD

(75) Inventors: Takashi Yamamoto, Osaka (JP); Eiji Mochida, Osaka (JP); Yoshizo Tanaka, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 102 days.

(21) Appl. No.: 13/393,430

(22) PCT Filed: Oct. 4, 2010

(86) PCT No.: PCT/JP2010/067373
§ 371 (c)(1), (2), (4) Date: Feb. 29, 2012

(87) PCT Pub. No.: WO2011/043298
PCT Pub. Date: Apr. 14, 2011

(65) Prior Publication Data
US 2012/0155341 A1  Jun. 21, 2012

(30) Foreign Application Priority Data
Oct. 5, 2009  (JP) .................................. 2009-231766

(51) Int. Cl.
*H04B 7/10* (2006.01)
*H04W 16/28* (2009.01)
*H04W 4/00* (2009.01)

(52) U.S. Cl.
USPC ........................... 370/252; 370/329; 370/341

(58) Field of Classification Search
None
See application file for complete search history.

(56) References Cited

U.S. PATENT DOCUMENTS

| | | | |
|---|---|---|---|
| 2002/0093454 A1* | 7/2002 | Kim et al. | 342/378 |
| 2004/0095907 A1* | 5/2004 | Agee et al. | 370/334 |
| 2005/0206564 A1* | 9/2005 | Mao et al. | 342/377 |
| 2008/0181174 A1* | 7/2008 | Cho | 370/329 |
| 2009/0103486 A1* | 4/2009 | Hunukumbure et al. | 370/329 |
| 2009/0279486 A1* | 11/2009 | Kishigami et al. | 370/329 |
| 2011/0261762 A1* | 10/2011 | Kishigami et al. | 370/328 |
| 2012/0082104 A1* | 4/2012 | Lysejko et al. | 370/329 |

FOREIGN PATENT DOCUMENTS

| | | |
|---|---|---|
| JP | 10-303808 | 11/1998 |
| JP | 11-308037 | 11/1999 |
| JP | 2004-64113 | 2/2004 |
| JP | 2004-147079 | 5/2004 |

OTHER PUBLICATIONS

Nobuyoshi Kikuma, "Adaptive Signal Processing Using Array Antenna," Kagaku Gijyutsu Shuppan, Nov. 25, 1998, including the concise explanation of the relevance.

* cited by examiner

*Primary Examiner* — Chi Pham
*Assistant Examiner* — Soon-Dong D Hyun
(74) *Attorney, Agent, or Firm* — Drinker Biddle & Reath LLP

(57) ABSTRACT

Interference suppression by beam forming is achieved even in an FDD (Frequency Division Duplex) system. A base station device 1 performs communication based on FDD. The base station device 1 includes a downlink signal reception unit 12 that receives a downlink signal transmitted from another base station device. The base station device 1 performs a beam forming process for directing a null beam to an arrival direction of the downlink signal from the another base station device, by using transmission path information between the base station device and the another base station device, the information being available from the downlink signal received by the downlink signal reception unit 12.

35 Claims, 48 Drawing Sheets

BACKHAUL LINE

WIRELESS BROADCAST INFORMATION

POSITIONAL RELATIONSHIP THAT CAUSES INTERFERENCE

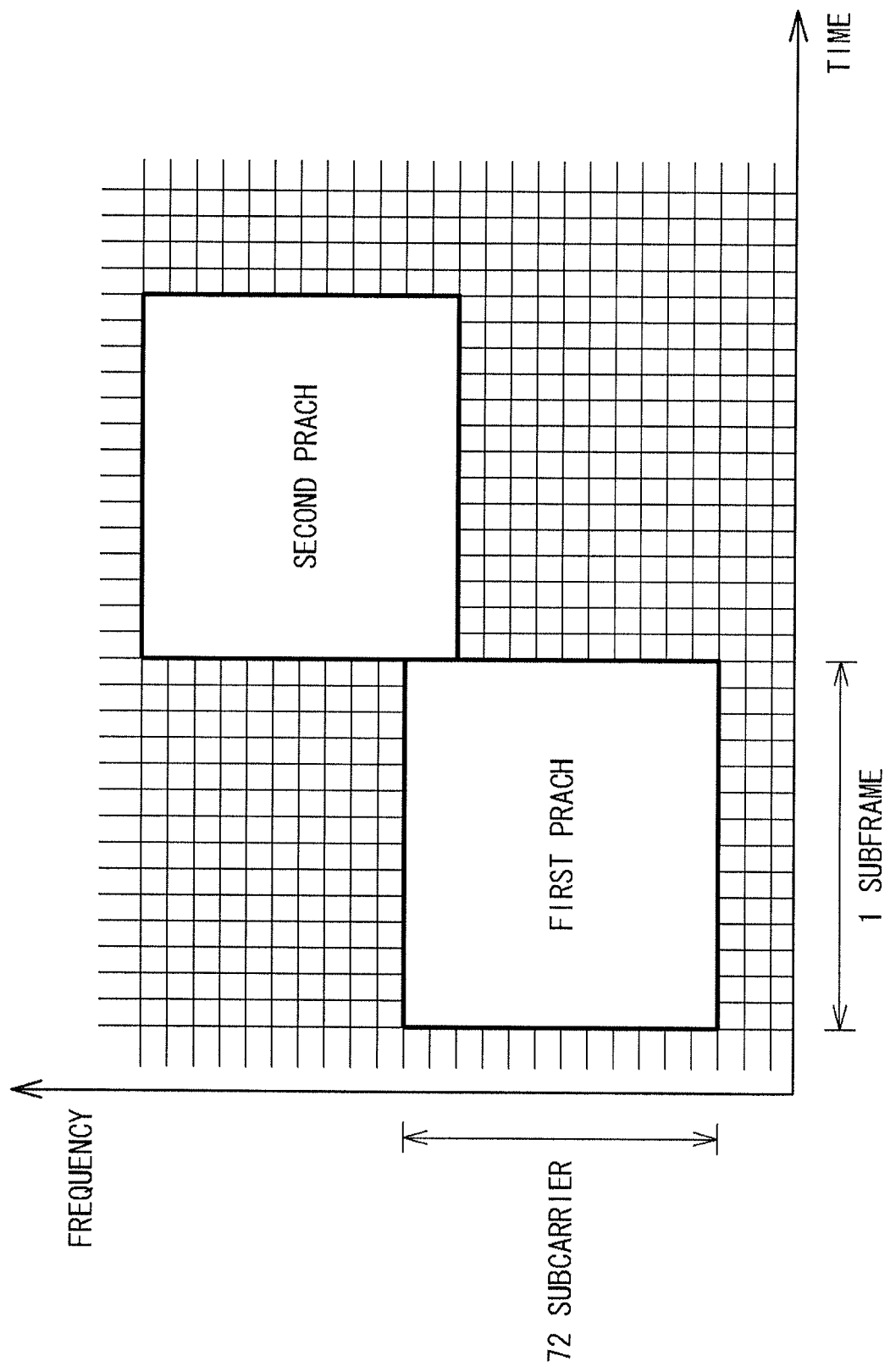

BASE STATION DEVICE AND INTERFERENCE SUPPRESSION METHOD

TECHNICAL FIELD

The present invention relates to a base station device, and a method for suppressing a signal from the base station device from interfering with a terminal device located in another cell.

BACKGROUND ART

In order to reduce as much as possible an area in which terminal devices cannot wirelessly communicate, a plurality of base station devices are often installed such that their radio coverage areas are overlapped each other. In this case, a signal transmitted from a certain base station device might arrive at a terminal device existing in a cell of another base station device near the certain base station device, and become an interference signal for the terminal device.

It is well known that such an interference can be suppressed by beam forming. That is, a base station device performs beam forming such that a beam is directed to a terminal device existing in its own cell (referred to as "desired terminal", hereinafter) while a null beam is directed to a terminal device existing in a cell of another base station device (referred to as "interference terminal" hereinafter). Thereby, a signal (interference signal) from the base station device is less likely to arrive at the interference terminal, and thus interference is suppressed (refer to Non-Patent Document 1 for beam forming).

CITATION LIST

Non Patent Literature

[NPL 1] "Adaptive Signal Processing Using Array Antenna", written by Nobuyoshi KIKUMA, published by Kagaku Gijyutsu Shuppan, Nov. 25, 1998

SUMMARY OF THE INVENTION

Problems to be Solved by the Invention

In order to direct a null beam to an interference terminal while directing a beam to a desired terminal, a base station device needs information of a transmission path (a transfer function of the transmission path) to the interference terminal as well as information of a transmission path (a transfer function of the transmission path) to the desired terminal.

Since the base station device essentially performs communication with the desired terminal, the base station device can easily obtain the transmission path information to the desired terminal. That is, the desired terminal estimates transmission path information of a downlink channel from the base station device to the desired terminal, based on a known signal such as a pilot signal included in a downlink signal received from the base station device, and includes the transmission path information in an uplink signal to be transmitted to the base station device.

Although the base station device does not essentially perform communication with the interference terminal, if the base station device can receive (intercept) a signal transmitted from the interference terminal, the base station device can estimate transmission path information to the interference terminal.

For example, in a TDD (Time Division Duplex) system, an uplink signal and a downlink signal use the same frequency. Therefore, a base station device can receive an uplink signal transmitted from an interference terminal, and obtain transmission path information of an uplink channel from the interference terminal to the base station device, based on a known signal such as a pilot signal included in the uplink signal.

In the TDD system, since the uplink signal and the downlink signal use the same frequency, transmission path information of an uplink channel can be estimated as transmission path information of a downlink channel from the base station device to the interference terminal, based on the symmetry between the uplink channel and the downlink channel.

In a FDD (Frequency Division Duplex) system, however, since an uplink signal and a downlink signal use different frequencies, there is no symmetry between an uplink channel and a downlink channel. Therefore, the same method as the TDD system cannot be used to obtain transmission path information from a base station device to an interference terminal. Consequently, in the FDD system, it has not been possible to suppress interference to the interference terminal by beam forming in which a null beam is directed to the interference terminal.

An object of the present invention is therefore to provide a new technique for suppressing interference to an interference terminal (a terminal device existing in a cell of another base station device) by beam forming in the FDD (Frequency Division Duplex) system.

Solution to the Problems (1) The present invention relates to a base station device that performs communication by frequency division duplex, including: a downlink signal reception unit that receives a downlink signal transmitted from another base station device; and a beam forming processing unit that performs a beam forming process for directing a null beam to an arrival direction of the downlink signal from the another base station device, by using transmission path information between the base station device and the another base station device, the information being available from the received downlink signal.

Since the base station device according to the present invention is provided with the downlink signal reception unit, which is not essentially required in the frequency division duplex system, the base station device can receive a downlink signal from another base station device. Accordingly, it is possible to obtain, from the downlink signal, transmission path information between the base station device and the another base station device in the frequency of the downlink signal. Accordingly, with respect to a downlink signal transmitted from the base station device, it is possible to direct a null beam to the arrival direction of the downlink signal from the another base station device.

Even when a null beam is not directly directed toward an interference terminal, it is possible to achieve a certain level of interference suppression effect by only directing a null beam to a base station device to which the interference terminal is wirelessly connected.

(2) The beam forming processing unit is able to obtain, from the another base station device, determination information for determining whether there is a terminal device wirelessly connected to the another base station device, and determine whether a null beam should be directed to the another base station device, based on the determination information. In this case, it is possible to avoid a situation that a null beam is directed to another base station device having no terminal device wirelessly connected thereto.

(3) The beam forming processing unit is able to obtain, from the another base station device, determination information that allows the beam forming processing unit to determine the degree of effect of suppressing interference to a terminal device wirelessly connected to the another base station device, which effect is obtained if a null beam is directed to the arrival direction of the downlink signal from the another base station device, and determine whether a null beam should be directed to the another base station device, based on the determination information. In this case, it is possible to determine a base station device to which a null beam should be directed, in accordance with the degree to which the interference suppression effect can be obtained.

(4) The beam forming processing unit is able to select another base station device to which a null beam should be actually directed, based on the determination information, when the number of other base station devices to which null beams should be directed exceeds the number of formable null beams. In this case, even when the number of other base station devices to which null beams should be directed exceeds the number of formable null beams, the number of other base station devices to which null beams should be directed can be limited within the range of the number of formable null beams.

(5) Preferably, the determination information is information indicating a distance between the another base station device and a terminal device wirelessly connected to the another base station device. The interference suppression effect of the present invention is increased with a reduction in the distance between the another base station device and the terminal device wirelessly connected to the another base station device. Therefore, the distance information is preferably used as the determination information.

(6) Preferably, the determination information is information indicating a signal reception condition in a terminal device wirelessly connected to the another base station device. If the signal reception condition in the terminal device wirelessly connected to the another base station device is poor, the terminal device is likely to be subjected to interference. Therefore, when a null beam is directed to this terminal device, the interference suppression effect of the present invention can be achieved. Accordingly, the information indicating the reception condition is preferably used as the determination information.

(7) Preferably, the determination information is information indicating a signal reception condition in a terminal device wirelessly connected to the another base station device, and the signal reception condition includes a first reception condition when a null beam is directed to the another base station device, and a second reception condition when no null beam is directed to the another base station device. The degree to which the interference suppression effect is achieved by directing a null beam can be grasped by comparing the reception condition when the null beam is directed with that when no null beam is directed. Therefore, both the reception conditions are preferably used as the determination information.

(8) Preferably, the determination information is information indicating a distance between the base station device and the another base station device, or information indicating the degree of signal attenuation in a transmission path between the base station device and the another base station device, or information indicating a reception signal power when the base station device receives the downlink signal from the another base station device and/or a transmission signal power of the downlink signal from the another base station device. Each of these pieces of information is information relating to an index that influences the magnitude of the downlink signal (interference signal) from the base station device, and interference suppression by directing a null beam is likely to be required when the interference signal is great. Therefore, these pieces of information are preferably used as the determination information.

(9) Preferably, the beam forming processing unit obtains, from the another base station device, radio resource allocation information indicating a time and/or a frequency allocated to a terminal device by the another base station device, and performs a beam forming process such that a null beam is directed toward the another base station device in the time and/or at the frequency indicated by the radio resource allocation information. Since a null beam is intended to suppress interference to the terminal device, if a null beam is formed in the time and/or the frequency allocated to the terminal device, formation of useless null beams can be avoided.

(10) Preferably, the base station device includes an obtainment unit for obtaining information from the another base station device via a backhaul line connecting the base station device and the another base station device. In this case, the determination information, the radio resource allocation information, and the like can be easily obtained from the another base station device.

(11) Preferably, the base station device includes an obtainment unit for obtaining information included in wireless broadcast information transmitted by the another base station device. In this case, the determination information, the radio resource allocation information, and the like can be easily obtained from the another base station device.

(12) The beam forming processing unit is able to determine the number of formable null beams within the range of the total number of antennas of the base station device, and form beams to terminal devices wirelessly connected to the base station device, within a restriction on the beam forming by null-beam forming. In this case, the null-beam forming is preferentially performed, and the interference suppression effect is enhanced.

(13) The beam forming processing unit is able to determine the number of terminal devices wirelessly connected to the base station device within the range of the total number of antennas of the base station device, and form null beams within a restriction on the null-beam forming by beam forming to the terminal devices. In this case, interference suppression can be performed while communication with the terminal devices wirelessly connected to the base station device is preferentially performed.

(14) Preferably, the base station device includes an inter-base-station synchronization processing unit for achieving inter-base-station synchronization with the another base station device. In this case, since the base station device can receive a downlink signal from another base station device synchronized with the base station device, reception, demodulation and the like are facilitated.

(15) Preferably, the inter-base-station synchronization processing unit detects a synchronization error between the base station device and the another base station device, based on the downlink signal from the another base station device which is received by the downlink signal reception unit, and corrects the synchronization error. In this case, since inter-base-station synchronization is achieved without using a GPS signal or the like, a GPS receiver is not needed, resulting in a reduction in the size of the base station device.

(16) Preferably, the downlink signal reception unit receives the downlink signal from the another base station device, at a timing when transmission of a downlink signal from the base station device is suspended. In this case, the downlink signal from the base station device is prevented from being received by the downlink signal reception unit of the base station device.

(17) Preferably, the base station device is configured as a small base station device having a transmission signal power of 2 W or lower.

(18) Preferably, the base station device is configured as a femto base station device having a transmission signal power within a range of 20 to 200 mW.

(19) Preferably, the beam forming processing unit performs determination of interference suppression effect, based on information that directly or indirectly indicates the interference suppression effect to a terminal device wirelessly connected to the another base station device when a null beam is directed to the arrival direction of the downlink signal from the another base station device (the information that indirectly indicates the interference suppression effect includes: information that influences the degree or presence/absence of the interference suppression effect; information indicating whether interference can occur; and the like), and then determines whether a null beam should be directed to the another base station device, based on the result of the determination.

(20) Preferably, the beam forming processing unit performs determination of interference suppression effect, based on information that directly or indirectly indicates the interference suppression effect to a terminal device wirelessly connected to the another base station device when a null beam is directed to the arrival direction of the downlink signal from the another base station device, and adjusts the intensity of a null beam to be directed to the another base station device, based on the result of the determination.

(21) Preferably, the information that indirectly indicates the interference suppression effect is information indicating a positional relationship between the base station device and the another base station device, or information whose value is influenced by the positional relationship between the base station device and the another base station device.

(22) Preferably, the information that indirectly indicates the interference suppression effect is any of: information indicating the number of times of handover that occur between the base station device and the another base station device; information whose value is influenced by the number of times of handover; information indicating the magnitude of the reception level of the downlink signal transmitted by the another base station device; information indicating an attenuation value in a transmission path from the another base station device to the base station device; and information indicating a result of detection when the downlink signal from the another base station device is detected.

(23) Preferably, the information that indirectly indicates the interference suppression effect is information indicating a positional relationship between the base station device and the another base station device, or information whose value is influenced by the positional relationship between the base station device and the another base station device, and the beam forming processing unit performs the determination based on the information indicating the positional relationship between the base station device and the another base station device or the information whose value is influenced by the positional relationship between the base station device and the another base station device, and excludes the another base station device from base station devices to which null beams should be directed, when the base station device is so close to the another base station device that the interference suppression effect to the terminal device wirelessly connected to the another base station device cannot be achieved even when a null beam is directed to the arrival direction of the downlink signal from the another base station device.

(24) Preferably, the information that indirectly indicates the interference suppression effect is information indicating a positional relationship between the base station device and the another base station device, or information whose value is influenced by the positional relationship between the base station device and the another base station device, and the beam forming processing unit performs the determination based on the information indicating the positional relationship between the base station device and the another base station device or the information whose value is influenced by the positional relationship between the base station device and the another base station device, and reduces the depth of a null beam to be directed to the another base station device as the base station device and the another base station device are closer to each other in the positional relationship.

(25) Preferably, the information that indirectly indicates the interference suppression effect is information indicating a positional relationship between the base station device and the another base station device, or information whose value is influenced by the positional relationship between the base station device and the another base station device, and the beam forming processing unit performs the determination based on the information indicating the positional relationship between the base station device and the another base station device or the information whose value is influenced by the positional relationship between the base station device and the another base station device, and excludes the another base station device from base station devices to which null beams should be directed, when the base station device and the another base station device are separated from each other to an extent that no interference occurs.

(26) Preferably, the information that indirectly indicates the interference suppression effect is information indicating a positional relationship between the base station device and the another base station device, or information whose value is influenced by the positional relationship between the base station device and the another base station device, and the beam forming processing unit performs the determination based on the information indicating the positional relationship between the base station device and the another base station device or the information whose value is influenced by the positional relationship between the base station device and the another base station device, and increases the depth of a null beam to be directed to the another base station device as the base station device and the another base station device are closer to each other in the positional relationship.

(27) Preferably, the information that indirectly indicates the interference suppression effect is information indicating a positional relationship between the base station device and the another base station device, or information whose value is influenced by the positional relationship between the base station device and the another base station device, and the beam forming processing unit performs the determination based on the information indicating the positional relationship between the base station device and the another base station device or the information whose value is influenced by the positional relationship between the base station device and the another base station device, thereby determining whether the base station device and the another base station device are in a first positional relationship or in a second positional relationship. In the first positional relationship, the base station device is close to the another base station device to an extent that interference suppression is necessary, and the base station device is separated from the another base station device to an extent that the interference suppression effect to the terminal device wirelessly connected to the another base station device can be obtained by directing a null beam to the arrival direction of the downlink signal from the another base station device. In the second positional relationship, the base station device is close to the another base station device to an extent that interference suppression is necessary, and the base station device is so close to the another base station device that the interference suppression effect to the terminal device wirelessly connected to the another base station device cannot be obtained even when a null beam is directed to the arrival direction of the downlink signal from the another base station device.

(28) Preferably, the base station device is a small base station device having a transmission signal power smaller than that of a macro base station device, and the information that indirectly indicates the interference suppression effect is information indicating a positional relationship between the base station device and the another base station device, or information whose value is influenced by the positional relationship between the base station device and the another base station device. Preferably, the beam forming processing unit determines whether the another base station device is a macro base station device or a small base station device, and performs determination of interference suppression effect, based on the information indicating the positional relationship between the base station device and the another base station device, or the information whose value is influenced by the positional relationship between the base station device and the another base station device, and then performs the beam forming process based on the results of the both determinations.

(29) Preferably, the information that indirectly indicates the interference suppression effect is information indicating whether interference can occur.

(30) Preferably, the information indicating whether interference can occur is information relating to the another base station device, and is information which allows determination as to whether interference can occur.

(31) Preferably, the information indicating whether interference can occur is information indicating a communication frequency of the another base station device, or information indicating a power ON/OFF state of the another base station device, or information indicating the type of a radio access technology of the another base station device.

(32) Preferably, the information that indirectly indicates the interference suppression effect is information indicating whether or not interference suppression means other than directing a null beam to the arrival direction of the downlink signal from the another base station device is executed or can be executed.

(33) Preferably, the information indicating whether or not interference suppression means other than directing a null beam to an arrival direction of a downlink signal from the another base station device is executed or can be executed, is information indicating whether synchronization of communication timing and/or communication frequency is achieved between the base station device and the another base station device, or information indicating whether an inter-base-station network is provided between the base station device and the another base station device.

(34) Preferably, interference suppression by the other interference suppression means is performed by using different radio resources between the base station device and the another base station device.

(35) Preferably, the information that indirectly indicates the interference suppression effect is information indicating an access mode of the terminal device to the base station device.

(36) Preferably, the information that indirectly indicates the interference suppression effect is information indicating the number of terminal devices wirelessly connected to the another base station device, or information whose value is influenced by the number of terminal devices wirelessly connected to the another base station device.

(37) Preferably, the information that indirectly indicates the interference suppression effect is information indicating presence of a terminal device that is located near the base station device among terminal devices wirelessly connected to the another base station device.

(38) Another aspect of the present invention relates to a base station device that performs communication by frequency division duplex, and the base station device includes: a downlink signal reception unit that receives a downlink signal transmitted from another base station device; and a beam forming processing unit that performs a beam forming process in which a beam to an arrival direction of the downlink signal from the another base station device is suppressed, by using transmission path information between the base station device and the another base station device, the information being obtained from the downlink signal.

(39) The beam forming process in which a beam in a desired direction is suppressed is realized by performing a first weight calculation for forming a null beam having a gain of zero in the desired direction, and then performing a second weight calculation so as to reduce the depth of the null beam in the desired direction, based on the result of the first weight calculation.

(40) Another aspect of the present invention relates to an interference suppression method of suppressing a downlink signal transmitted from a base station device that performs communication by frequency division duplex from interfering with a terminal device wirelessly connected to another base station device, and the method includes: receiving, by the base station device, the downlink signal transmitted from the another base station device; and suppressing interference to the terminal device wirelessly connected to the another base station device, by directing a null beam to an arrival direction of the downlink signal from the another base station device by using transmission path information between the base station device and the another base station device, the information being obtained from the received downlink signal.

(41) Another aspect of the present invention relates to an interference suppression method of suppressing a downlink signal transmitted from a base station device that performs communication by frequency division duplex from interfering with a terminal device wirelessly connected to another base station device, and the method includes: receiving, by the base station device, the downlink signal transmitted from the another base station device; and performing beam forming in which a beam to an arrival direction of the downlink signal from the another base station device is suppressed, by using transmission path information between the base station device and the another base station device, the information being obtained from the received downlink signal.

Advantageous Effects of the Invention

According to the present invention, it is possible to suppress interference by beam forming even in the frequency division duplex system.

BRIEF DESCRIPTION OF THE DRAWINGS

FIG. 48 is a diagram showing a manner of allocating a first PRACH and a second PRACH.

DESCRIPTION OF EMBODIMENTS

Preferred embodiments of the present invention will be described below with reference to the accompanying drawings.

1. Configuration of a Communication System

Figure 1:
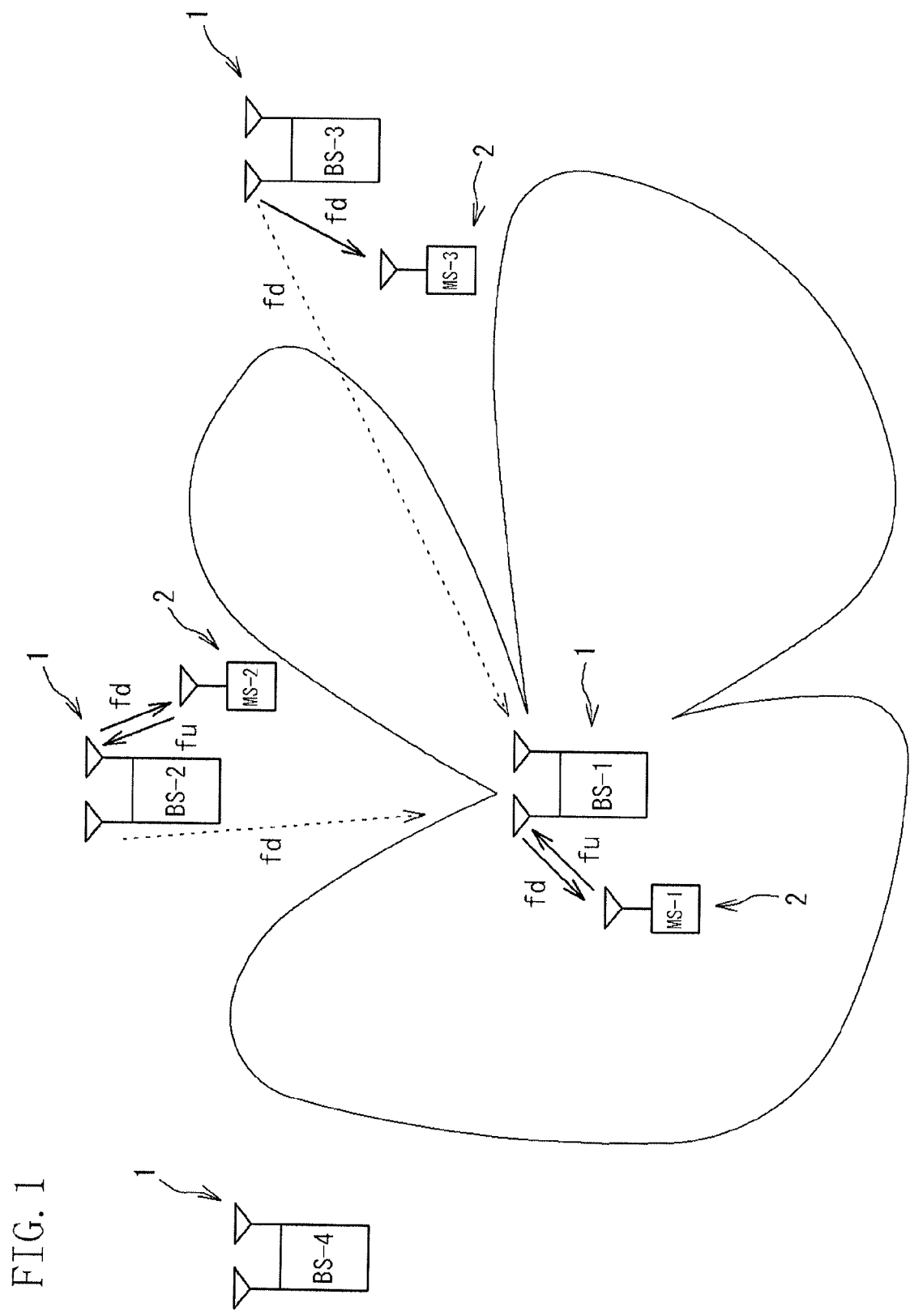
FIG. 1 is a diagram showing a beam configuration by a base station device (BS-1) according to an embodiment.

FIG. 1 shows a wireless communication system including a plurality of base station devices (BSs; Base Stations) 1. Each base station device is allowed to perform wireless communication with a terminal device (mobile terminal; MS; Mobile Station) existing in a cell of the base station device.

This communication system is, for example, a mobile phone system to which LTE (Long Term Evolution) is applied. In LTE, frequency division duplex (FDD) can be adopted. Hereinafter, the communication system is described assuming that frequency division duplex is adopted. Note that the communication system is not limited to LTE, and any communication system may be adopted as long as it can adopt FDD.

2. Frame Structure for LTE

In FDD that can be adopted in LTE with which the communication system of the present embodiment complies, uplink communication and downlink communication are simultaneously performed by making the frequency $f_u$ of an uplink signal (a transmission signal from a terminal device to a base station device) different from the frequency $f_d$ of a downlink signal (a transmission signal from the base station device to the terminal device).

Figure 2:
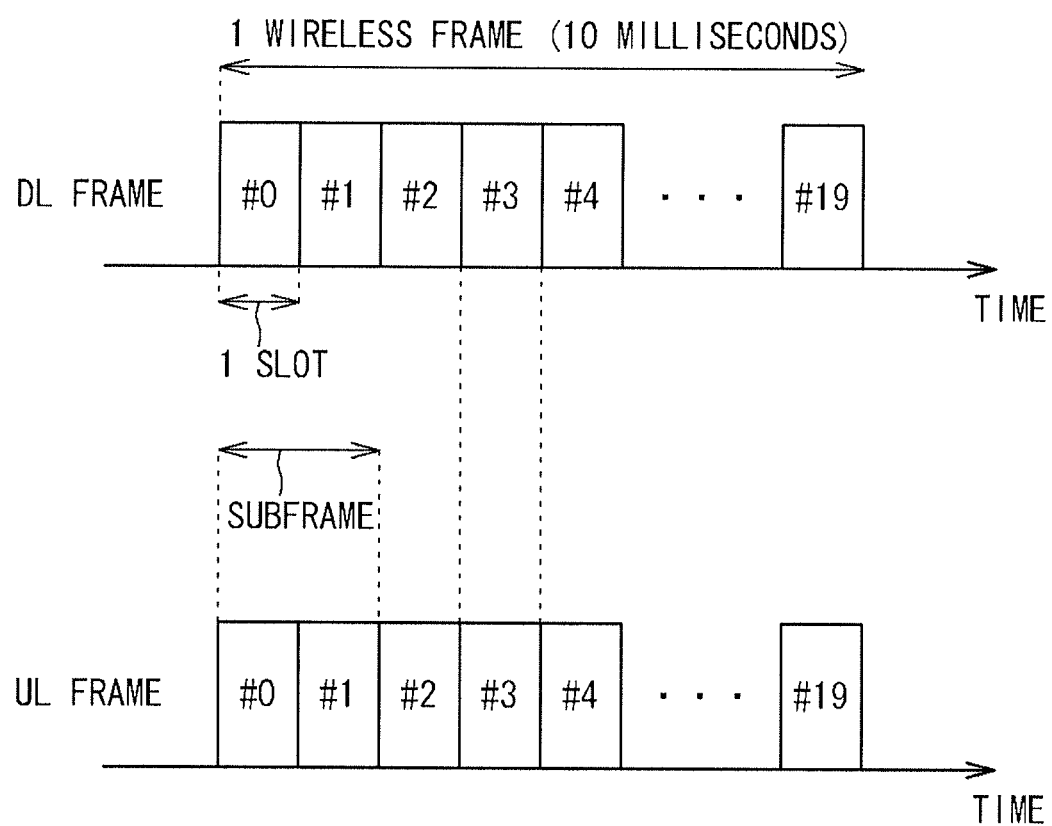
FIG. 2 is a diagram showing a frame configuration based on LTE.

FIG. 2 shows uplink and downlink frame structures for LTE. Each of a downlink frame (DL frame) and an uplink frame (UL frame) for LTE has a time length of 10 milliseconds, and consists of twenty slots, #0 to #19. In LTE, a combination of two slots is referred to as a subframe. Note that the timings of the downlink and uplink frames coincide with each other.

Figure 3:
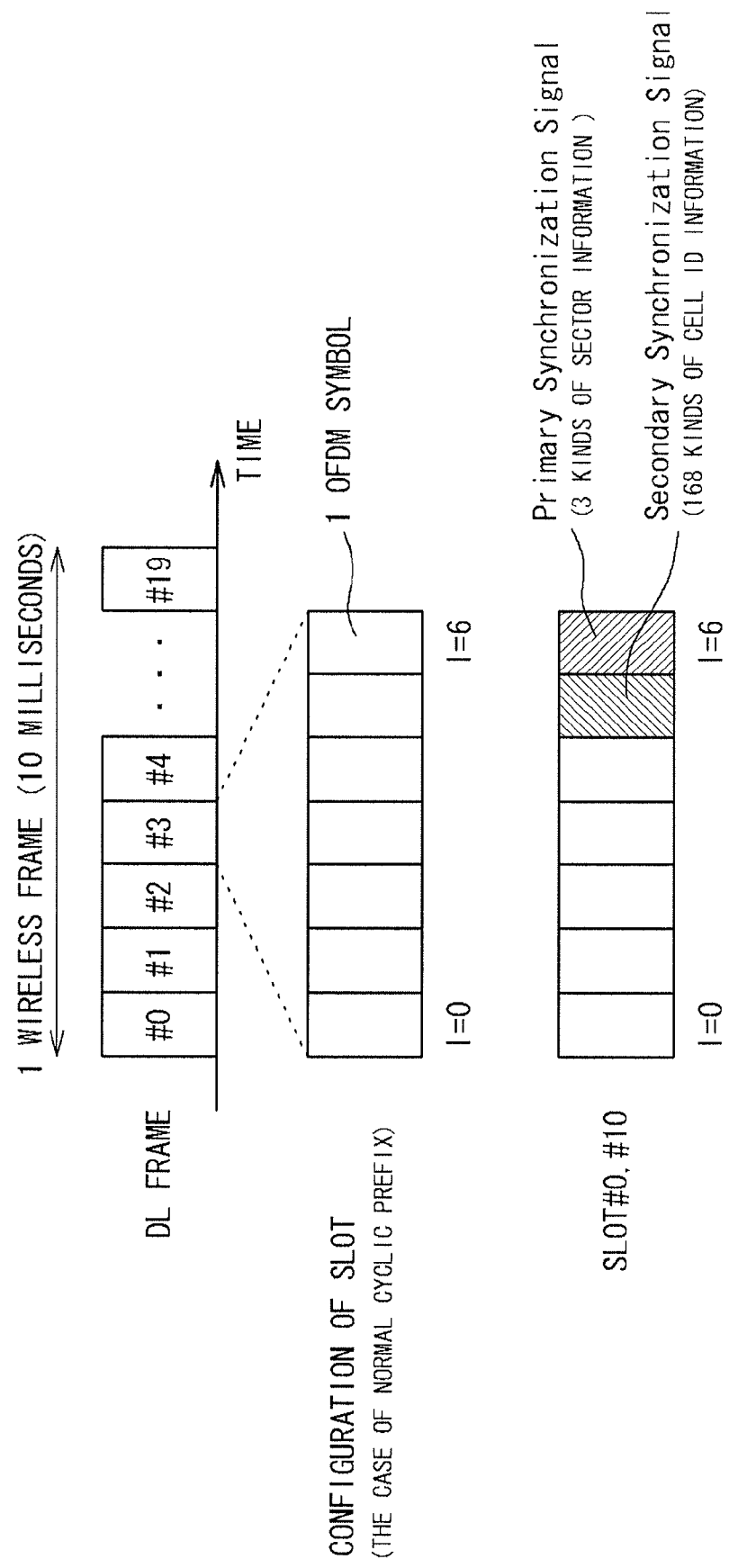
FIG. 3 is a diagram showing a DL frame configuration based on LET.

As shown in FIG. 3, each of slots that form a downlink frame (DL frame) consists of seven (I=0 to 6) OFDM symbols (in the case of Normal Cyclic Prefix).

Of the twenty slots #0 to #19 forming the downlink frame, the 0th (#0) and 10th (#10) slots are each provided with a Primary Synchronization Signal and a Secondary Synchronization Signal, as identification codes for a base station device.

The Primary Synchronization Signal is arranged in the last symbol (I=6) among the seven OFDM symbols forming a slot. This signal is information originally provided for a terminal device to identify each of a plurality of (three) sectors into which the cell of a base station device is divided, and has 3 patterns.

The Secondary Synchronization Signal is arranged in the second last (I=5) symbol among the seven OFDM symbols forming a slot. This signal is information originally provided for a terminal device to identify each of communication areas (cells) of a plurality of base station devices, and has 168 patterns.

By the two signals, the Primary Synchronization Signal and the Secondary Synchronization Signal, 504 (168×3) types of identification codes are formed. Upon receiving these signals transmitted from a base station device, a terminal device can recognize in which sector of which base station device the terminal device is present.

A plurality of patterns the above-mentioned signals can take are defined in advance in communication standards and are known by each base station device and each terminal device. That is, each of the signals is a known signal that can take a plurality of patterns. In the following, the Primary Synchronization Signal is referred to as a first known signal and the Secondary Synchronization Signal is referred to as a second known signal.

In the present embodiment, the first known signal and the second known signal are used not only for the case in which a terminal device achieves synchronization with a base station device but also for inter-base-station synchronization in which synchronization of communication timing and/or frequency is achieved among base station devices, which will be described later.

Figure 4:
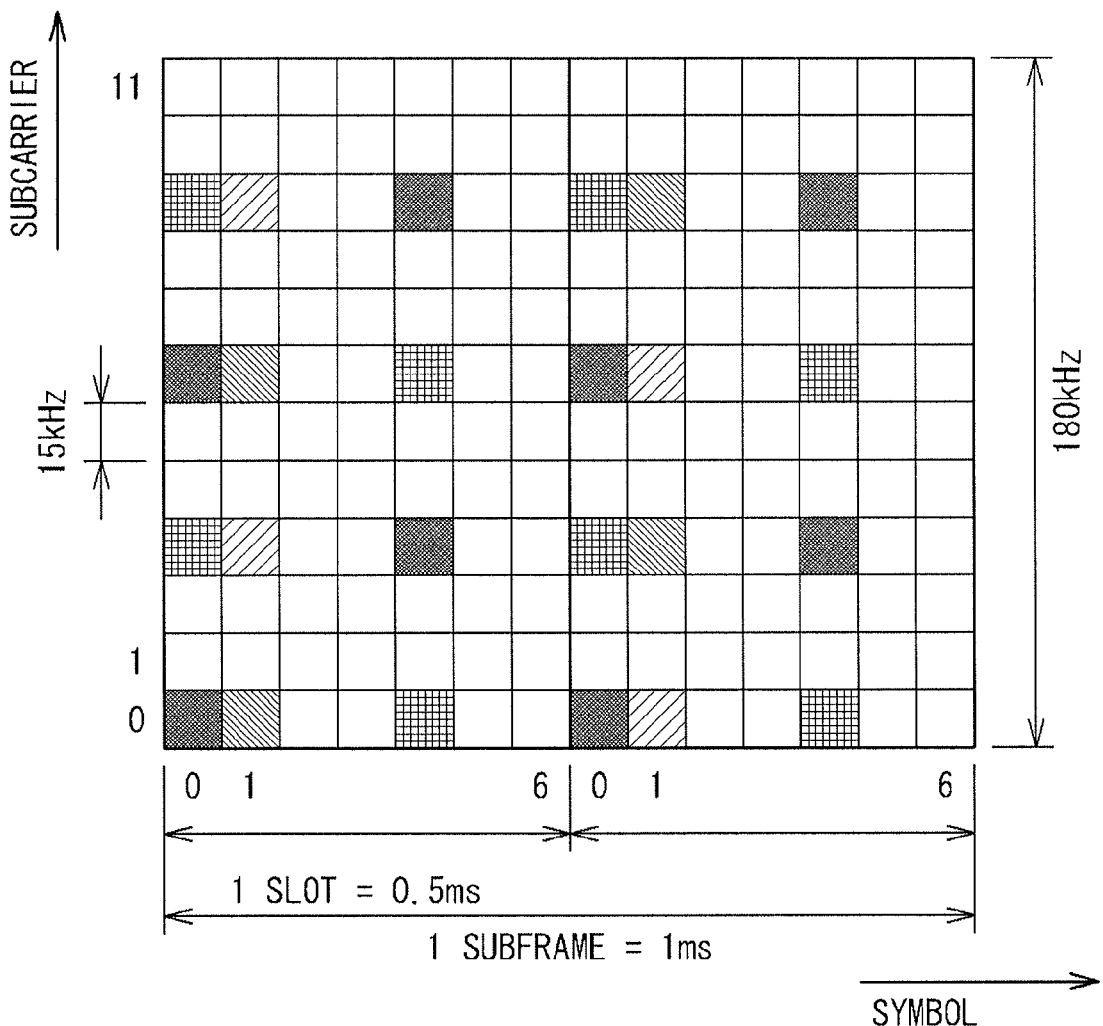
FIG. 4 is a diagram showing a resource block configuration based on LTE.

FIG. 4 shows, in detail, a resource block consisting of one slot. The resource block is a unit of user (terminal device) allocation. FIG. 3 shows two resource blocks corresponding to one subframe. Each resource block has seven OFDM symbols in the symbol direction (time direction), and twelve subcarriers in the subcarrier direction (frequency direction), and therefore, has eighty-four (=7×12) resource elements in total. In each resource block, reference signals (known signals) are arranged for a plurality of antennas (four antennas #1 to #3 in this embodiment). These reference signals allow the base station device 1 to obtain transmission path information (transfer function of a transmission path) for each of the plurality of antennas.

3. Configuration of a Base Station Device (First Embodiment)

Figure 5:
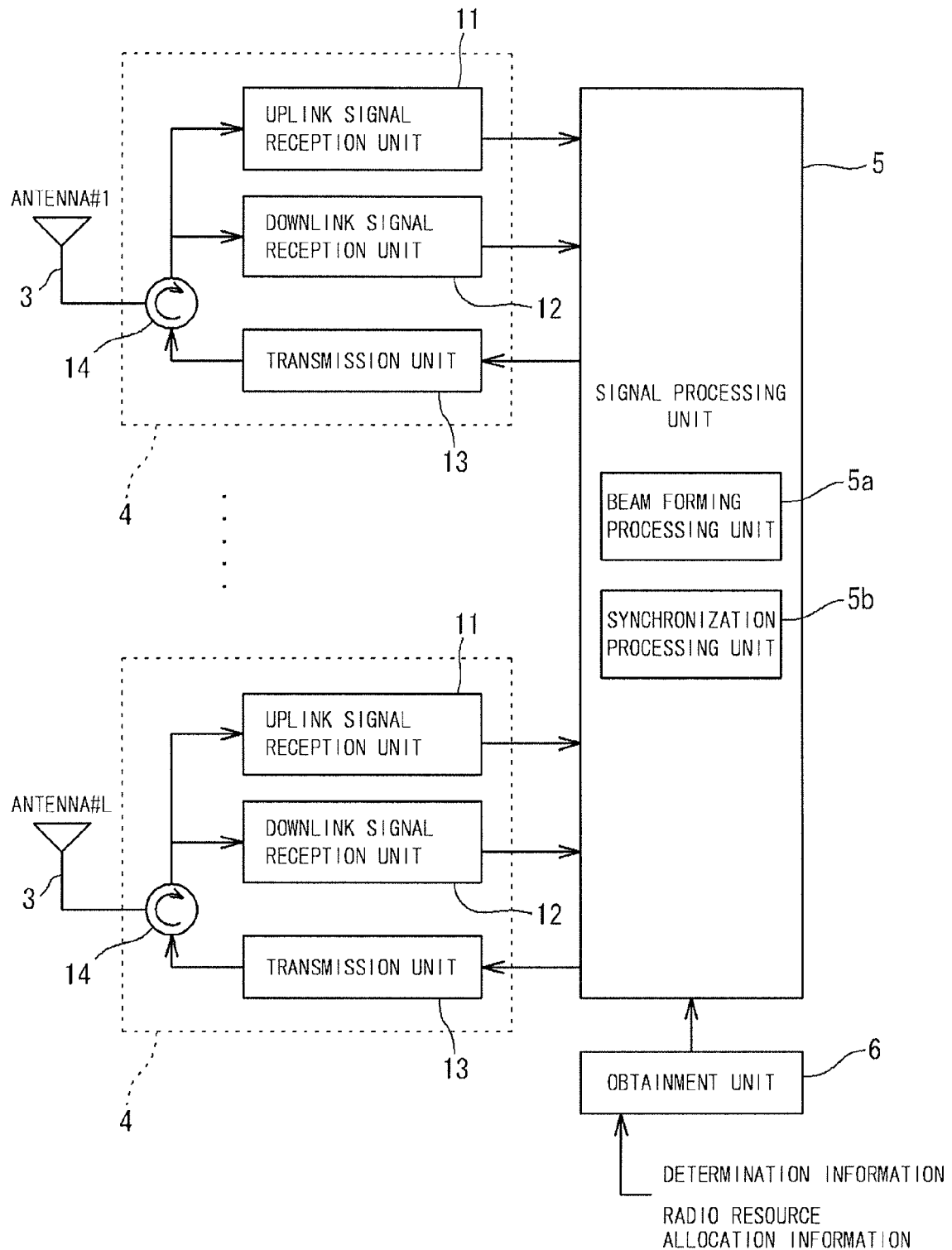
FIG. 5 is a diagram showing a circuit configuration of a base station device.

FIG. 5 shows a configuration of a base station device (BS-1) 1 according to the first embodiment. The base station device 1 is configured as a multi-antenna system (array-antenna system) having a plurality of antennas 3.

That is, the base station device 1 includes: a plurality of antennas 3; transmission/reception units (RF units) 4 corresponding to the respective antennas 3; and a signal processing unit 5 that outputs signals to and receives signals from the transmission/reception units 4, thereby performing various kinds of signal processing.

The signal processing unit 5 has, as one of its functions, a function as a beam forming processing unit. The signal processing unit 5 includes a beam forming processing unit 5a and a synchronization processing unit 5b. The beam forming processing unit 5a performs a beam forming process so as to direct a null beam to a desired direction. The synchronization processing unit 5b performs a synchronization process for achieving synchronization of communication timing or communication frequency among a plurality of base station devices 1.

[3.1 Transmission/Reception Unit]

Figure 6:
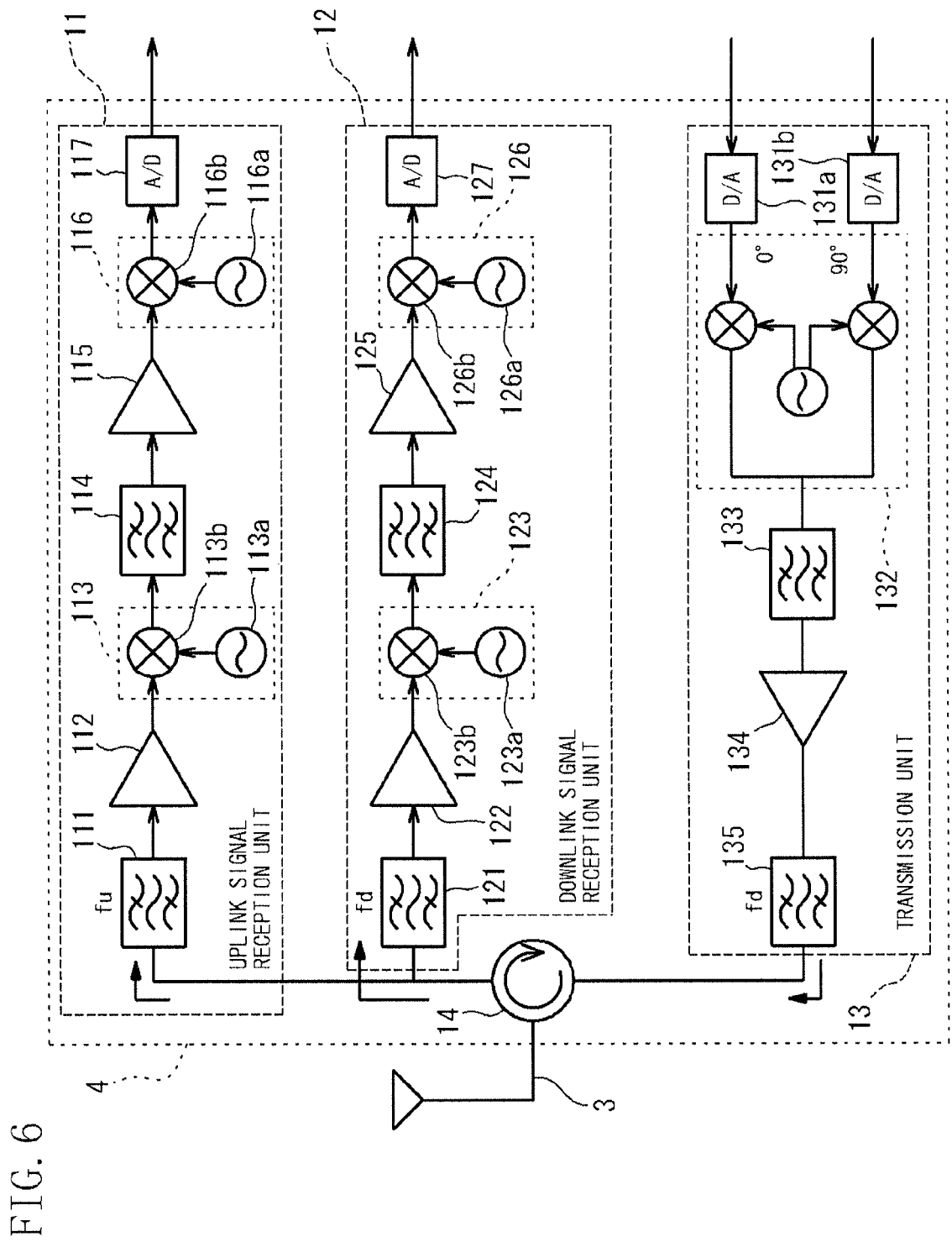
FIG. 6 is a circuit diagram showing a transmission/reception unit.

FIG. 6 shows an example of a specific configuration of the transmission/reception unit 4. Although FIG. 6 shows the configuration of one transmission/reception unit 4, the plurality of transmission/reception units 4 have the same configuration shown in FIG. 6.

The transmission/reception unit 4 includes an uplink signal reception unit 11, a downlink signal reception unit 12, and a transmission unit 13. The uplink signal reception unit 11 receives an uplink signal from a terminal device 2, and the downlink signal reception unit 12 receives a downlink signal from another base station device 1. The transmission unit 13 transmits a downlink signal to the terminal device 2.

The transmission/reception unit 4 further includes a circulator 14. The circulator 14 provides a reception signal from the antenna 3 to the uplink signal reception unit 11 and to the downlink signal reception unit 12, and provides a transmission signal outputted from the transmission unit 13 to the antenna 3. The circulator 14 and a fourth filter 135 in the transmission unit 13 prevent the reception signal from the antenna 3 from being transmitted to the transmission unit 13.

Further, the circulator 14 and a first filter 111 in the uplink signal reception unit prevent the transmission signal outputted from the transmission unit 13 from being transmitted to the uplink signal reception unit 11. Furthermore, the circulator 14 and a fifth filter 121 prevent the transmission signal outputted from the transmission unit 13 from being transmitted to the uplink signal reception unit 12.

The uplink signal reception unit 11 is configured as a superheterodyne receiver so as to perform IF (Intermediate Frequency) sampling. More specifically, the uplink signal reception unit 11 includes a first filter 111, a first amplifier 112, a first frequency converter 113, a second filter 114, a second amplifier 115, a second frequency converter 116, and an A/D converter 117.

The first filter 111 allows only the uplink signal from the terminal device 2 to pass therethrough, and is implemented by a band-pass filter that allows only the frequency $f_u$ of the uplink signal to pass therethrough. The reception signal having passed through the first filter 111 is amplified by the first amplifier (high-frequency amplifier) 112, and then subjected to frequency conversion from the frequency $f_u$ to a first intermediate frequency by the first frequency converter 113. Note that the first frequency converter 113 includes an oscillator 113a and a mixer 113b.

The output from the first frequency converter 113 passes through a second filter 114 that allows only the first intermediate frequency to pass therethrough, and is again amplified by the second amplifier (intermediate frequency amplifier) 115. The output from the second amplifier 115 is subjected to frequency conversion from the first intermediate frequency to a second intermediate frequency by the second frequency converter 116, and is converted to a digital signal by the A/D converter 117. Note that the second frequency converter 116 also includes an oscillator 116a and a mixer 116b.

The output from the A/D converter 117 (the output from the first reception unit 11) is provided to the signal processing unit 5 that also functions as a demodulation circuit, and a demodulation process for the reception signal from the terminal device is performed.

Thus, the uplink signal reception unit 11 is a reception unit configured to comply with the uplink signal frequency $f_u$ so as to receive the uplink signal from the terminal device, and is a reception unit that the base station device essentially requires.

The transmission unit 13 receives modulated signals I and Q outputted from the signal processing unit 5 that also functions as a modulation circuit, and causes the antenna 3 to transmit the signals. Thus, the transmission unit 13 is configured as a direct conversion transmitter. The transmission unit 13 includes D/A converters 131a and 131b, an orthogonal modulator 132, a third filter 133, a third amplifier (high power amplifier; HPA) 134, and a fourth filter 135.

The D/A converters 131a and 131b perform D/A conversion on the modulated signals I and Q, respectively. The outputs from the D/A converters 131a and 131b are provided to the orthogonal modulator 132, and the orthogonal modulator 132 generates a transmission signal having a carrier wave frequency $f_d$ (downlink signal frequency).

The output from the orthogonal modulator 132 passes through the third filter 133 that allows only the frequency $f_d$ to pass therethrough, and is amplified by the third amplifier 134. The output from the third amplifier 134 passes through the fourth filter 135 that allows only the frequency $f_d$ to pass therethrough, and is transmitted from the antenna 3 as a downlink signal to the terminal device.

As described above, while the uplink signal reception unit 11 and the transmission unit 13 are functions necessary for performing essential communication with the terminal device, the base station device 1 of the present embodiment further includes the downlink signal reception unit 12. The downlink signal reception unit 12 receives a downlink signal transmitted by another base station device.

In the present embodiment, a downlink signal from another base station device, which has been received by the downlink signal reception unit 12, is used for an inter-base-station synchronization process and for a process to obtain information of a transmission path between the base station device and the another base station device.

The frequency of the downlink signal transmitted by the another base station device is $f_d$ which is different from the frequency $f_u$ of the uplink signal. Therefore, a common base station device having only the uplink signal processing unit 11 cannot receive the downlink signal transmitted by the another base station device.

That is, in contrast to TDD, in FDD, an uplink signal and a downlink signal simultaneously exist on a transmission path. Therefore, the uplink signal reception unit 11 is configured so that only a signal of the uplink signal frequency $f_u$ is allowed to pass therethrough while a signal of the downlink signal frequency $f_d$ is not allowed to pass therethrough. Specifically, the uplink signal reception unit 11 includes the first filter 111 that allows only a signal of the uplink signal frequency $f_u$ to pass therethrough, and the second filter 114 that allows only the first intermediate frequency into which the frequency $f_u$ is converted to pass therethrough. Therefore, if a signal of a frequency (the downlink signal frequency $f_d$) other than the frequency $f_u$ is provided to the first reception unit 11, the signal is not allowed to pass through the uplink signal reception unit 11.

That is, the uplink signal reception unit 11, including the filters 111 and 114, complies with reception of a signal of the uplink signal frequency $f_u$, and therefore, cannot receive signals of other frequencies (particularly, the downlink signal).

Accordingly, the transmission/reception unit 4 of the present embodiment includes, separately from the uplink signal reception unit 11, the downlink signal reception unit 12 for receiving a downlink signal of the frequency $f_d$ transmitted by another base station device.

The downlink signal reception unit 12 includes a fifth filter 121, a fourth amplifier (high-frequency amplifier) 122, a third frequency converter 123, a sixth filter 124, a fifth amplifier (intermediate frequency amplifier) 125, a fourth frequency converter 126, and an A/D converter 127.

The fifth filter 121 allows only a downlink signal from another base station device to pass therethrough, and is implemented by a band-pass filter that allows only the frequency $f_d$ of the downlink signal to pass therethrough. A reception signal having passed through the fifth filter 121 is amplified by the fourth amplifier (high-frequency amplifier) 122. The output from the fourth amplifier 122 is subjected to frequency conversion from the downlink signal frequency $f_d$ to the first intermediate frequency by the third frequency converter 123. Note that the third frequency converter 123 includes an oscillator 123a and a mixer 123b.

The output from the third frequency converter 123 passes through the sixth filter 124 that allows only the first intermediate frequency outputted from the third frequency converter 123 to pass therethrough, and is again amplified by the fifth amplifier (intermediate frequency amplifier) 125. The output from the fifth amplifier 125 is subjected to frequency conversion from the first intermediate frequency to the second intermediate frequency by the fourth frequency converter 126, and is further converted into a digital signal by the A/D converter 127. Note that the fourth frequency converter 126 also includes an oscillator 126a and a mixer 126b.

The signal outputted from the A/D converter 127 is provided to the beam forming processing unit 5a and/or the synchronization processing unit 5b in the signal processing unit 5.

Note that each of the uplink signal reception unit 11 and the downlink signal reception unit 11 may be configured as a direct conversion receiver.

It is preferable that symmetry of uplink and downlink signals in the downlink signal reception unit 11 and the transmission unit 13 is secured for each antenna by antenna calibration. Such antenna calibration is realized by providing the downlink signal reception unit 11 and/or the transmission unit 13 with a gain/phase adjuster (not shown).

Generally, since an FDD system does not need symmetry of uplink and downlink signals, antenna calibration need not be performed. In the present embodiment, since beam forming is performed, the effect of the beam forming is enhanced by securing symmetry of uplink and downlink signals.

[3.2 Beam Forming Processing Unit]

Figure 7:
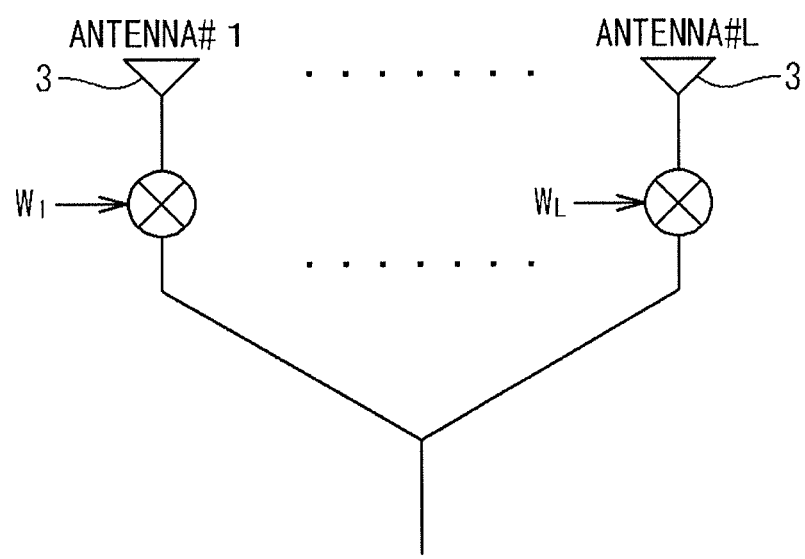
FIG. 7 is a diagram showing an array antenna system.

The fundamental function of the beam forming processing unit 5a according to the present embodiment is to determine weights $w_1$ to $w_L$ by which signals given to a plurality of (L) antennas 3 constituting a multi-antenna system are multiplied, and form desired beams, as shown in FIG. 7.

The beam forming processing unit 5a according to the present embodiment performs beam forming such that a relatively strong beam is directed to a terminal device (desired terminal; MS-1) that is located in a cell of its own station device (BS-1) and is wirelessly connected to the own base station device, while null beams are directed to other base station devices (interference base stations; BS-2 and BS-3) located near the own base station device (refer to FIG. 1).

Essentially, interference suppression is desired to be performed on the terminal device (interference terminal; MS-2 or MS-3) wirelessly connected to the another base station device (BS-2 or BS-3) located near the base station device (BS-1). In the present embodiment, however, a null beam is directed, not to an interference terminal whose channel information (transfer function) cannot be obtained, but to an interference base station that is located relatively near the interference terminal and whose transmission path information (transfer function) can be obtained. When an interference terminal is located near an interference base station, interference to the interference terminal can be suppressed by directing a null beam to the interference base station.

The beam forming processing unit 5a according to the present embodiment performs beam forming based on MMSE weights using a transfer function. In this case, in order to perform beam forming such that a strong beam is directed to the desired terminal while a null beam is directed to the interference base station, a transfer function of a transmission path between the base station device (BS-1) and the desired terminal (MS-1) and a transfer function of a transmission path between the base station device (BS-1) and the interference base station (BS-2 or BS-3) are required.

The base station device (BS-1) can obtain the transfer function of the transmission path between the base station device (BS-1) and the desired terminal (MS-1) from a feedback signal transmitted from the desired terminal (MS-1).

That is, the desired terminal (MS-1) estimates a transfer function of a downlink channel from the base station device (BS-1) to the desired terminal (MS-1), based on a known signal such as a pilot signal included in a downlink signal received from the base station device (BS-1), and includes the transfer function in an uplink signal, and then feeds back the uplink signal to the base station device (BS-1). Note that, in LTE, a code book can be used to obtain such transmission path information.

On the other hand, the base station device (BS-1) can obtain the transfer function of the transmission path between the base station device (BS-1) and the interference base station (BS-2 or BS-3) by causing the downlink signal reception unit 12 to receive a downlink signal transmitted from the interference base station (BS-2 or BS-3), and estimating the transfer function by using a reference signal (pilot signal) included in the downlink signal.

When the base station device (BS-1) causes the downlink signal reception unit 12 to receive the downlink signal transmitted from the interference base station (BS-2 or BS-3), transmission of a downlink signal by the transmission unit 13 is suspended. During this suspension, the downlink signal reception unit 12 is prevented from receiving the downlink signal transmitted from the transmission unit 13, and thus the downlink signal reception unit 12 can reliably receive the downlink signal transmitted from the interference base station (BS-2 or BS-3). Note that the period during which transmission of a downlink signal from the transmission unit 13 is suspended is set as a period during which a necessary pilot signal (reference signal) can be obtained, and needs to have a time length corresponding to at least one symbol, preferably, a time length corresponding to several symbols.

Among the plurality of base station devices in the wireless communication system of the present embodiment, inter-base-station synchronization is ensured in which (particularly downlink) transmission timings and communication frequencies coincide with each other. Generally, in the FDD system, inter-base-station synchronization is not needed. In the present embodiment, however, since inter-base-station synchronization is ensured also in the FDD system, reliable reception and demodulation can be performed even by a short-period downlink signal reception to an extent that a necessary pilot signal (reference signal) can be obtained.

The transfer function between the own base station device and the desired terminal and the transfer function between the own base station device and the interference base station are obtained for each of the plurality of antennas (#1 to #L).

A transfer function vector $H_1$ between the own base station device and the desired terminal, and transfer function vectors $H_2, H_3, \ldots, H_N$ between the own base station device and (N−1) interference base stations, respectively, are expressed as follows.

[Equation 1]

$$H_n = \begin{bmatrix} \text{transfer function of antenna \#1} \\ \vdots \\ \text{transfer function of antenna \#L} \end{bmatrix}$$

In this case, a weight vector W comprising weights $w_1, \ldots, w_1$, required for directing null beams toward the (N−1) interference base stations is calculated by the following equation.

[Equation 2]

$$H = \begin{bmatrix} H_1 \\ \vdots \\ H_N \end{bmatrix}$$

$$W = \begin{bmatrix} w_1 \\ \vdots \\ w_L \end{bmatrix} = H_1^*(HH^*)^{-1}$$

where $H_1^*$ and $H^*$ are complex conjugates of $H_1$ and $H$, respectively.

Based on the obtained transfer functions, the beam forming processing unit 5a calculates weights required for directing null beams toward the interference base stations, thereby performing beam forming. Thus, null beams can be formed toward the interference base stations (BS-2, BS-3) as shown in FIG. 1.

[3.3 Details of the Beam Forming Process]

Figure 8:
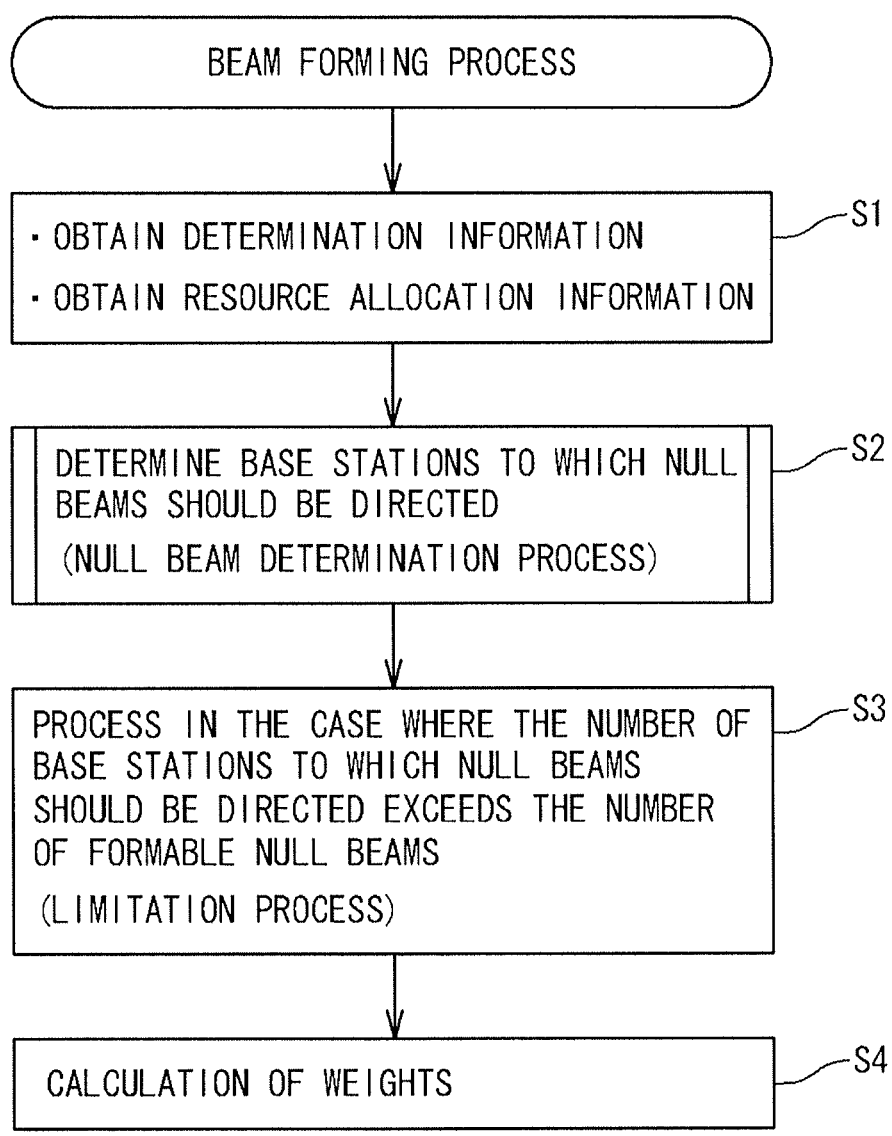
FIG. 8 is a flowchart showing a beam forming process.

FIG. 8 is a flowchart showing the beam forming process in detail.

[3.3.1 Obtainment of Information (Step S1)]

Firstly, the base station device (BS-1) obtains determination information and/or radio resource allocation information from other base station devices (BS-2, BS-3 and BS-4) surrounding the base station device (BS-1) (step S1). For this purpose, as shown in FIG. 5, the base station device 1 includes an obtainment unit 6 for receiving information required for the beam forming process from the other base station devices, and the information received by the obtainment unit 6 is provided to the signal processing unit 5 (beam forming processing unit 5a).

Figure 9A:
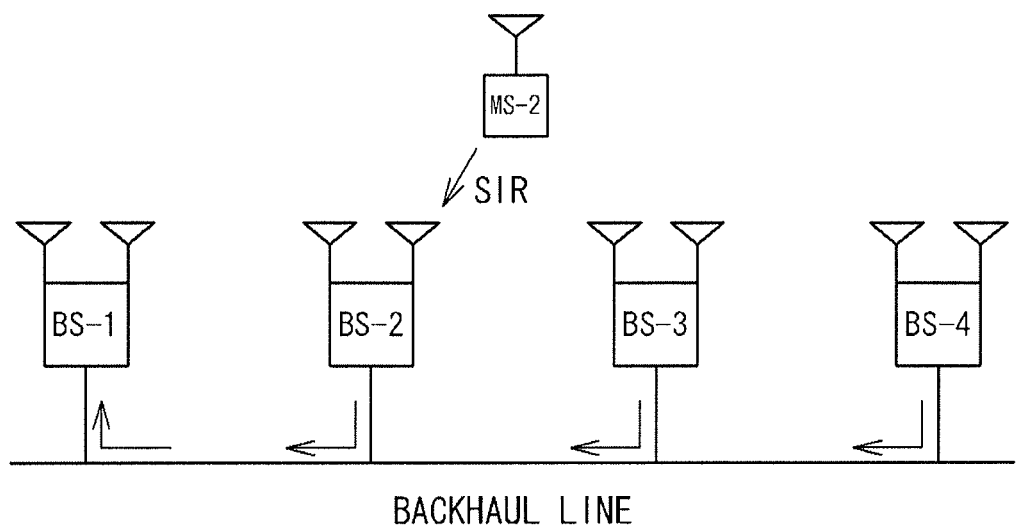
FIG. 9 is a diagram showing a method of obtaining information from another base station device.

In order that the obtainment unit 6 of the base station device (BS-1) obtains the necessary information from the other base station devices (BS-2, BS-3 and BS-4), for example, a backhaul line that connects the plurality of base station devices via a cable as shown in FIG. 9(a) may be used. By including the information to be obtained by the obtainment unit 6 of the present embodiment in the information exchanged among the base station devices via the backhaul line, the obtainment unit 6 can obtain the necessary information from the other base station devices.

Figure 9B:
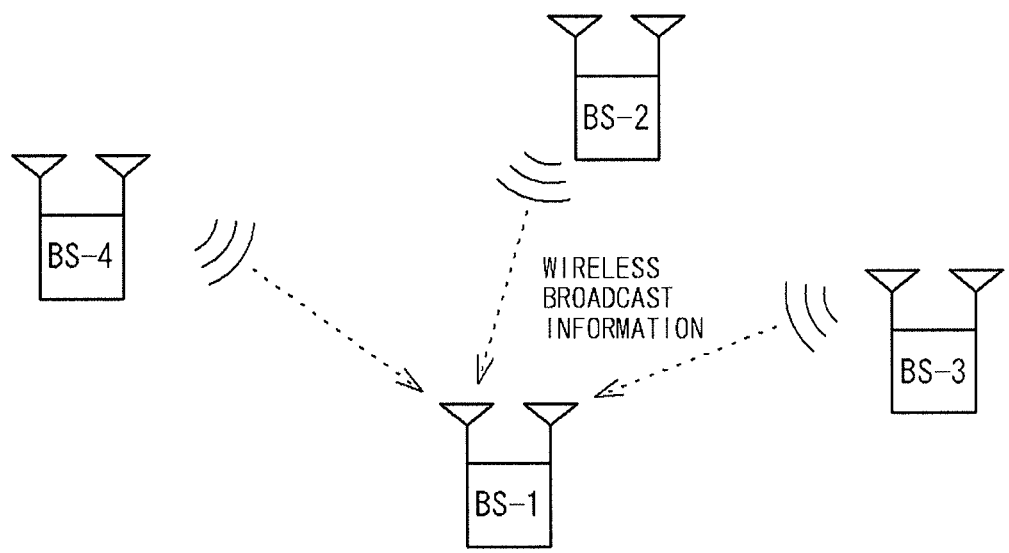

Furthermore, as shown in FIG. 9(*b*), by including the information to be obtained by the obtainment unit 6 of the present embodiment in wireless broadcast information transmitted from the other base station devices (BS-2, BS-3 and BS-4), the obtainment unit 6 may obtain the necessary information from the other base station devices. In this case, the obtainment unit 6 is implemented by the downlink signal reception unit 12 and the signal processing unit 5.

The information obtained from the other base station devices by the obtainment unit includes determination information and/or radio resource allocation information. How to use these pieces of information will be described later.

[3.3.2 Null Beam Determination Process (Step S2)]

Subsequently, the beam forming processing unit performs a null beam determination process (step S2) to determine, based on the obtained determination information, base station devices (BS-2 and BS-3) to which null beams should be directed, among the surrounding base station devices (BS-2, BS-3 and BS-4).

In the present embodiment, null beams are directed not to the interference terminals (MS-2 and MS-3) but to the other base station devices (BS-2 and BS-3).

However, a terminal device wirelessly connected to a base station device to which a null beam is directed does not always exist. If such a terminal does not exist, a null beam directed to the base station device comes to nothing. Moreover, the number of formable null beams is limited by the number of antennas of the base station device, i.e., is finite.

Accordingly, a null beam should be directed to only another base station device having a terminal device (interference terminal device) in its own cell (i.e., having a terminal device wirelessly connected thereto), among surrounding base station devices (other base station devices from which the own base station device can receive (detect) downlink signals and recognize the presences thereof).

Further, the interference suppression effect to the interference terminal (MS-2 or MS-3) achieved when a null beam is directed to the another base station device is increased as the distance between the another base station device to which the null beam is directed and the interference terminal is reduced. If the distance is too long, the interference suppression effect might be reduced. Thus, even when a null beam is directed to the another base station device, the interference suppression effect to the interference terminal varies. Therefore, it is efficient that a null beam is directed to the another base station device only when a certain level of interference suppression effect is recognized.

That is, when three base station devices BS-2, BS-3, and BS-4 exist as surrounding base station devices as shown in FIG. 1, null beams may be directed to all the three base station devices. However, wasteful use of null beams can be avoided when null beams are directed to only two base station devices BS-2 and BS-3 having interference terminals (MS-2 and MS-3) wirelessly connected thereto.

From the above viewpoint, in the null beam determination process in step S2, base station devices (BS-2 and BS-3) to which null beams should be directed are determined among the surrounding base station devices (BS-2, BS-3 and BS-4), based on the determination information.

FIGS. 10 to 13 show variations of the null beam determination process for determining base station devices to which null beams should be directed.

Figure 10:
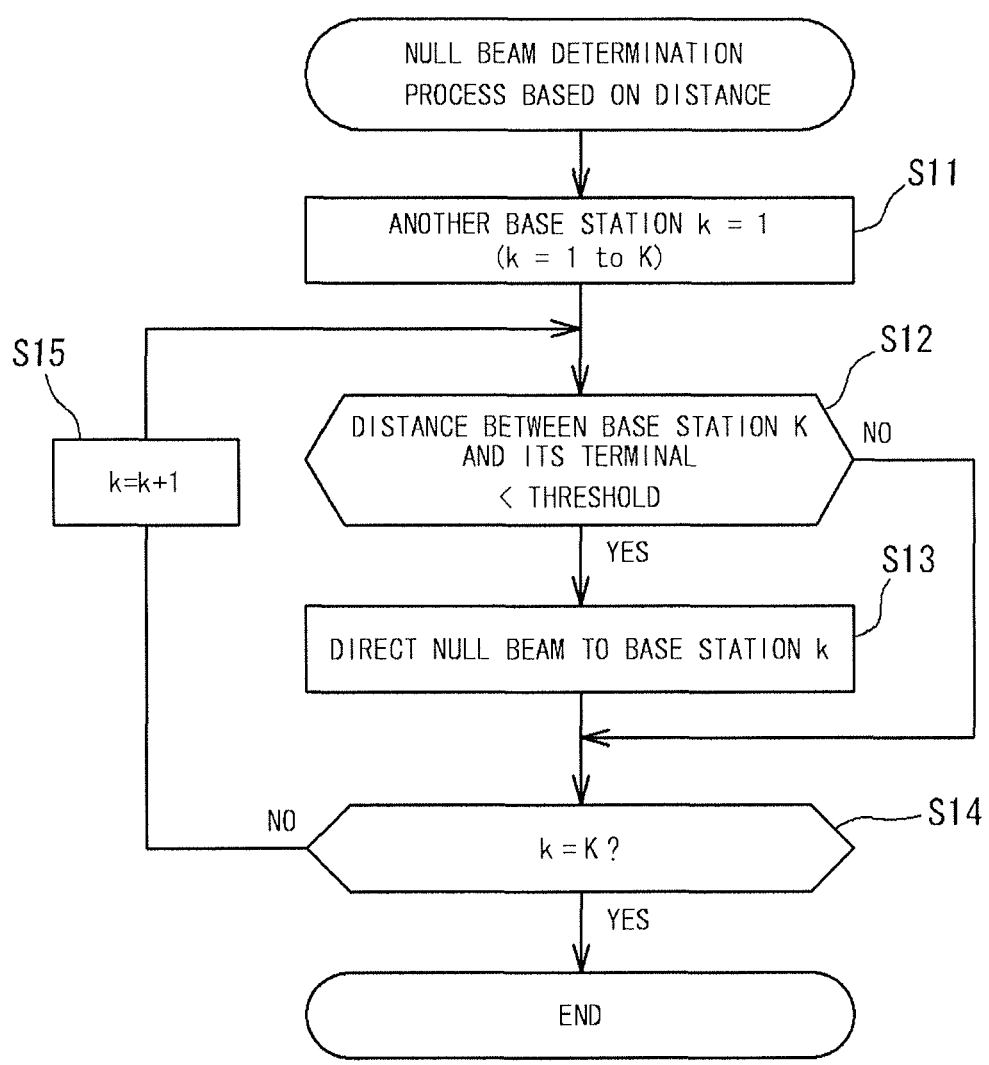
FIG. 10 is a flowchart showing a null beam determination process.

FIG. 10 shows a method of performing the null beam determination process by using, as the determination information, distance information indicating the distance between the another base station device (BS-2 or BS-3) and the interference terminal (MS-2 or MS-3) existing in the cell of the another base station device.

Note that the distance information is measured by the another base station device (BS-2 or BS-3), based on positional information or the like transmitted from the interference terminal (MS-2 or MS-3) to the another base station device.

In the process shown in FIG. 10, assuming that the number of surrounding base station devices (BS-2, BS-3 and BS-4) from which the own base station device 1 has received downlink signals is K, it is determined, for each of the base station devices, whether a null beam should be directed to the base station device, based on the distance information obtained from each of the K base station devices (steps S12 and S13).

Specifically, the distance indicated by the distance information obtained from each base station device is compared with a threshold (first threshold) (step S12). If the distance is smaller than the threshold, the base station device is determined as a base station device to which a null beam should be directed (step S13). When the distance is larger than the threshold or when distance information has not been obtained, the base station device is not determined as a base station device to which a null beam should be directed. The above process is repeated for the surrounding base station devices (steps S14 and S15), thereby determining all base station devices to which null beams should be directed.

In the process shown in FIG. 10, the distance information is also information (presence information) indicating that there is a terminal device wirelessly connected to the another base station device. When distance information has not been obtained, it means that there is no terminal device wirelessly connected to the another base station device, and therefore, no null beam is formed. The same holds for the processes shown in FIGS. 11 to 13 in which determination information other than the distance information is used.

Instead of using the distance information or the like as the presence information, information exclusively indicating whether there is a terminal device wirelessly connected to the another base station device may be separately obtained as the presence information from the another base station device. In this case, it is possible to determine a base station device to which a null beam should be directed, based on the presence information exclusively indicating whether there is a terminal device wirelessly connected to the another base station device, without using the distance information or the like.

Figure 11:
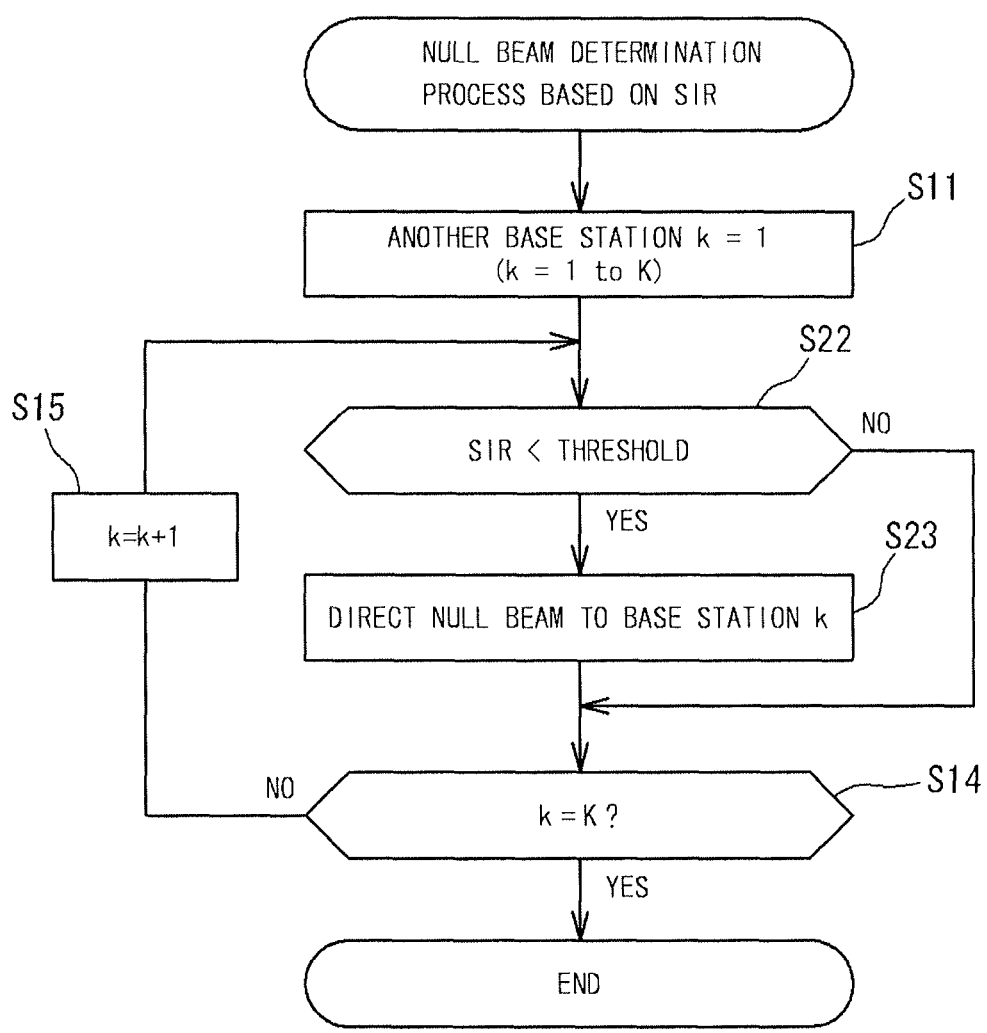
FIG. 11 is a flowchart showing a null beam determination process.

FIG. 11 shows a method of performing the null beam determination process by using, as the determination information, reception condition information indicating the reception condition (e.g., SIR or SINR) of the interference terminal (MS-2 or MS-3). The interference suppression effect achieved by directing a null beam to the interference base station is enhanced not only when the physical distance between the interference base station and the interference terminal is short. As shown in FIG. 11 (and FIG. 12), a base station device to which a null beam should be directed may be determined in accordance with the reception condition of the interference terminal. Note that the reception condition such as SIR or SINR is measured by the interference terminal (MS-2 or MS-3), and the measured value is transmitted to the another base station device (BS-2 or BS-3).

Also in the process shown in FIG. 11, like the process shown in FIG. 10, it is assumed that the number of surrounding base station devices (BS-2, BS-3 and BS-4), from which the own base station device 1 has received downlink signals, is K, and it is determined, for each of the base station devices, whether a null beam should be directed to the base station device, based on the reception condition of the interference terminal, which is obtained from each of the K base station devices (steps S22 and S23).

Specifically, the reception condition (SIR or SINR) of the interference terminal, which has been obtained from each base station device, is compared with a threshold (second threshold) (step S22). When the SIR or SINR is smaller than the threshold, it is determined that the reception condition is poor, and actually the interference signal to the interference terminal is relatively great. Therefore, the SIR or SINR can be improved to some extent by directing a null beam to the interference base station, and the interference suppression effect can be expected.

Therefore, when the SIR or SINR is smaller than the threshold, the base station device is determined as a base station device to which a null beam should be directed (step S23). When the SIR or SINR is larger than the threshold and the reception condition is favorable or when reception condition information has not been obtained, the base station device is not determined as a base station device to which a null beam should be directed. The above process is repeated for the surrounding base station devices (steps S14 and S15), thereby determining all base station devices to which null beams should be directed.

Figure 12:
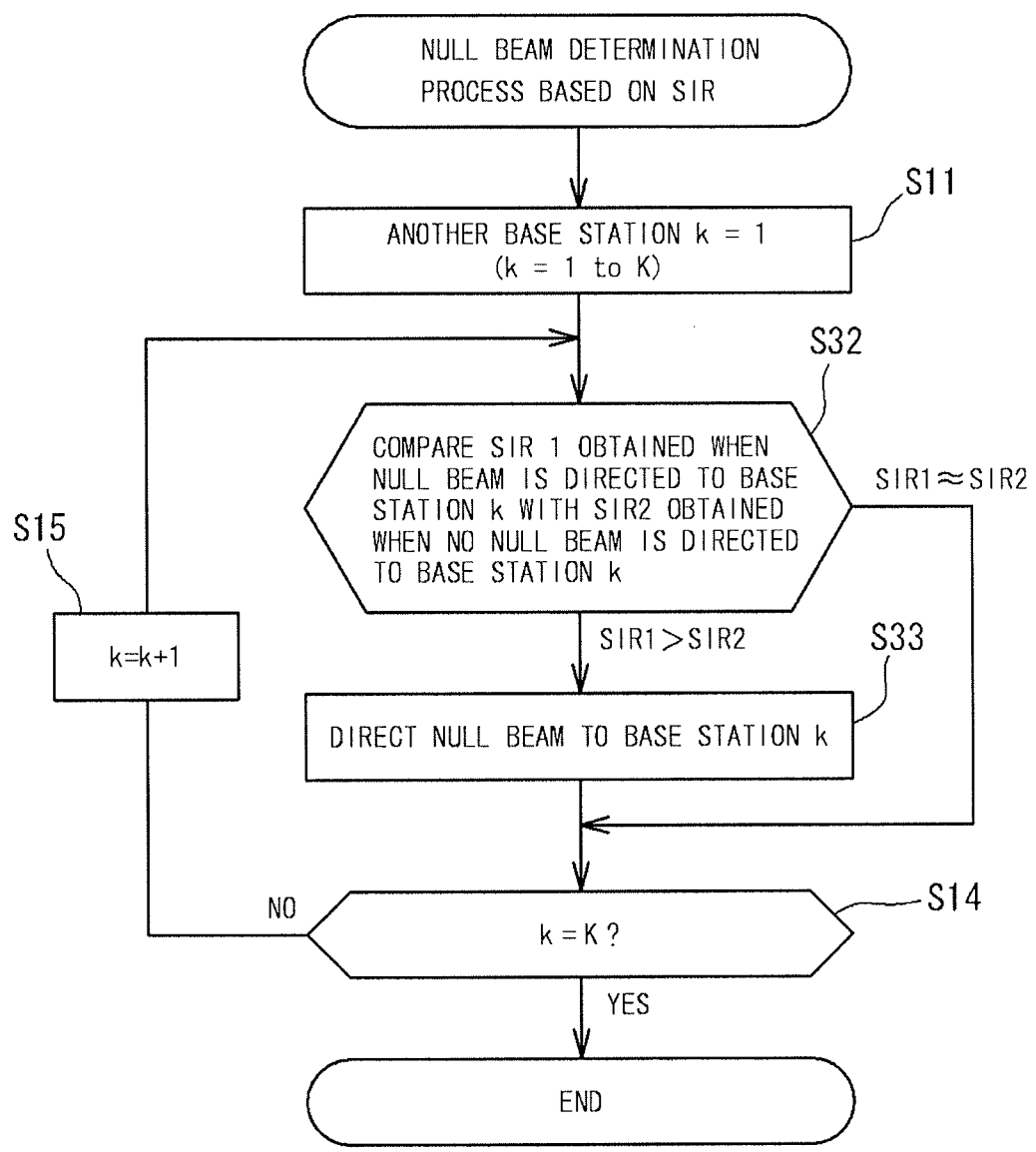
FIG. 12 is a flowchart showing a null beam determination process.

FIG. 12 also shows a method of performing the null beam determination process by using, as the determination information, reception condition information indicating the reception condition (e.g., SIR or SINR) of the interference terminal (MS-2 or MS-3).

In the process shown in FIG. 12, a first reception condition (SIR1) when a null beam is actually directed to each of the surrounding base station devices and a second reception condition (SIR2) when no null beam is not directed are obtained, as the reception condition, from the another base station device, and the reception conditions are compared to determined the degree of the interference suppression effect due to the null beam, thereby determining a base station device to which a null beam should be directed. Note that the SIR1 and the SIR2 are information directly indicating the interference suppression effect due to the null beam.

In order to obtain the first reception condition, the own base station device actually directs a null beam to any of the surrounding base station devices, and obtains the reception condition of the interference terminal at that time via the base station device. Conversely, in order to obtain the second reception condition, the own base station device directs a beam to any of the surrounding base station device without directing a null beam thereto, and obtains the reception condition of the interference terminal at that time via the another base station device.

Also in the process shown in FIG. 12, like the process shown in FIG. 11, it is assumed that the number of surrounding base station devices (BS-2, BS-3 and BS-4), from which the own base station device 1 has received downlink signals, is K, and it is determined, for each of the base station devices, whether a null beam should be directed to the base station device, based on the first and second reception conditions of the interference terminal, which are obtained from each of the K base station devices (steps S32 and S33).

Specifically, the first reception condition and the second reception condition of the interference terminal, which have been obtained from each base station device, are compared (step S32). If the reception condition is improved when the null beam is directed than when no null beam is directed ((SIR1>SIR2), the interference suppression effect due to the null beam is recognized, and therefore, the interference base station is determined as a base station device to which a null beam should be directed (step S33).

If the reception condition hardly changes regardless of whether the null beam is directed or not (SIR1□SIR2) or when the first reception condition and/or the second reception condition have not been obtained, the base station device is not determined as a base station device to which a null beam should be directed.

The above process is repeated for the surrounding base station devices (steps S14 and S15), thereby determining all base station devices to which null beams should be directed.

Figure 13:
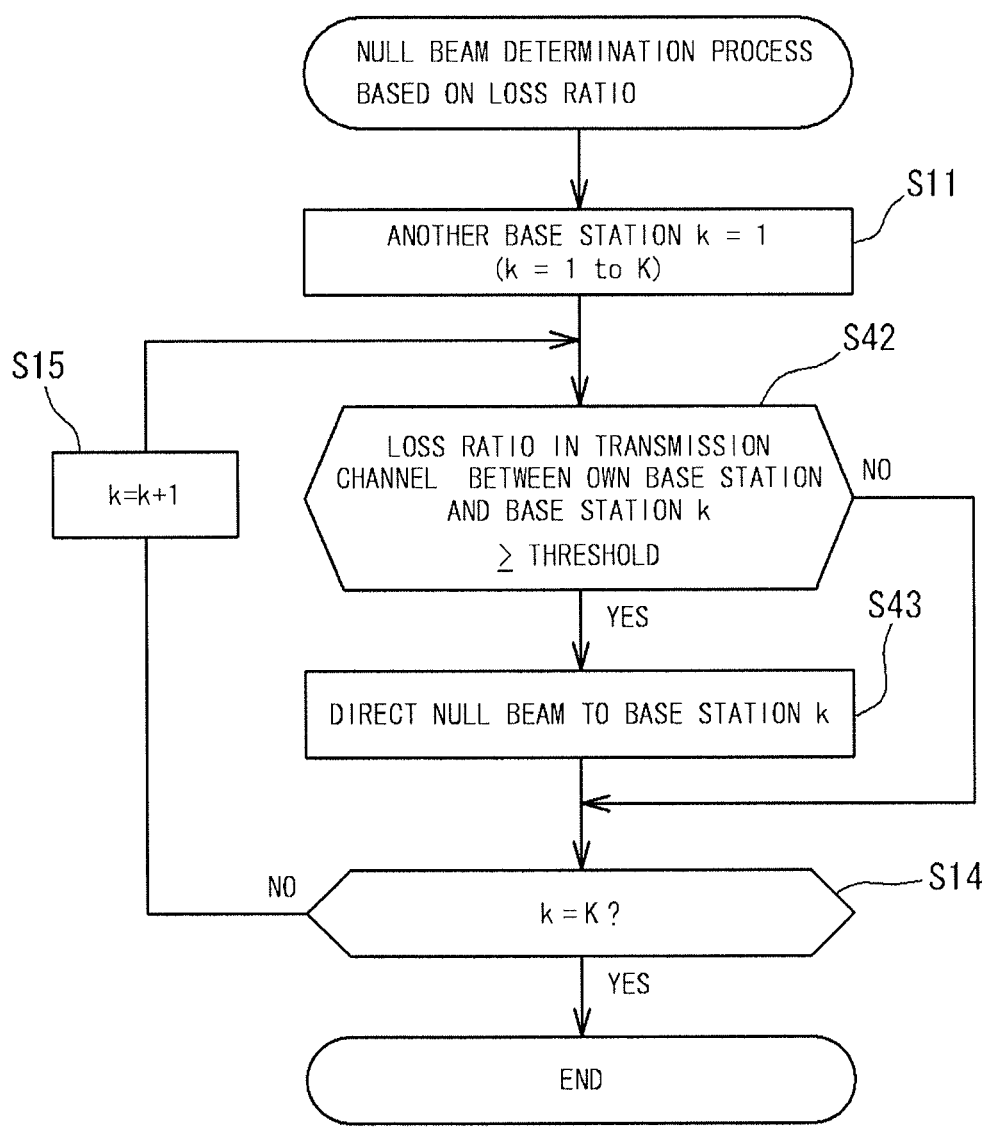
FIG. 13 is a flowchart showing a null beam determination process.

FIG. 13 shows a method for performing the null beam determination process by using, as the determination information, loss ratio information indicating the loss ratio of a signal in the transmission path between the base station device (BS-1) and each of the surrounding base station device (BS-2, BS-3 and BS-4).

When the distance between the base station device (BS-1) and the surrounding base station device (BS-2, BS-3 or BS-4) is short, the loss (the degree of attenuation) of a signal transmitted from the base station device (BS-1) is small before it enters the communication area (cell) of the surrounding base station device (BS-2, BS-3 or BS-4), and therefore, the signal is likely to become a great interference signal. Accordingly, when the loss of the signal is small (when the interference signal is great), the interference suppression effect due to the null beam is enhanced.

Note that the loss ratio is "reception signal power of the interference base station/transmission signal power of the own base station device". The loss ratio can be calculated by obtaining, from the interference base station, the magnitude of the reception signal power when the downlink signal transmitted from the own base station device is received by the interference base station.

Also in the process shown in FIG. 13, like the other processes, it is assumed that the number of surrounding base station devices (BS-2, BS-3 and BS-4), from which the own base station device 1 has received downlink signals, is K, and it is determined, for each of the base station devices, whether a null beam should be directed to the base station device, based on the loss ratio between the own base station device 1 and each of the K base station devices (steps S42 and S43).

Specifically, the loss ratio between the own base station device 1 and each surrounding base station device is compared with a threshold (third threshold) (step S42). If the loss ratio is larger than the threshold, it means that the reception signal power in the surrounding base station device is great and therefore the interference signal is great. Accordingly, when the loss ratio is larger than the threshold, the interference suppression effect can be expected by directing a null beam to the interference base station.

Therefore, when the loss ratio is larger than the threshold, the base station device is determined as a base station device to which a null beam should be directed (step S43). When the loss ratio is smaller than the threshold and therefore the interference signal is small, the base station device is not determined as a base station device to which a null beam should be directed.

The above process is repeated for the surrounding base station devices (steps S14 and S15), thereby determining all base station devices to which null beams should be directed.

While in the process shown in FIG. 13 the signal loss ratio (the degree of signal attenuation) is used, the distance between the own base station device and the another base station device may be used instead. The reason is that the loss ratio is decreased (the attenuation is increased) as the distance is increased.

Further, instead of the loss ratio, only the magnitude of the reception signal power in the another base station device may be used. The reason is that if the transmission signal power of the own base station device is constant, the loss ratio can be substantially estimated by only the magnitude of the reception signal power in the another base station device.

Furthermore, instead of the loss ratio, the magnitude of the downlink transmission signal power of the own base station device may be used. The reason is that if the downlink transmission signal power of the own base station device is increased, the interference signal becomes greater regardless of the loss ratio (distance).

In the processes shown in FIGS. 10 to 13, determination as to whether a null beam should be directed is performed by individually using the various kinds of determination information, comprehensive determination may be performed by using a combination of the various kinds of determination information.

[3.3.3 Limitation Process (Step S3)]

There are cases where the number of surrounding base station devices to which null beams should be directed, which have been determined in step S2, exceeds the number of formable null beams. The number of formable null beams is "the total number L of antennas of the own base station device—1" when the number of desired terminals (without spatial multiplexing) is 1.

In step S3, when the number of surrounding base station devices to which null beams should be directed exceeds the number of formable null beams, a process of limiting the number of base station devices to which null beams are actually directed to the number of formable null beams or less, is performed.

Specifically, based on the determination information, base station devices that will have higher interference suppression effects when null beams are directed thereto are selected within the range of the number of formable null beams, from among the surrounding base station devices to which null beams should be directed. For example, by performing the selection in descending order of the distance between the interference base station and the interference terminal, the number of base stations to which null beams are actually directed can be reduced.

As for the limitation process, instead of limiting the number of base stations to which null beams are directed as described above, a frequency band in which the number of surrounding base station devices to which null beams should be directed exceeds the number of formable null beams may be prevented from being used among the available frequency bands of the downlink signals.

While in the above description the number of formable null beams is "the total number L of antennas of the own base station device—1", the present invention is not limited thereto. When the number of formable null beams is sufficiently smaller than the total number of antennas, communication between the base station device and the desired terminal is given priority. As the number of formable null beams gets closer to the total number of antennas, the interference suppression effect is given higher priority.

Figure 14:
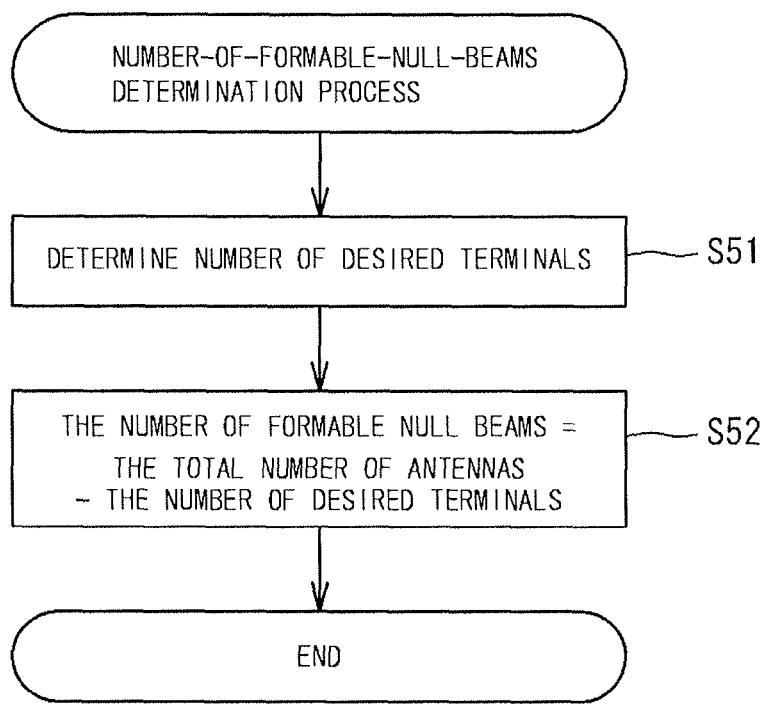
FIG. 14 is a diagram showing a process of determining the number of formable null beams.
Figure 15:
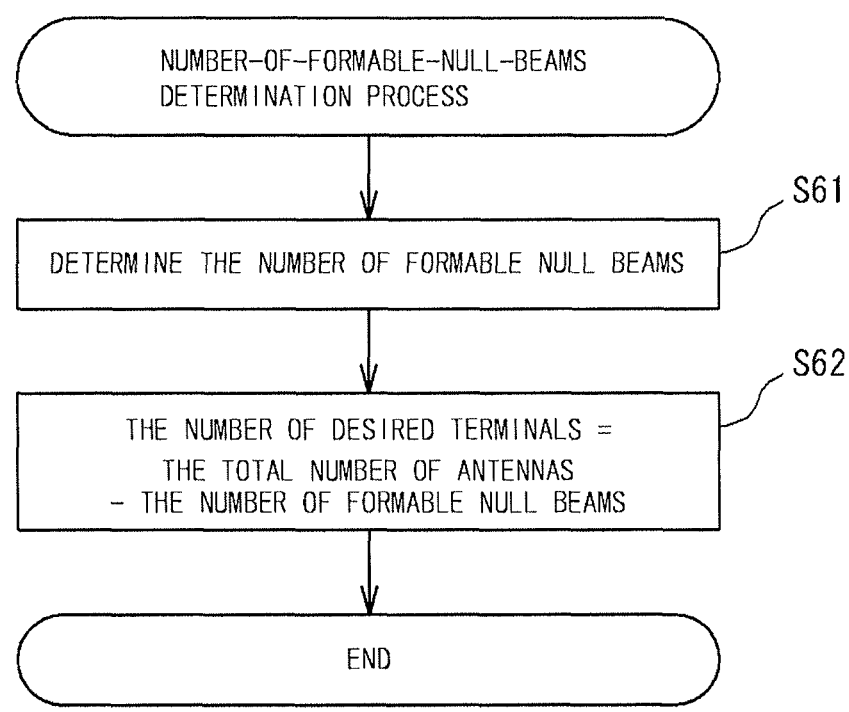
FIG. 15 is a diagram showing the process of determining the number of formable null beams.

Further, the number of formable null beams may be a fixed value, or may be varied depending on the situation as shown in FIGS. 14 and 15. FIG. 14 shows a first example of a process of determining the number of formable null beams. In FIG. 14, firstly, the base station device 1 determines the number of desired terminals (step S51). For example, when there are many desired terminals, the base station device 1 preferentially determines the number of desired terminals in consideration of this situation.

Then, the number obtained by subtracting the number of desired terminals determined in step S51 from the total number of antennas is set as the number of formable null beams (step S52). In this way, the number of desired terminals restricts null-beam formation. When the number of formable null beams is determined as shown in FIG. 14, priority is given to communication with the desired terminal over interference suppression. If spatial multiplexing by the multi-antenna system needs to be performed for high-speed communication to the desired terminal, the number obtained by subtracting "the number of desired terminals×the degree of multiplexing" from the total number of antennas is the number of formable null beams, and thus restriction on null-beam formation is increased.

FIG. 15 shows a second example of a process of determining the number of formable null beams. In FIG. 15, firstly, the base station device 1 preferentially determines the number of formable null beams (step S61). For example, the base station device 1 determines the number of formable null beams, in accordance with the number of base station devices to which null beams should be directed, within the range that does not exceed the total number of antennas (however, if one desired terminal exists, the number of formal null beams is determined within the range of "the total number of antennas—1).

Then, the number obtained by subtracting the number of formable null beams determined in step S61 from the total number of antennas is set as the number of desired terminals (step S62). When the number of formable null beams is determined as shown in FIG. 15, priority is given to interference suppression over communication with the desired terminal. If spatial multiplexing by the multi-antenna system needs to be performed for high-speed communication to the desired terminal, the number obtained by dividing the number of desired terminals determined in step S62 by the degree of multiplexing is the actual number of desired terminals.

[3.3.4 Weight Calculation (Step S4)]

In step S4, weights are calculated based on the transfer function of the transmission path to the another base station device that has been determined through steps S2 and S3 as a base station device to which a null beam should be directed, and beam forming is performed based on the obtained weights. Thereby, a null beam is directed to the desired base station device, and the effect of suppressing interference to the interference terminal is achieved.

Further, the null-beam formation may be limited to a radio resource allocated to the interference terminal. In an OFDMA system such as LTE, a resource block used for transmission or reception is allocated to a terminal device, and each user performs communication by using the allocated resource block. Accordingly, interference suppression is only required to be performed within the range of the resource block.

That is, based on the information of radio resource allocation to the interference terminal, which has been obtained in step S1, a null beam is directed to the interference base station in the radio resource (frequency (subcarrier) and/or time (symbol)) allocated to the interference terminal. Thereby, an unnecessary null beam is prevented from being directed to the interference base station, resulting in efficient beam forming.

[3.4 Synchronization Processing Unit]

Figure 16:
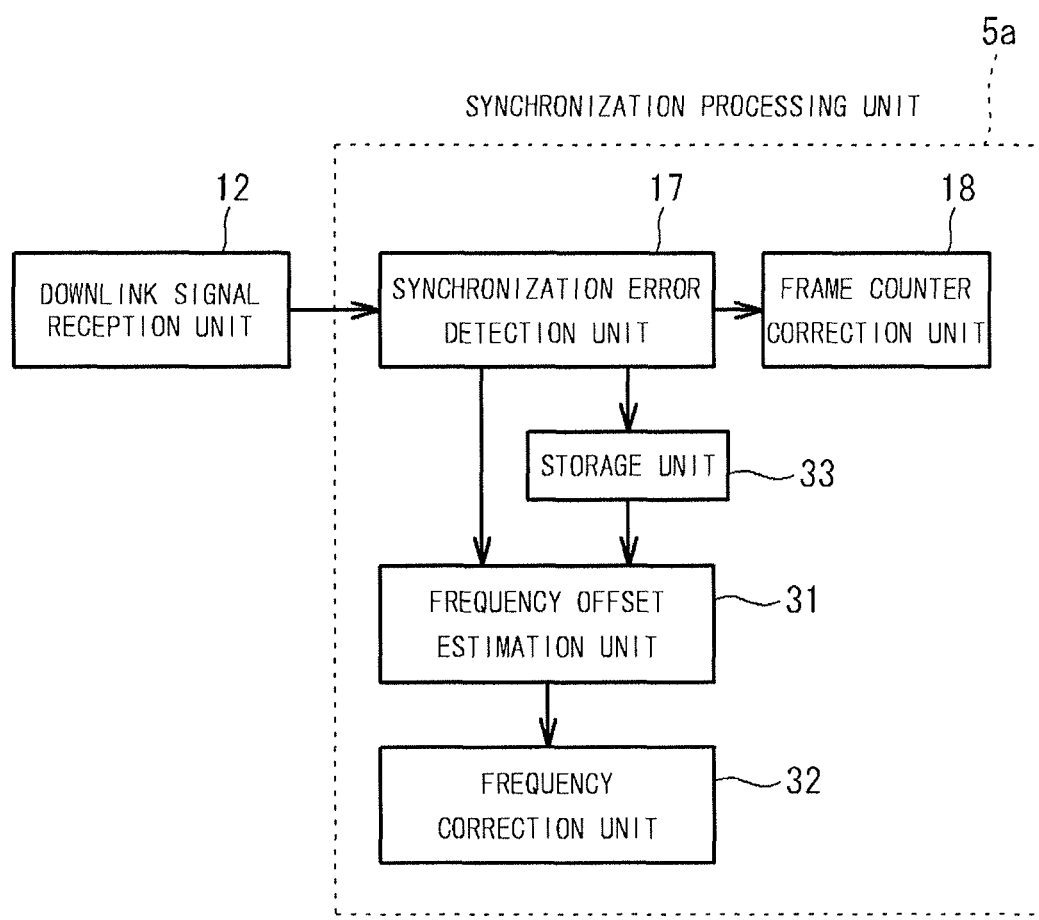
FIG. 16 is a configuration diagram of a synchronization processing unit.

FIG. 16 shows, in detail, the synchronization processing unit 5a that performs a process for constantly ensuring inter-base-station synchronization among a plurality of base station devices. Such inter-base-station synchronization may be achieved by providing each of the base station devices with a GPS receiver so that the base station devices can achieve synchronization by using GPS signals, or by connecting the base station devices via a cable. However, the present embodiment adopts inter-base-station synchronization based on "over-the-air synchronization" in which synchronization is achieved by using wireless signals (downlink signals).

Specifically, the synchronization processing unit 5a performs a process of synchronizing the communication timing and the communication frequency of its own base station device 1 with those of another base station device, based on a first known signal (Primary Synchronization Signal) and a second known signal (Secondary Synchronization Signal) which are included in a frame of a downlink signal received from the another base station device via the downlink signal reception unit 12.

The synchronization processing unit 5a includes a frame synchronization error detection unit 17, a frame counter correction unit 18, a frequency offset estimation unit 31, a frequency correction unit 32, and a storage unit 33.

The frame synchronization error detection unit 17 detects a frame transmission timing of the another base station device by using the known signals included in the downlink signal, and detects an error (frame synchronization error; communication timing offset) between the detected frame transmission timing and a frame transmission timing of the own base station device 1.

Note that detection of transmission timing can be performed by detecting the timings of the known signals (waveforms thereof are also known) existing in a predetermined position in the frame of the received downlink signal.

Further, when the downlink signal reception unit 12 receives the downlink signal for synchronization, the transmission unit 13 suspends transmission.

The synchronization error detected by the frame synchronization error detection unit 17 is provided to the frame counter correction unit 18 and used for frame synchronization error correction. In addition, the synchronization error is provided to the storage unit 33 each time it is detected, and is accumulated in the storage unit 33.

The frequency offset estimation unit 31 estimates, based on the synchronization error detected by the detection unit 17, a difference (clock frequency error) between a clock frequency of a clock generator (not shown) contained in the base station device as the receiving side and a clock frequency of a clock generator contained in the another base station device as the transmitting side, and estimates a carrier frequency error (carrier frequency offset) from the clock frequency error.

Under the situation where over-the-air synchronization is periodically performed, the frequency offset estimation unit 31 estimates a clock error based on a frame synchronization error t1 detected in the last over-the-air synchronization and a frame synchronization error t2 detected in the current over-the-air synchronization. Note that the last frame synchronization error t1 can be obtained from the storage unit 29.

For example, it is assumed that, when the carrier frequency is 2.6 [GHz], a frame synchronization error T1 has been detected at the timing of the last over-the-air synchronization (synchronization timing=t1), and correction of timing by an amount corresponding to T1 has been performed. The synchronization error (timing offset) after the timing correction is 0 [msec]. Then, it is assumed that also at the timing of the current over-the-air synchronization (synchronization timing=t2) performed T=10 seconds later, a synchronization error (timing offset) has been detected again, and the synchronization error (timing offset) is T2=0.1 [msec].

At this time, the synchronization error (timing offset) of 0.1 [msec] having occurred during the 10 seconds is an accumulated value of the error between the clock period of the another base station device and the clock period of the own base station device.

That is, the following equation is established between the synchronization error (timing offset) and the clock period.

the clock period of the synchronization-origin base station:the clock period of the synchronization-target base station=$T$:($T$+$T2$)=10:(10+0.0001)

Since the clock frequency is the reciprocal of the clock period, (the clock frequency of the synchronization-origin base station−the clock frequency of the synchronization-target base station)

= the clock frequency of the synchronization-origin base station×$T2/(T+T2)$

☐ the clock frequency of the synchronization-origin base station×0.00001

Accordingly, in this case, there is an error of 0.00001=10 [ppm] between the clock frequency of the another base station device as the transmitting side and the clock frequency of the own base station device as the receiving side. The frequency offset estimation unit 31 estimates a clock frequency error in the above-described manner.

Since the carrier frequency and the synchronization error (timing offset) are shifted in the same manner, an error of an amount corresponding to 10 [ppm], i.e., an error of 2.6 [GHz]×1×10$^{-5}$=26 [kHz], also occurs in the carrier frequency. Thus, the frequency offset estimation unit 31 can also estimate a carrier frequency error (carrier frequency offset) from the clock frequency error.

The carrier frequency error estimated by the frequency offset estimation unit 31 is provided to the carrier frequency correction unit 32. Correction of carrier frequency can be performed not only for the carrier frequency of the uplink signal but also for the carrier frequency of the downlink signal.

Reception of the downlink signal for the above-mentioned inter-base-station synchronization process is performed periodically or according to need, and thereby synchronization among a plurality of base stations is constantly ensured. Further, reception of the downlink signal for the inter-base-station synchronization is performed independently from reception of the downlink signal for the beam forming process.

Therefore, when a downlink signal is received from another base station device for the beam forming process, synchronization between the own base station device and the another base station device has already been established. Therefore, it is not necessary to establish synchronization with the another base station device each time the own base station device receives a downlink signal from the another base station device for the beam forming process. Thus, reception of the downlink signal is facilitated.

4. Use as a Small Base Station Device (Femto Base Station Device)

While the base station device according to the present embodiment can be used as a so-called macro base station device (transmission signal power=about 2 W to 40 W) that forms a macro cell having a size equal to or larger than about 500 m, the base station device can also be used as a small base station device (transmission power=2 W or lower) that forms a relatively small cell (smaller than about 500 m).

Examples of the small base station device include: a pico base station device that forms a pico cell having a transmission signal power of about 200 mW to 2 W, and a size of about 100 m to 500 m; and a femto base station device that forms a femto cell having a transmission signal power of 20 mW to 200 mW, and a size of 100 m or smaller. The base station device of the present embodiment can be favorably used as a femto base station device among the small base station devices.

Figure 17:
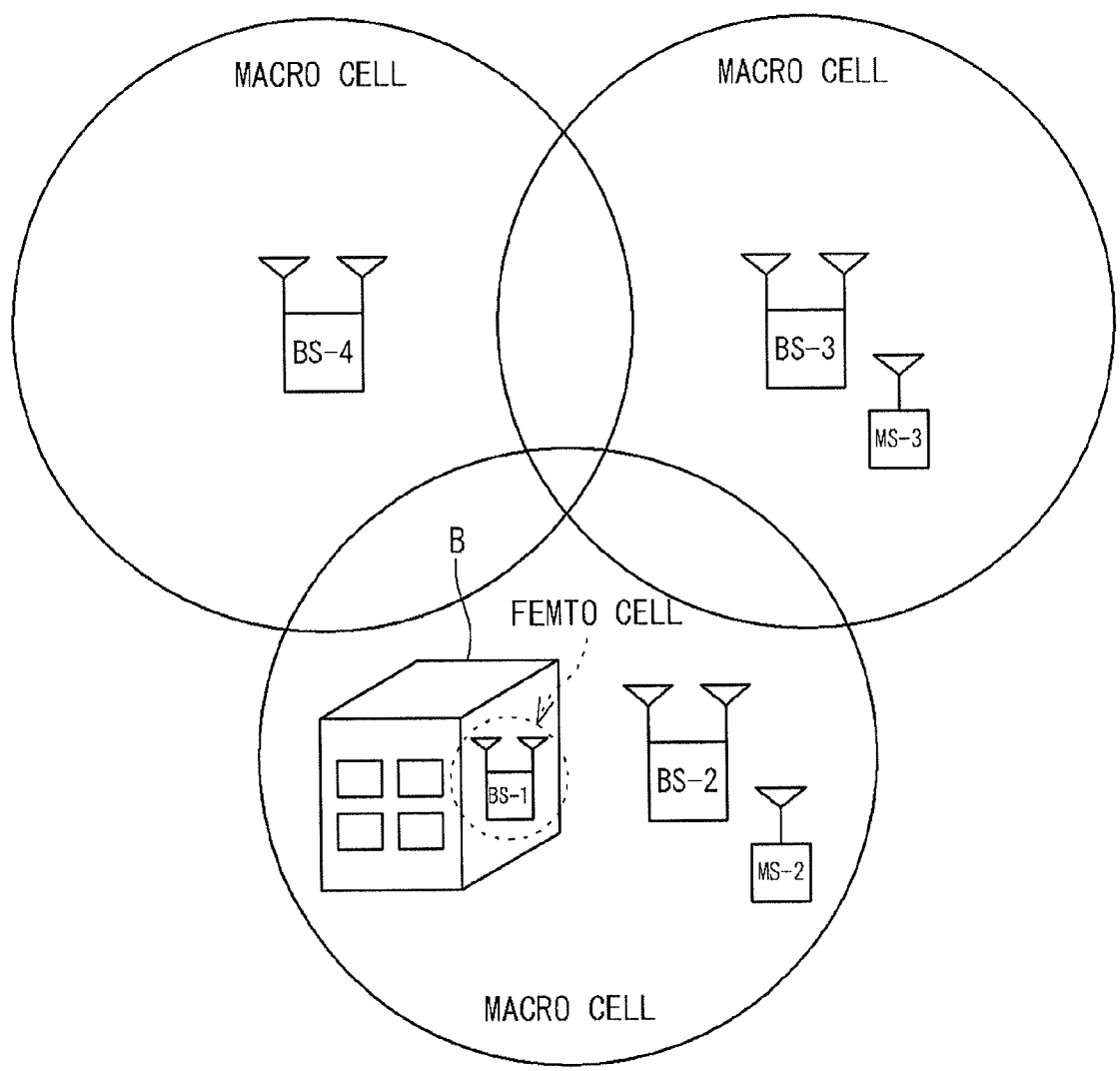
FIG. 17 is a diagram showing a relationship between a macro cell and a femto cell.

FIG. 17 shows a state in which three macro base station devices BS-2, BS-3 and BS-4 form macro cells, respectively. Since a macro base station device is generally installed by a telecommunications carrier, beam forming has been set in advance in consideration of locations of other macro base station devices.

On the other hand, a small base station device (particularly, a femto base station device) is installed in a building or basement, or between buildings, where a radio wave from a macro base station device does not reach, and is used to complement a macro base station device for improved communication environment. Accordingly, such a small base station device (BS-1) is installed in, for example, a building B existing in the range of a macro cell as shown in FIG. 17. In this case, generally, a radio wave from the small base station device (BS-1) is less likely to leak to the outside of the building. However, as shown in FIG. 18, when there is a structure such as a window that allows the radio wave to pass therethrough, near the base station device (BS-1), and then if a beam is formed toward the window W, the radio wave leaks through the window W to the outside of the building B, resulting in an interference signal to a terminal device (MS-2) located outside the building.

Figure 18:
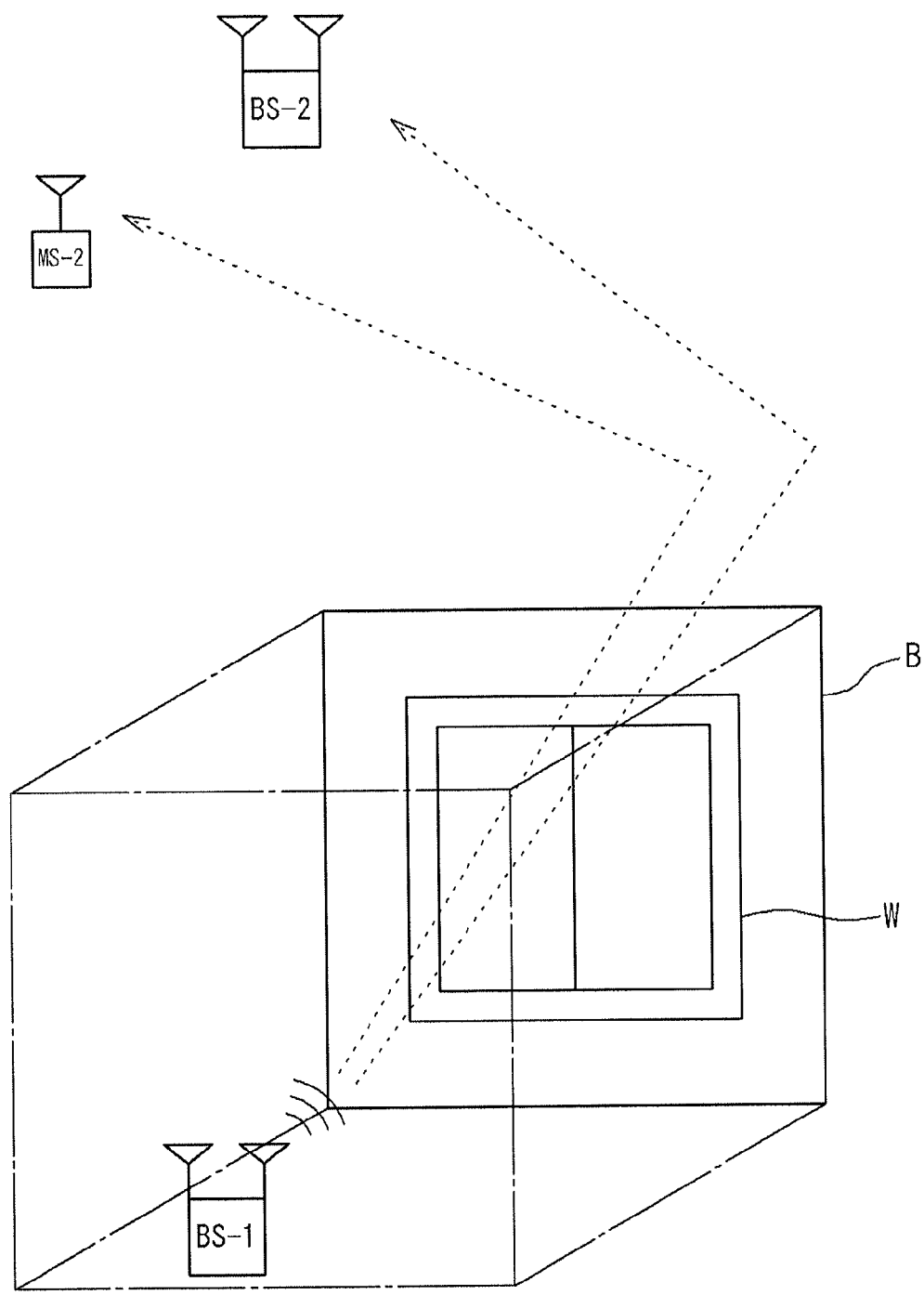
FIG. 18 is a diagram showing an example of installation of a femto base station device.

In this regard, if the base station device 1 of the present embodiment is adopted as the base station device BS-1 shown in FIGS. 17 and 18, a null beam is formed in the direction toward the window W, i.e., the arrival direction of the downlink signal from the interference base station (BS-2), and thus interference to the interference terminal (MS-2) is avoided.

Moreover, such a small base station device is not always installed by a telecommunications carrier. For example, a case is supposed where a person other than the telecommunications carrier, such as an owner of a building or the like, may independently install a small base station device to improve communication environment in the building or an underground mall. It is difficult for a person other than the telecommunications carrier to calculate the location of another base station device such as a macro base station device, and set beam forming. The necessity of calculating the location of another base station device in order to install a small base station device prevents the spread of the small base station device. Further, a small base station device needs to be installed avoiding a place where a radio wave is likely to leak, such as the window W, which causes restriction on installation.

In contrast, the base station device 1 of the present embodiment is capable of automatically form a null beam to an appropriate direction, by simply installing the base station device 1 without the necessity of calculating location of another base station device, or avoiding a place where a radio wave is likely to leak, such as the window W.

5. Second Embodiment; Use of Information Relating to Positional Relationship

Next, the second embodiment of the present invention will be described. For those points that are not described in the second embodiment, the matters described in the first embodiment are incorporated. The same holds for embodiments described later.

[5.1 Beam Forming Using a Distance from Another Base Station Device]

[5.1.1 Inter-Base-Station Network in a Wireless Communication System]

Firstly, a description will be given of an inter-base-station network for interchanging information indicating, for example, the distance between the own base station device and another base station device.

Figure 19:
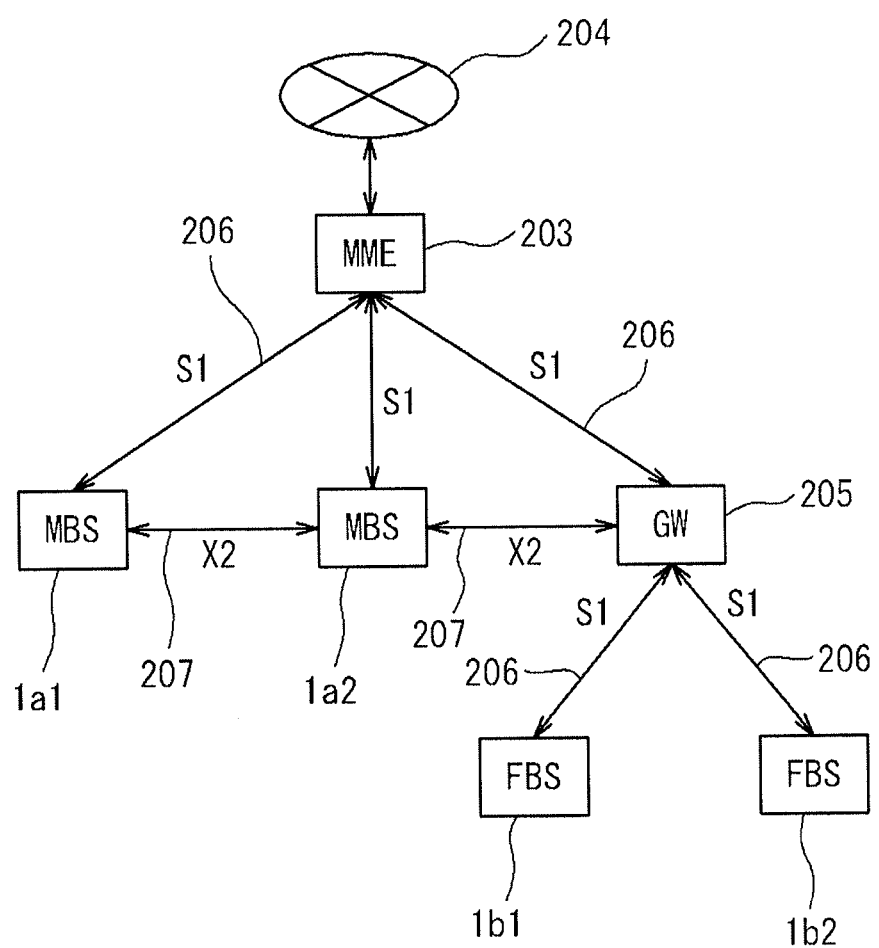
FIG. 19 is a configuration diagram of an inter-base-station network.

FIG. 19 is a diagram illustrating an aspect of a communication network (inter-base-station network) for connecting a plurality of base station devices. Each macro base station device (hereinafter, referred to as "macro BS") 1a is connected to a communication network 204 of the wireless communication system via an MME (Mobility Management Entity) 203. The MME 203 is a node that manages the position and the like of each MS 2, and performs a process relating to mobility management for each MS2 by handover or the like.

Each femto BS 1b is connected to the MME 203 via a gateway 205 (GW). The gateway 205 has a function of relaying communication performed between each femto BS 1b and the MME 203, and communication performed between femto BSs 1b.

Connection between the MME 203 and each macro BS 1a, connection between the MME 203 and the gateway 205, and connection between the gateway 205 and each femto BS 1b are each achieved by a line (backhaul line) 206 using a communication interface called "S1 interface".

Furthermore, the macro BSs 1a are connected to each other via a line (backhaul line) 207 using an inter-base-station communication interface called "X2 interface", which allows inter-base-station communication for direct information exchange between the base station devices. Further, the gateway 205 is also connected to the macro BS 1a via the line 207 using the X2 interface.

The X2 interface is provided for the purpose of exchanging information relating to mobility management, such as the position of each base station device, the distance to each base station device, and handover in each MS 2 that moves between the base station devices, and other information to be shared among the base station devices. Although such function of the X2 interface overlaps the function of the MME 203, the X2 interface for communication between the base station devices is provided for the following reasons. That is, if the MME 203 performs mobility management for all the MSs 2 connected to the respective macro BSs 1a, an enormous amount of processing concentrates on the MME 203. In addition, mobility management can be performed more efficiently among the base station devices.

A plurality of methods are considered for the inter-base-station communication via the X2 interface, such as a method in which the base station devices are directly connected, and a method in which the base station devices are connected via the gateway.

As shown in FIG. 19, a direct communication line via the X2 interface is not established between the femto BS1b and another base station device 1. Accordingly, the present embodiment adopts a method in which the femto BS 1b performs inter-base-station communication with the another base station device 1 by the X2 interface, via the communication line 206 using the S1 interface that connects the femto BS 1b to the gateway 205, and the gateway 205.

Note that, in FIG. 19, the macro BS 1a directly connected to the MME 203 may sometimes be referred to as "eNB (Evolved Node B)", the gateway 205 as "Home-eNB Gateway", and the femto BS 1b as "Home-eNB".

[5.1.2 Beam Forming Process]

Figure 20:
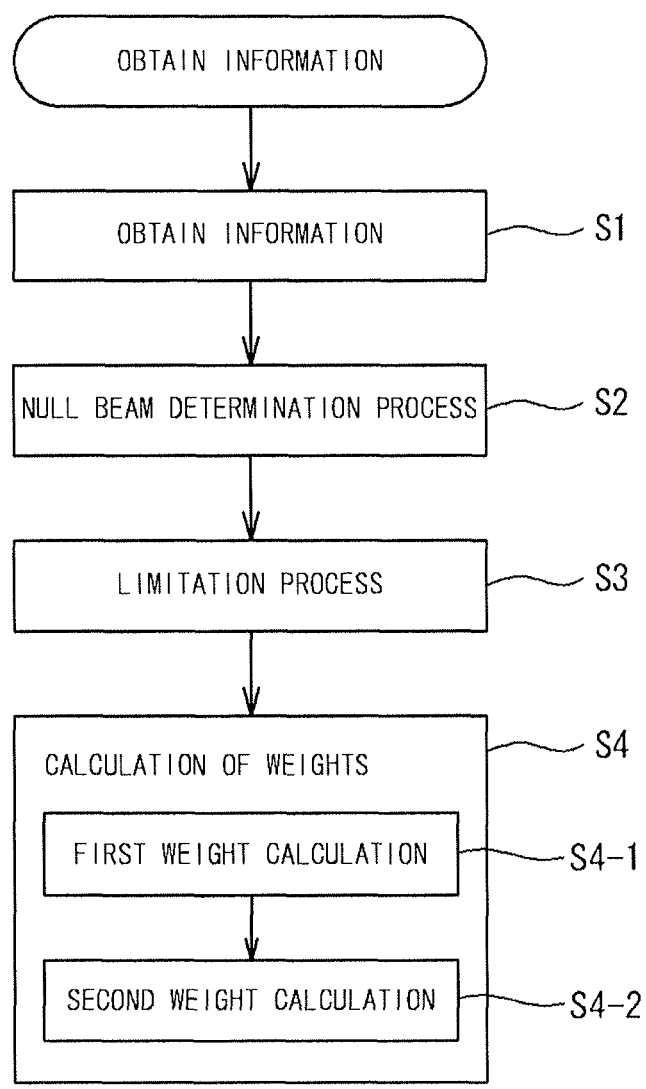
FIG. 20 is a flowchart showing a beam forming process.

FIG. 20 is a flowchart illustrating a beam forming process according to the second embodiment and embodiments described later. The process shown in FIG. 20 may be applied to the first embodiment.

Further, it is assumed that a base station device that performs the beam forming process described below is the femto BS 1b1 among the base station devices 1a1, 1a2, 1b1 and 1b2 shown in FIG. 19, and the remaining base station devices 1a1, 1a2 and 1b2 are other base station devices.

In step S1 in FIG. 20, information (distance information and the like) required for the beam forming process is obtained. The information obtained in step S1 will be described later.

Subsequently, in step S2 in FIG. 20, the null beam determination process is performed. In step S3, the limitation process is performed. Then, in step S4, the weight calculation is performed. In this way, the flow of the process in FIG. 20 is roughly identical to the flow of the process shown in FIG. 8. A difference between the process shown in FIG. 20 and the process shown in FIG. 8 will be described later.

[5.1.3 Beam Forming Using Distance Information]

Figure 21:
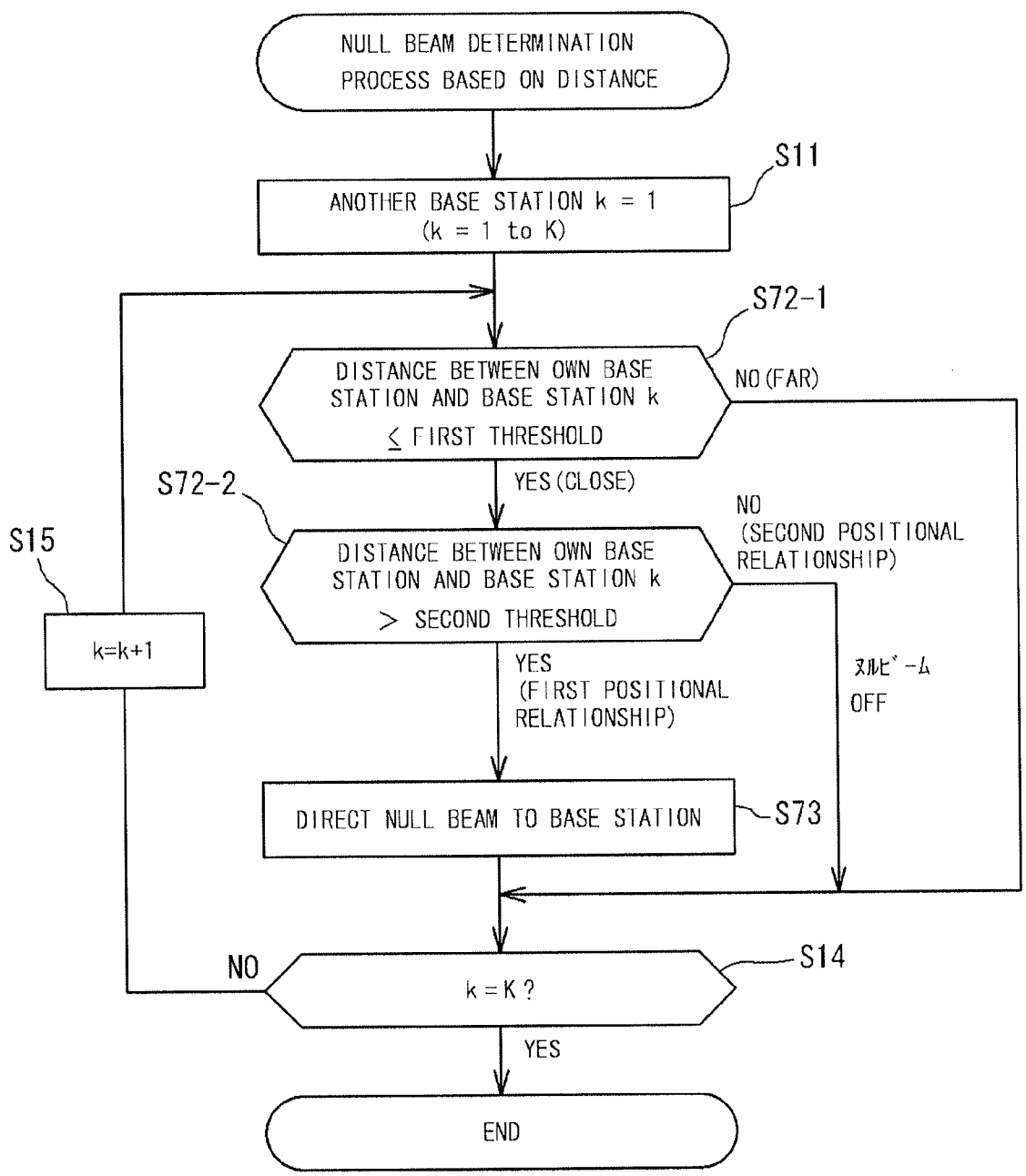
FIG. 21 is a flowchart showing a null beam determination process based on a distance.

FIG. 21 shows the process steps in the case where the null beam determination process in step S2 is performed by using information (distance information; determination information) indicating the distance between the base station device (femto BS) 1b1 and another base station device.

In the process shown in FIG. 21, based on distance information indicating the distance between each of a plurality of (K) other base station devices and the base station device 1b1, it is determined, for each of the other base station devices, whether a null beam should be directed to the base station device (steps S72-1, S72-2 and S73).

As shown in FIGS. 22 to 25, when a null beam is directed to another base station device (macro BS) 1a1, the interference suppression effect may vary depending on the positional relationship between the base station device (femto BS) 1b1 and the another base station device 1a1. In the null beam determination process shown in FIG. 21, it is determined whether a null beam should be directed, depending on this positional relationship.

Figure 22:
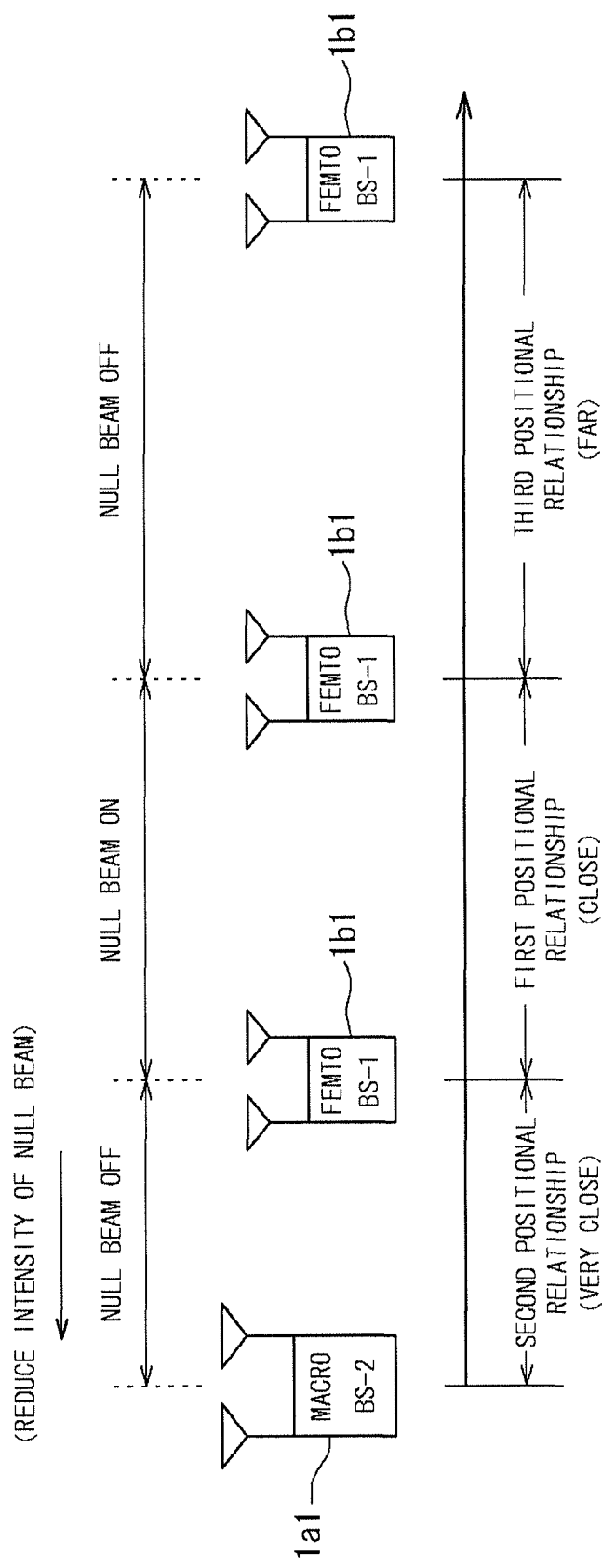
FIG. 22 is an explanatory diagram showing positional relationships among base station devices.

Here, as shown in FIG. 22, three positional relationships, i.e., a first positional relationship, a second positional relationship, and a third positional relationship, will be described as examples of the positional relationship between the base station device 1b1 and the another base station device 1a1.

Figure 23:
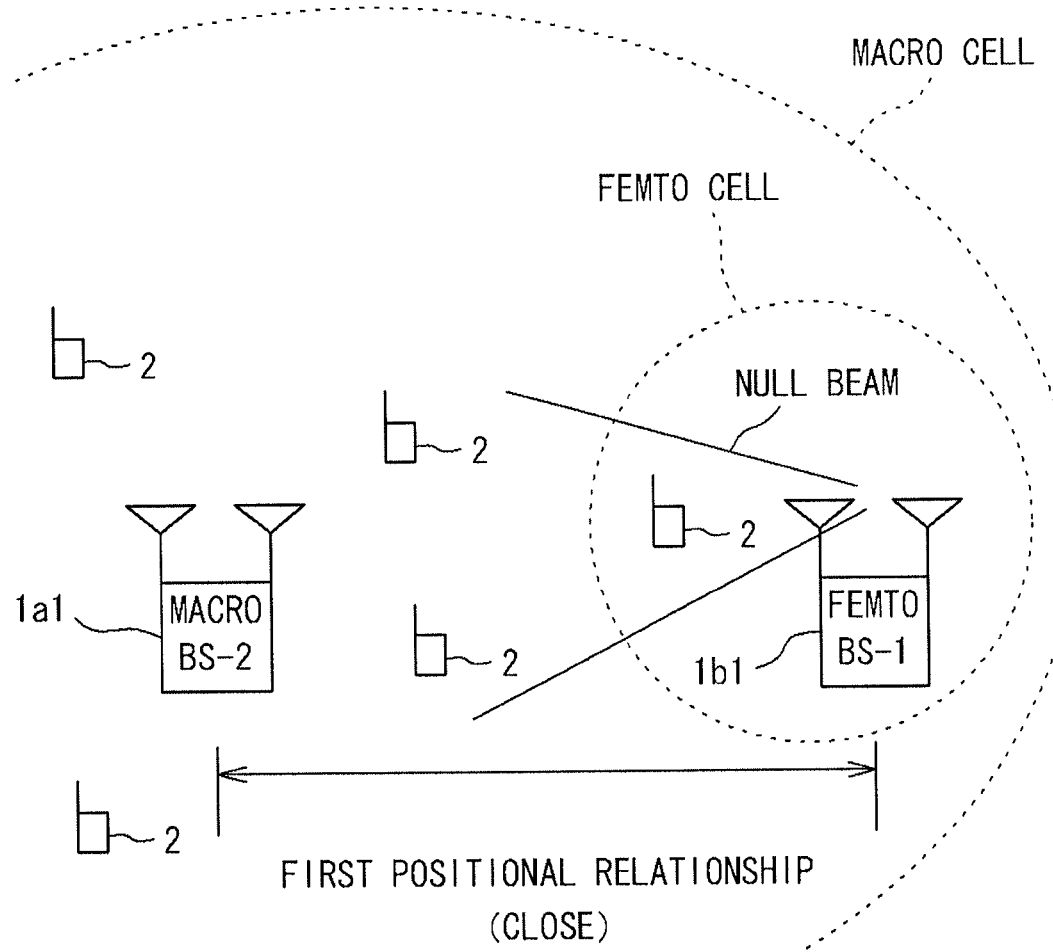
FIG. 23 is a diagram showing a first positional relationship.

In the first positional relationship, as shown in FIG. 23, a cell (femto cell) formed by the base station device 1b1 as a femto BS is set so as to overlap a cell (macro cell) formed by the another base station device 1a1 as a macro BS. Accordingly, interference is likely to occur in a terminal device 2 located between the base station devices 1b1 and 1a1. Accordingly, in the first positional relationship shown in FIG. 23, the base station devices 1b1 and 1a1 are close to each other to the extent that interference suppression is needed.

Figure 24:
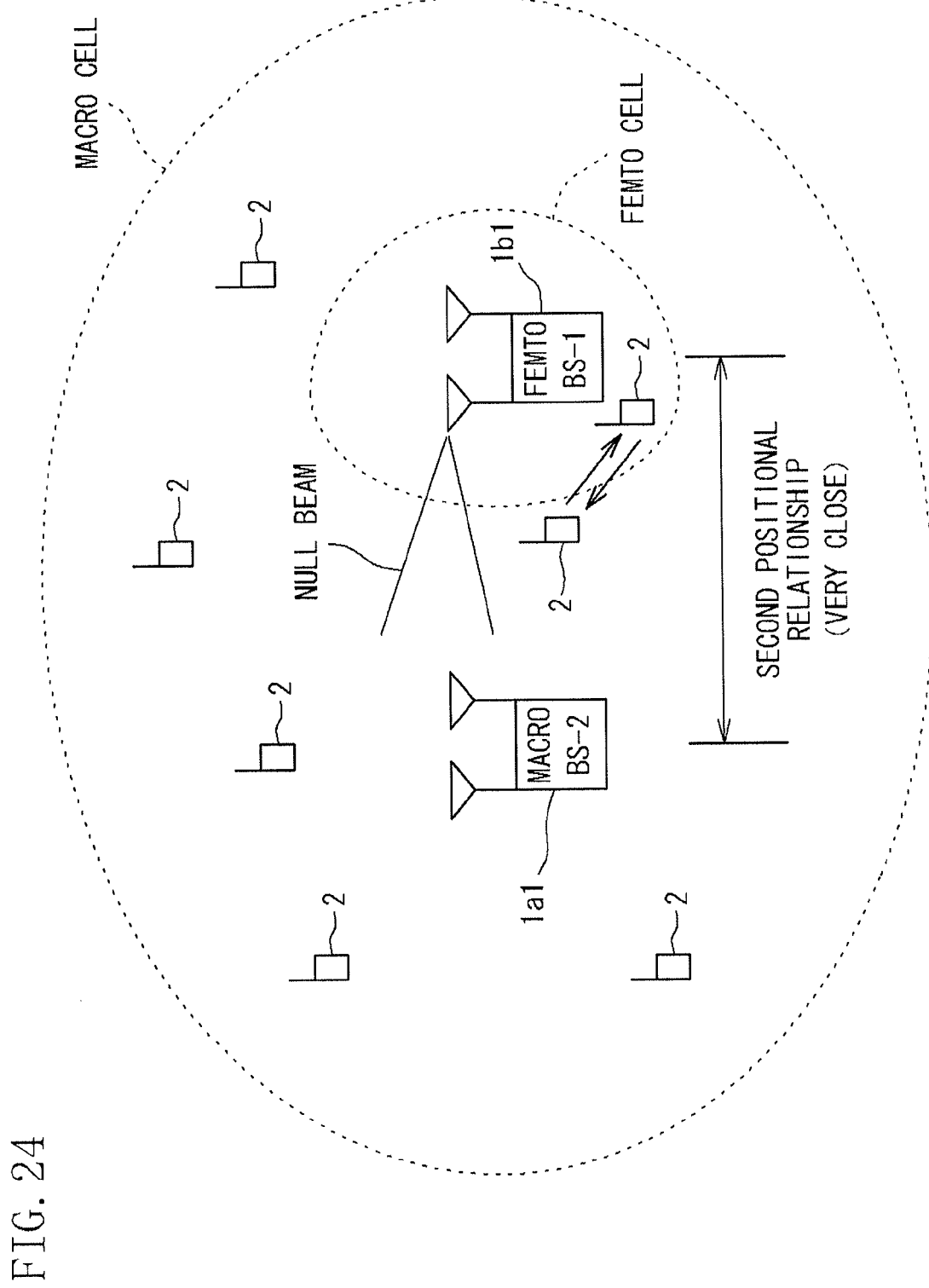
FIG. 24 is a diagram showing a second positional relationship.

In the second positional relationship shown in FIG. 24, the base station device 1b1 is closer to the another base station device 1a1 than in the first positional relationship. Accordingly, also in the second positional relationship shown in FIG. 24, the base station devices 1b1 and 1a1 are close to each other to the extent that interference suppression is needed.

Comparing the first positional relationship and the second positional relationship, the base station device 1b1 and the another base station device 1a1 are moderately separated from each other in the first positional relationship. Therefore, when a null beam is directed to the another base station device 1a1, the null beam is also directed to the terminal device 2 wirelessly connected to the another base station device 1a1. Accordingly, when the base station devices 1b1 and 1a1 are in the first positional relationship, the interference suppression effect to the terminal device 2 located near the another base station device 1a1 can be expected.

On the other hand, in the second positional relationship, the base station device 1b1 is too close to the another base station device 1a1. Therefore, even when a null beam is directed to the another base station device 1a1, the null beam is not directed to the terminal device 2 connected to the another base station device 1a1. Accordingly, in the second positional relationship, the interference suppression effect to the terminal device 2 near the another base station device 1a1 is lowered.

Figure 25:
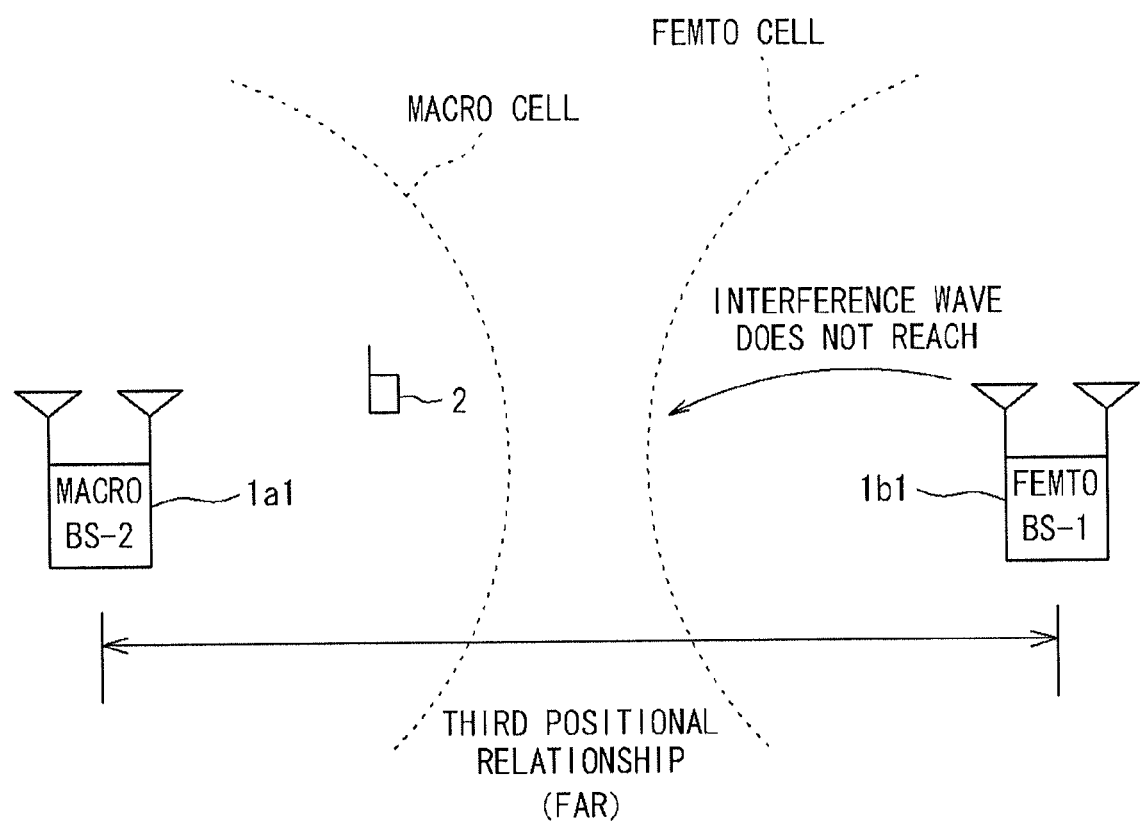
FIG. 25 is a diagram showing a third positional relationship.

Furthermore, in the third positional relationship, as shown in FIG. 25, the cell (femto cell) formed by the base station device 1b1 as a femto BS and the cell (macro cell) formed by the another base station device 1a1 as a macro BS are separated from each other (the macro cell and the femto cell may be somewhat overlapped). Therefore, the distance between the base station devices 1b1 and 1a1 is great, and interference is less likely to occur in the terminal device 2 located between the base station devices 1b1 and 1a1. Accordingly, in the third positional relationship shown in FIG. 25, the base station devices 1b1 and 1a1 are separated from each other to the extent that no interference suppression by a null beam is needed.

Steps S72-1, S72-2 and S73 shown in FIG. 21 utilize that the interference suppression effect by a null beam varies depending on the positional relationship as described above. Specifically, the base station device 1b1 obtains distance information from the another base station device k, and compares the distance indicated by the distance information with a first threshold (step S72-1). The distance information is obtained from a server, such as the MME 203, on the inter-base-station network, or from the another base station device 1a1 via the line 206 or the like. The distance information between base station devices has been set and stored in advance in the server, such as the MME 203, on the inter-base-station network. Alternatively, the another base station device 1a1 or the base station device 1b1 may calculate the distance information based on the positional information obtained from the GPS device contained in the base station device.

The first threshold used in step S72-1 is for determining whether the another base station device 1a1 is in the third positional relationship, i.e., whether the another base station device 1a1 is separated to the extent that interference suppression is not needed. When the distance to the another base station device 1a1 exceeds the first threshold (the third positional relationship), the another base station device 1a1 is excluded from the targets of null beams.

Note that the K pieces of base station devices considered in the null beam determination process may be surrounding base station devices the downlink signals from which can be received by the base station device 1b1, or base station devices included in a list of surrounding base station devices, which list has been prepared held by the base station device 1b1.

Note that when the K pieces of base station devices considered in the null beam determination process are limited to those the downlink signals from which can be received by the base station device 1b1, all the K pieces of base station devices may be regarded to be in the first positional relationship or the second positional relationship. In this case, step S72-1 can be skipped.

When it is determined in step S72-1 that the distance to the another base station device 1a1 is equal to or shorter than the first threshold, it is further determined whether the base station device 1b1 and the another base station device 1a1 are in the first positional relationship or the second positional relationship (step S72-2).

A second threshold used in step S72-2 is for determining whether the another base station device 1a1 is in the first positional relationship, i.e., whether the base station devices 1b1 and 1a1 are separated from each other to the extent that the effect of suppressing interference to the terminal device 2 is achieved by directing a null beam to the arrival direction of the downlink signal from the another base station device 1a1 (first positional relationship).

When the base station devices 1b1 and 1a1 are in the first positional relationship, the another base station device 1a1 is selected as a base station device to which a null beam should be directed (step S73). When the base station devices 1b1 and 1a1 are in the second positional relationship, the another base station device 1a1 is excluded from the targets of null beams.

The above-mentioned process is repeated for the K pieces of base station devices (steps S14 and S15), thereby determining all base station devices to which null beams should be directed.

[5.2 Beam Forming Using the Number of Times of Handover]

[5.2.1 When the Another Base Station Device is a Macro Base Station]

[5.2.1.1 Adjustment of Intensity of Null Beam]

Figure 26:
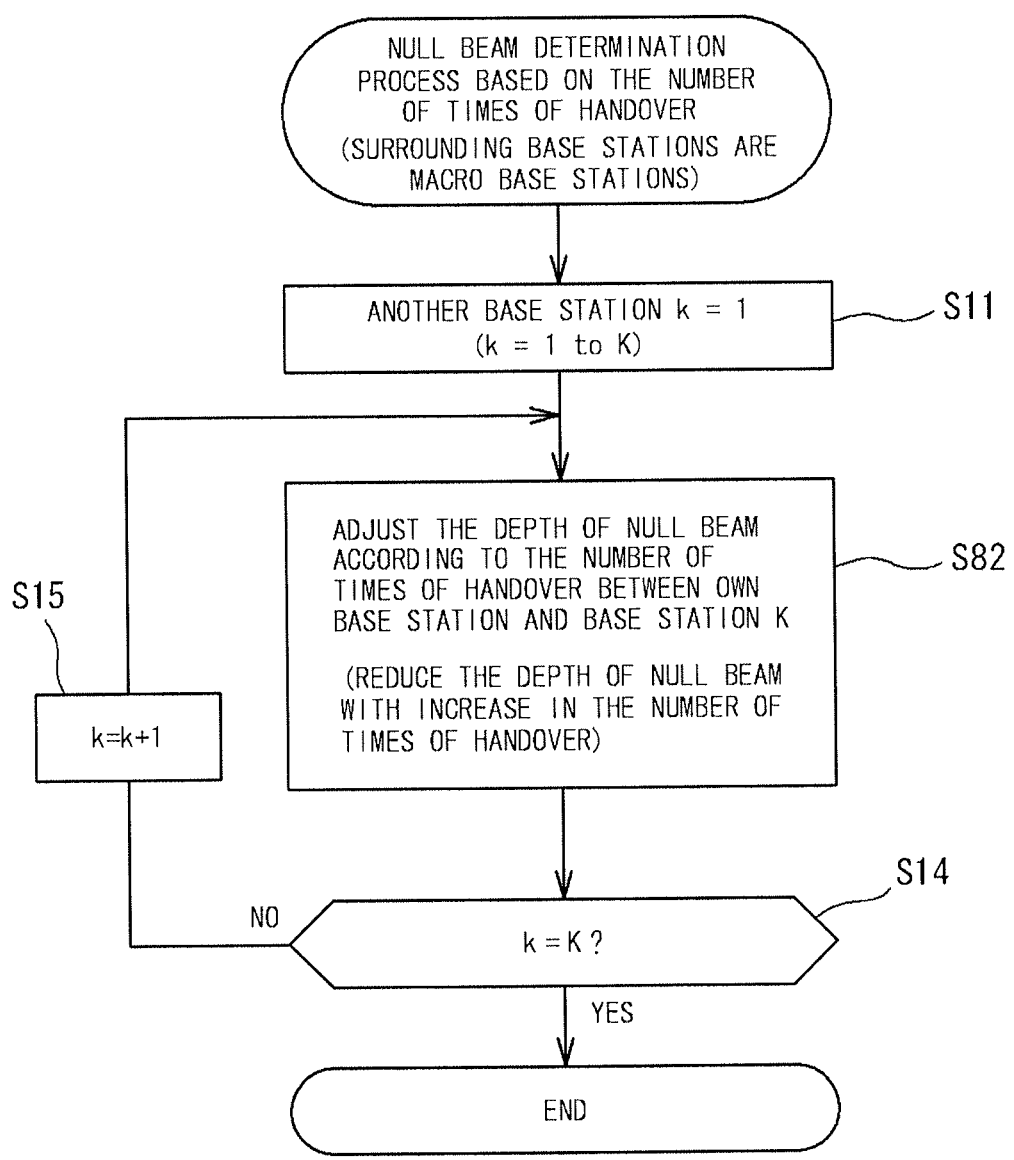
FIG. 26 is a flowchart showing a null beam determination process based on the number of times of handover.

FIG. 26 shows an example of a case where the null beam determination process (step S2) is performed by using the number of times of handover.

As shown in FIG. 24, in the second positional relationship in which the base station device 1b1 and the another base station device 1a1 are too close to each other, the size of the cell (femto cell) formed by the base station device 1b1 as a femto BS is substantially reduced. That is, even when the terminal device 2 is in the area where the radio wave from the base station device 1b1 reaches, if the terminal device 2 is located in a position where the power of the radio wave from the another base station device 1a1 as a macro BS is relatively great, the terminal device 2 tends to establish connection with the another base station device 1a1 as a macro BS. Therefore, the cell (femto cell) of the base station device 1b1 is substantially reduced. Such reduction in the substantial size of the cell of the base station device 1b1 causes an increase in the probability that the terminal device 2 existing near the base station device 1b1 comes in and out of the cell when it moves around the base station device 1b1, and thereby handover is likely to occur between the base station device 1b1 and the another base station device 1a1.

On the other hand, as shown in FIG. 23, when the base station devices 1b1 and 1a1 are sufficiently separated from each other, the size of the cell formed by the base station device 1b1 is less likely to be reduced. Therefore, even when the terminal device 2 existing near the base station device 1b1 moves around the base station device 1b1, the number of times of handover that occurs between the base station device 1b1 and the other base station device 1a1 becomes relatively small.

Accordingly, the number of times of handover is information whose value is influenced by the distance (positional relationship) between the base station devices 1b1 and 1a1. The positional relationship between the both base station devices is information that indirectly indicates the interference suppression effect.

So, in step S82 in FIG. 26, the depth of a null beam is adjusted in accordance with the number of times of handover between the base station device 1b1 and the another base station device 1a1. More specifically, the depth of a null beam is reduced (the intensity thereof is reduced) with an increase in the number of times of handover. That is, as the number of times of handover increases, the positional relationship between the base station devices 1b1 and 1a1 gets closer to the second positional relationship (FIG. 24) than the first positional relationship (FIG. 23), and thereby the interference suppression effect by directing the null beam to the another base station device 1a1 is reduced. Accordingly, it is preferable that the depth of the null beam to be directed to the another base station device 1a1 is reduced with an increase in the number of times of handover.

Figure 27:
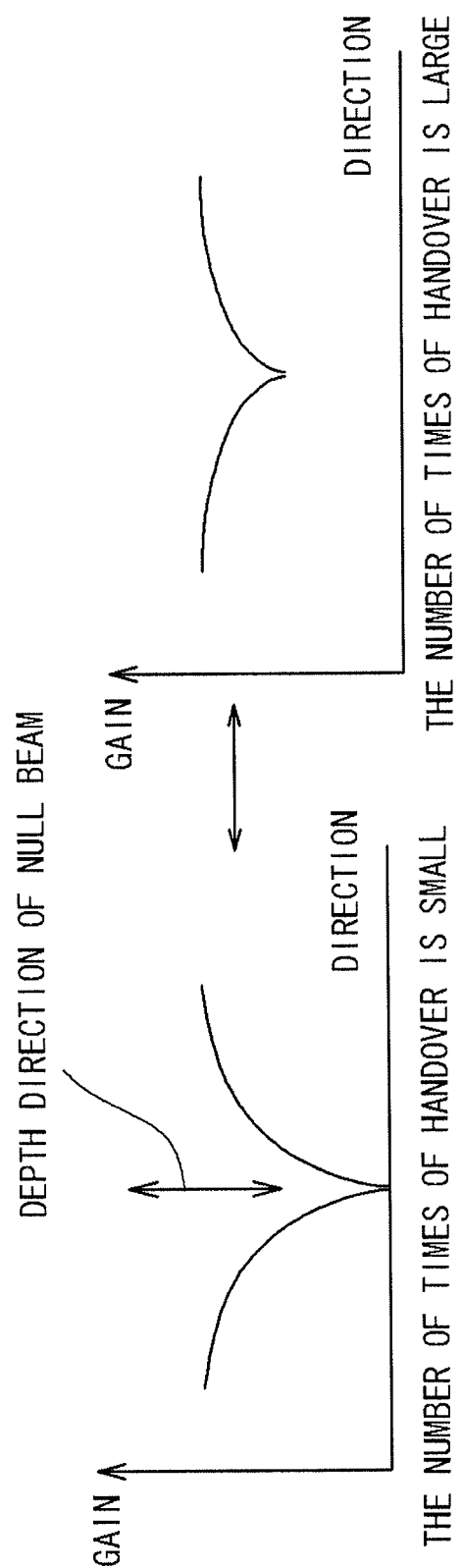
FIG. 27 is an explanatory diagram showing null-beam depth adjustment.

That is, when the number of times of handover is small, the depth of the null beam is increased as shown in FIG. 27(a). When the number of times of handover is great, the depth of the null beam is reduced as shown in FIG. 27(b). Note that it is preferable that the depth of the null beam is varied stepwise in accordance with the number of times of handover.

It is preferable that the determination in step S82 is performed based on the premise that the number of times of handover is not less than 1. In this case, if the number of times of handover is 0, it is determined that the base station devices 1b1 and 1a1 are in the third positional relationship, and the another base station device 1a1 is excluded from the base station devices to which null beams should be directed.

Hereinafter, a method for adjusting the depth of a null beam (weight control method) will be described. As described above, a weight vector W comprising weights $w_1, \ldots, w_L$ for directing a null beam toward each of (N−1) pieces of interference base stations is calculated by the following equation (A). In order to obtain the weight vector W based on equation (A), the following equation (B) is solved.

[Equation 3]

$$W = \begin{bmatrix} w_1 \\ \vdots \\ w_L \end{bmatrix} = H_1^*(HH^*)^{-1} \quad (A)$$

$$w_1 + w_2 z^{-1} + \ldots w_L z^{-1} = 0 \quad (B)$$

Figure 28:
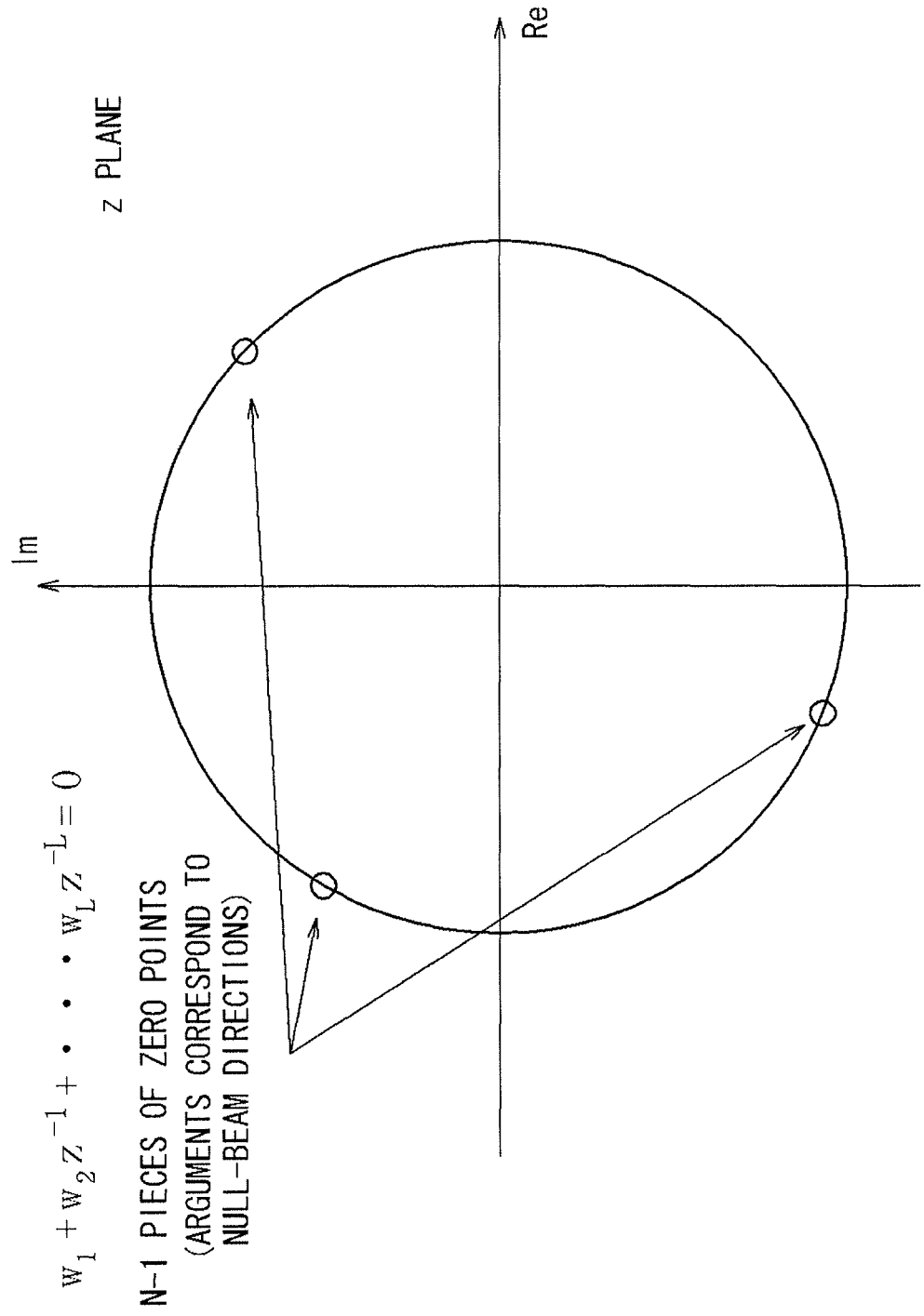
FIG. 28 is a diagram showing zero points on a z plane.

FIG. 28 shows N−1 pieces of zero points (null beams each having a gain of zero) obtained when beam forming is performed based on the weights $w_1, \ldots, W_L$ obtained by equation (B). In FIG. 28, the zero points are present on a unit circle in a z plane (complex plane).

Figure 29:
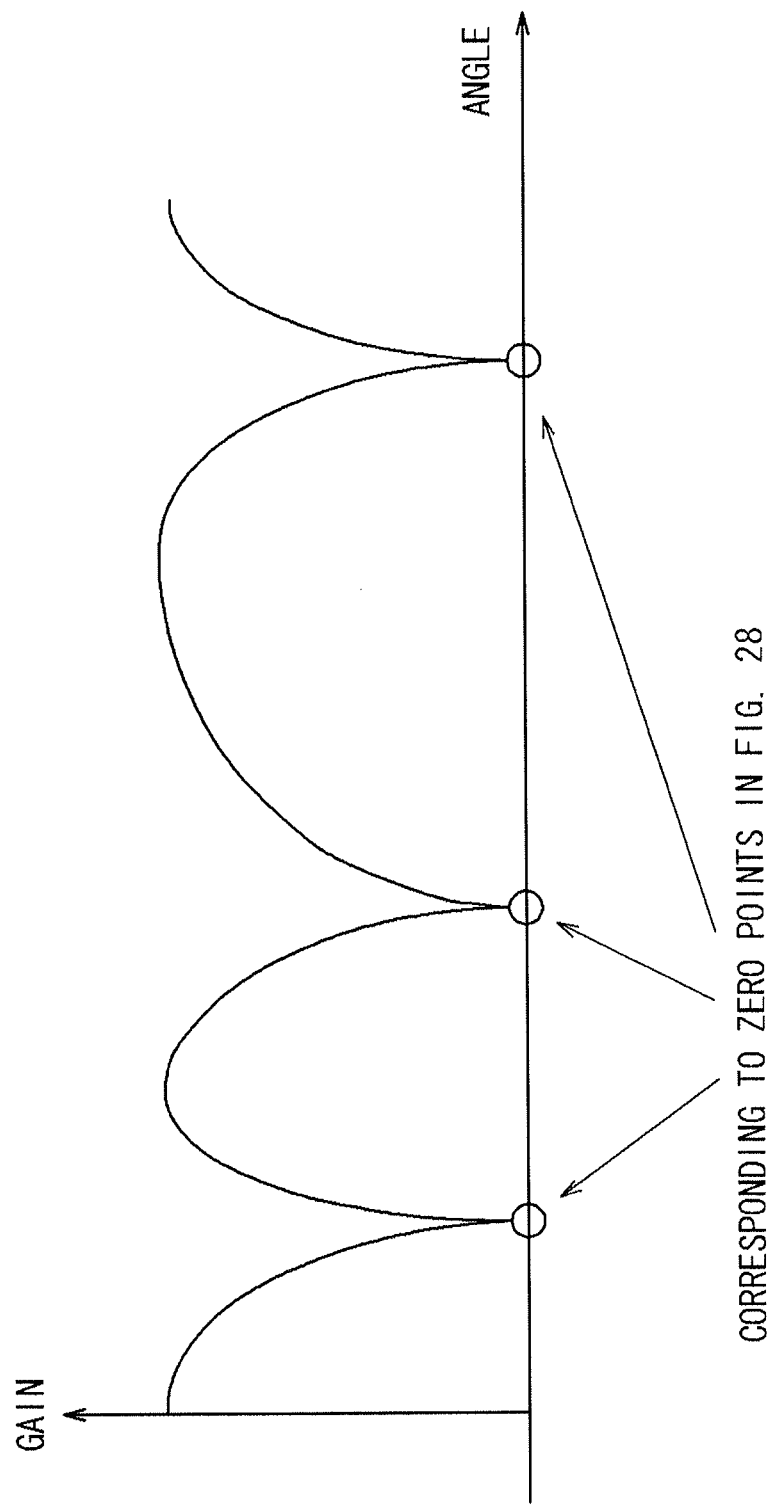
FIG. 29 is a diagram showing a beam in which null beams each having a gain of zero are formed.

FIG. 29 shows the relationship between the angle and the gain on a horizontal plane viewed from the base station device 1b1, and shows the N−1 pieces of zero points corresponding to those shown in FIG. 28.

Figure 30:
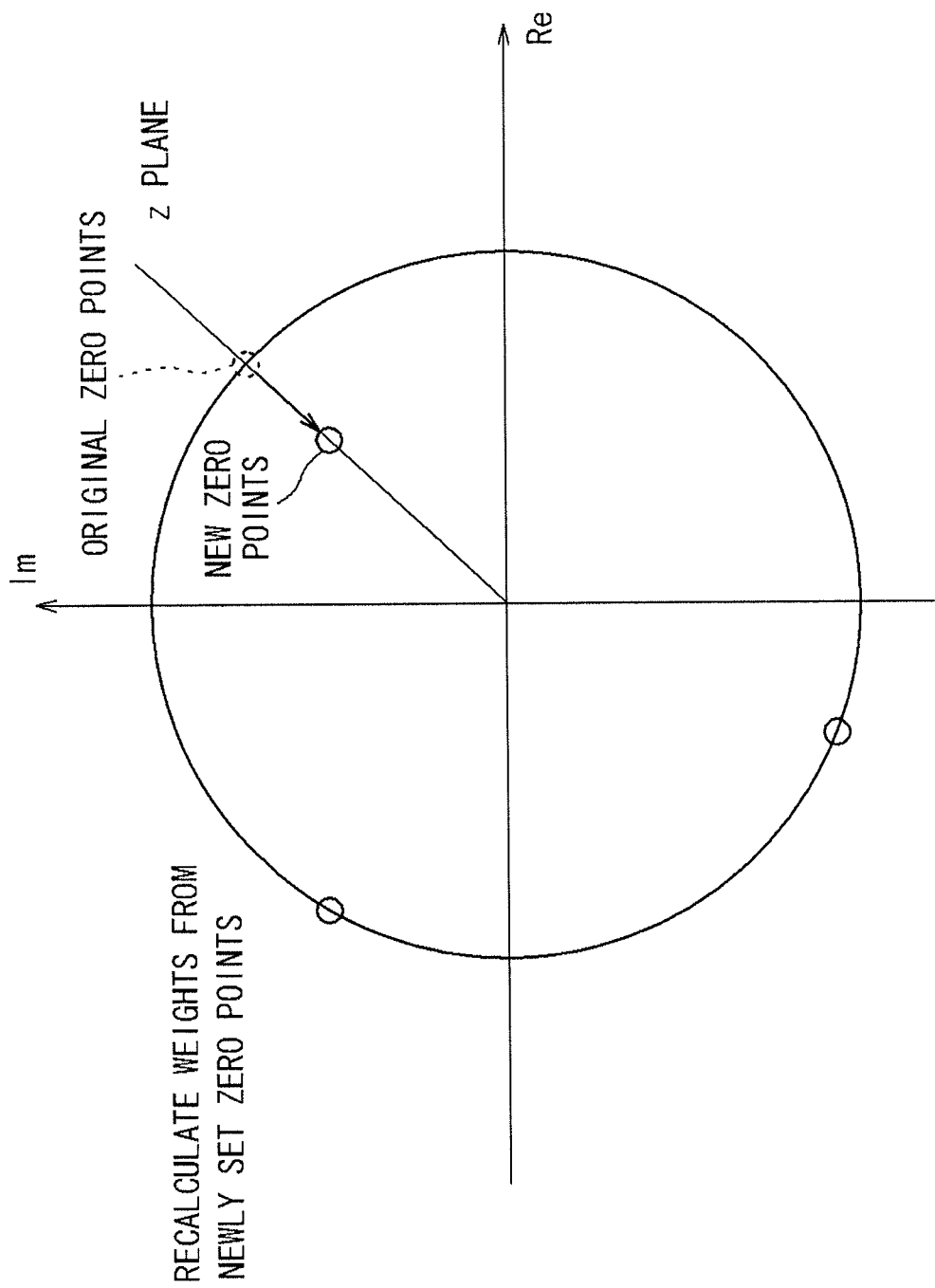
FIG. 30 is a diagram showing a new zero point set on the z plane

In order to reduce the depth of a null beam, as shown in FIG. 30, a new zero point ("new zero point" shown in FIG. 30) is set by reducing the absolute value of a zero point ("original zero point" shown in FIG. 30) whose depth is desired to be reduced. Then, weights $w'_1, \ldots, w'_L$ are recalculated so as to obtain the "new zero point".

In step S4 in FIG. 20, a first weight calculation (step S4-1) and a second weight calculation (step S4-2) show the above-mentioned procedure.

That is, in order to obtain weights for forming a beam in which the depth of a null beam is adjusted, firstly, weights $w'_1, \ldots, w'_L$ for forming null beams each having a gain of zero are calculated for all the zero points (step S4-1; the first weight calculation).

Then, equation (B) is factorized by using the weights $w'_1, \ldots, w'_L$ obtained by the first weight calculation, thereby obtaining the following equation (C).

[Equation 4]

$$A(z-a_1)(z-a_2) \ldots (z-a_L) = 0 \quad (C)$$
$$\Downarrow$$
$$A(z-a'_1)(z-a_2) \ldots (z-a_L) = 0 \quad (D)$$
$$\Downarrow$$
$$w'_1 + w'_2 z^{-1} + \ldots w'_L z^{-L} = 0 \quad (E)$$

In equation (C), $a_1, a_2, \ldots, a_L$ represent the absolute values of the zero points (original zero points) shown in FIG. 28. In order to reduce the depth of a null beam of a certain zero point, the absolute value ($a_1$ in the case of equation (C)) of the zero point is set to a smaller value $a'_1$, thereby obtaining equation (D).

Figure 31:
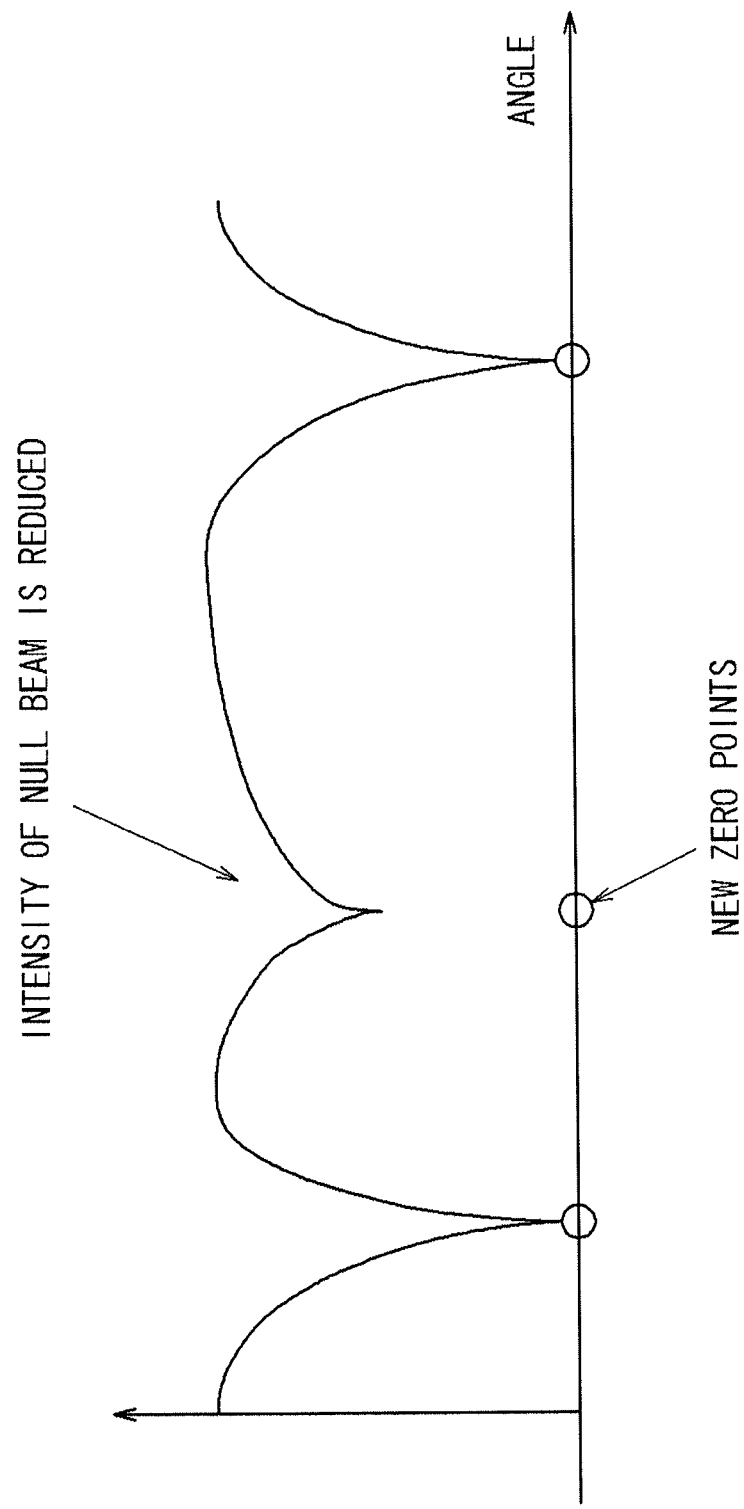
FIG. 31 is a diagram showing a beam in which the intensity of a null beam is reduced.

Then, equation (D) is developed again to obtain equation (E) in the same form as equation (B). The second weight calculation is performed in which equation (E) is calculated in the same manner as the above-mentioned first weight calculation, thereby forming a beam in which the depth of the null beam of the desired zero point is reduced. FIG. 31 shows a gain in the case where the depth of the null beam is thus adjusted. In FIG. 31, beams directed to a plurality of other base station devices are suppressed, and the degree of the suppression varies among the other base station devices.

[5.2.1.2 ON/OFF of Null Beam]

Figure 32:
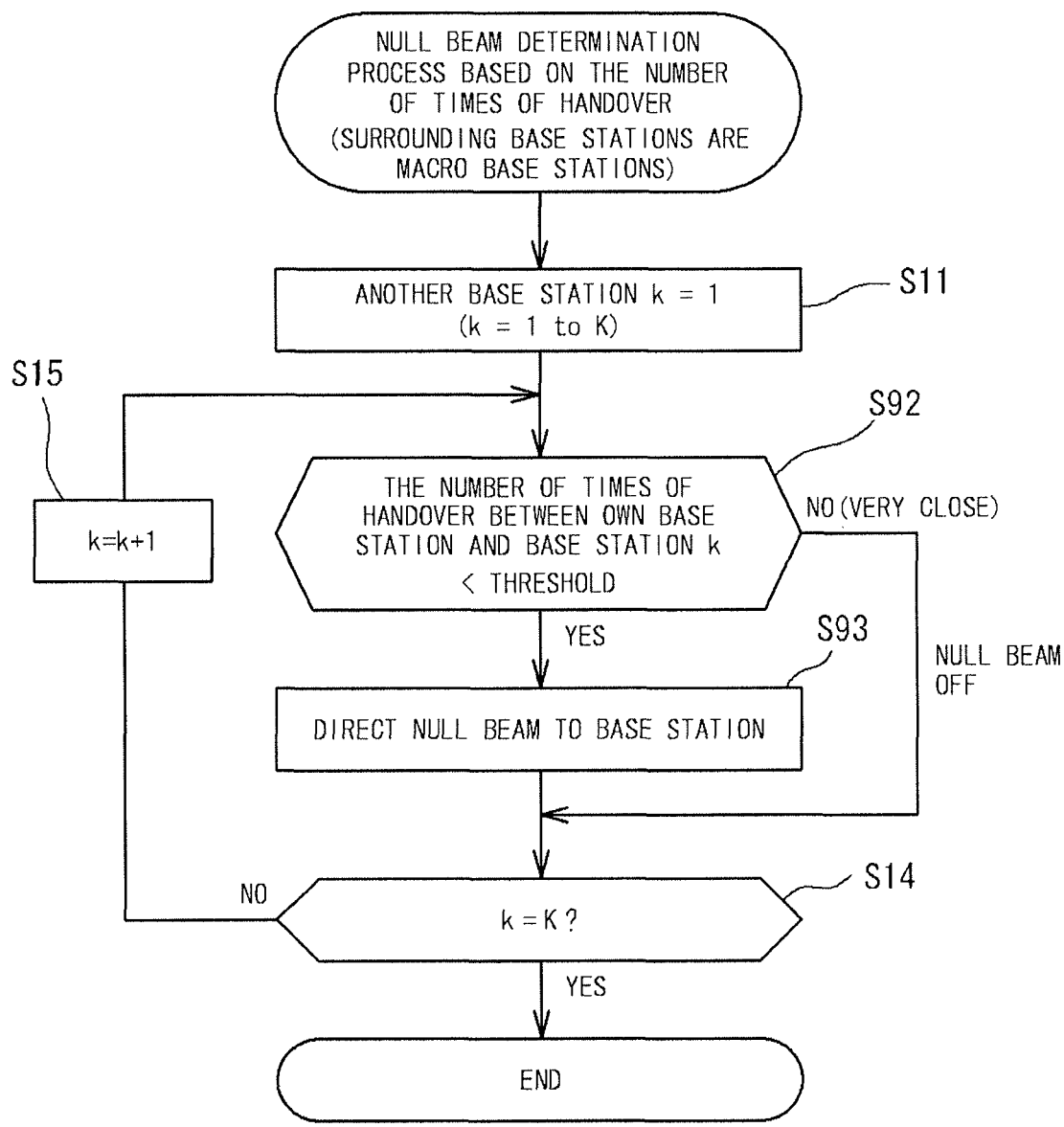
FIG. 32 is a flowchart showing a null beam determination process based on the number of times of handover.

FIG. 32 shows another example of the null beam determination process (step S2) shown in FIG. 20 performed by using the number of times of handover. In FIG. 32, the number of times of handover is not used for adjusting the depth of a null beam but is used for ON/OFF switching of a null beam.

That is, in step S92 in FIG. 32, the number of times of handover between the base station device 1b1 and the another base station device 1a1 is compared with a threshold. The threshold used in step S92 is for determining whether the positional relationship between the base station device 1b1 and the another base station device 1a1 is the first positional relationship. Upon determining in step S92 that the number of times of handover between the base station device 1b1 and the another base station device 1a1 is smaller than the threshold, the base station devices 1b1 and 1a1 are regarded as being in the first positional relationship, and the another base station device 1a1 is selected as a base station device to which a null beam should be directed.

On the other hand, upon determining in step S92 that the number of times of handover between the base station device 1b1 and the another base station device 1a1 is equal to or larger than the threshold, the base station devices 1b1 and 1a1 are regarded as being in the second positional relationship, and the another base station device 1a1 is excluded from base station devices to which null beams should be directed.

It is preferable that the determination in step S92 is based on the premise that the number of times of handover is not less than 1. In this case, if the number of times of handover is 0, it is determined that the base station devices 1b1 and 1a1 are in the third positional relationship, and the another base station device 1a1 is excluded from base station devices to which null beams should be directed.

[5.2.1.3 Obtainment of the Number of Times of Handover and the Like]

Figure 33:
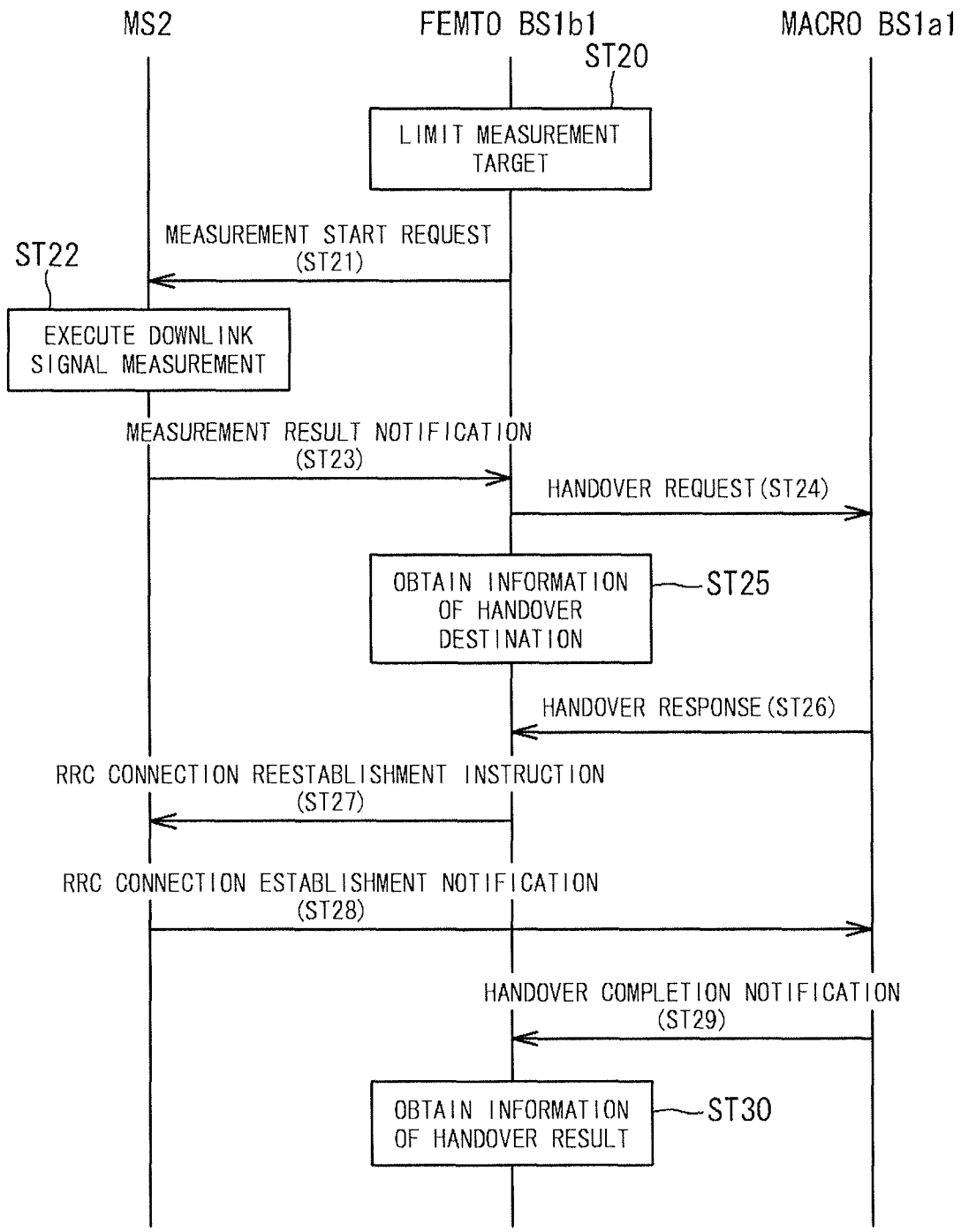
FIG. 33 is a flowchart showing a handover process.

Hereinafter, a description will be given of a process of obtaining, by the base station device 1b1, information (handover information) indicating the number of times of handover and the like. FIG. 33 is a sequential diagram showing an example of a manner in which the femto BS 1b1 obtains handover information during the handover process performed between the femto BS 1b1 and the terminal device (MS) 2.

First, the femto BS 1b1 sets a measurement target to be measured by the MS 2 (step ST20). Here, the femto BS 1b1 sets, as a measurement target, a downlink signal of another base station device 1 that is registered in adjacent cell information. The adjacent cell information is a list of base station devices located in the vicinity of the base station device 1b1. The adjacent cell information can be detected by radio-wave measurement by the MS 2, or can be obtained from a server such as the MME 203 on the network.

Next, the femto BS 1b1 transmits, to the MS 2, a measurement start request for causing the MS 2 to measure the downlink signal that is the set measurement target (step ST21). The measurement start request includes the frequency to be measured, information of the corresponding base station device, and the like.

Next, the MS 2 receives the measurement start request from the femto BS 1b1, and executes downlink-signal measurement for the measurement target indicated by the measurement start request (step ST22).

After the downlink-signal measurement, the MS 2 transmits, as a result of the measurement, to the femto BS 1b1, a measurement result notification including the reception level of the detected downlink signal and the corresponding cell ID (step ST23). Further, at this time, the MS 2 also transmits, to the femto BS 1b1, the reception level of the downlink signal of the femto BS 1b1.

Upon receipt of the measurement result notification from the MS 2, the femto BS 1b1 determines, based on the measurement result notification, whether the MS 2 should perform handover. Upon determining that the MS 2 should perform handover, the femto BS 1b1 determines a handover destination with reference to the adjacent cell information, and transmits a handover request to the macro BS 1a1 (step ST24). In FIG. 33, the macro BS 1a1 is determined as the handover destination.

The determination whether to perform handover and the determination of the handover destination are performed by comparing the reception level of the downlink signal of the currently-connected base station device 1b1 with the reception level of the another base station device 1a1.

Furthermore, the determination whether to perform handover and the determination of the handover destination may be performed by the MS 2. In this case, the femto BS 1b1 transmits a handover request in accordance with the determinations by the MS 2.

By transmitting the handover request, the femto BS 1b1 can recognize to which base station device 1 the MS 2 has tried handover. That is, the beam forming processing unit 5a of the femto BS 1b1 is informed that the MS 2 has tried handover, and obtains information relating to the determined handover destination (step ST25).

Upon receipt of the handover request, the macro BS 1a1 transmits, to the femto BS1b1, a handover response to the handover request (step ST26).

Upon receipt of the handover response, the femto BS 1b1 transmits an RRC connection reestablishment instruction to the MS 2 (step ST27).

When an RRC connection is established between the MS 2 and the macro BS 1a1, the MS 2 transmits an RRC connection establishment notification to the macro BS 1a1 (step ST28).

Upon receipt of the RRC connection establishment notification, the macro BS 1a1 transmits a handover completion notification to the femto BS 1b1 (step ST29).

Upon receipt of the handover completion notification, the femto BS 1b1 releases the information relating to the MS 2, and ends the handover. Further, by receiving the handover completion notification, the femto BS 1b1 can recognize that the handover has succeeded. At this time, the beam forming processing unit 5a of the femto BS 1b1 obtains information relating to the result of the handover (step ST30).

If the handover has failed, the macro BS 1a1 transmits a handover failure notification in step ST29.

The transmission/reception of the handover request, the handover response, and the handover completion notification between the femto BS 1b1 and the macro BS 1a1 are performed via a superordinate device such as the MME 203 and the gateway 205, but may be performed by inter-base-station communication via the X2 interface.

Based on the information that handover has been tried, the information relating to the determined handover destination, and the information relating to the handover result, which have been obtained in steps ST25 and ST30, the beam forming processing unit 5a obtains the number of trials of handover, the number of successes of handover (=the number of times of handover), and the handover success rate, which are handover information of each another base station device 1a1. The handover success rate is obtained by diving the number of successes of handover by the number of trials of handover.

[5.2.2 A Case where Another Base Station Device is a Femto Base Station]

[5.2.2.1 Adjustment of Intensity of Null Beam]

The description in the above chapter [5.2.1 A case where another base station device is a macro base station] refers to the case where the base station devices surrounding the base station device 1b1 are only macro BSs. Hereinafter, a description will be given of a case where the base station devices surrounding the base station device 1b1 are only femto BSs (small base station devices).

When the another base station device 1a1 is a macro BS, an inclusion relationship that the cell of the base station device 1b1 is located in the macro cell as shown in FIGS. 23 and 24 is often obtained.

Figure 34:
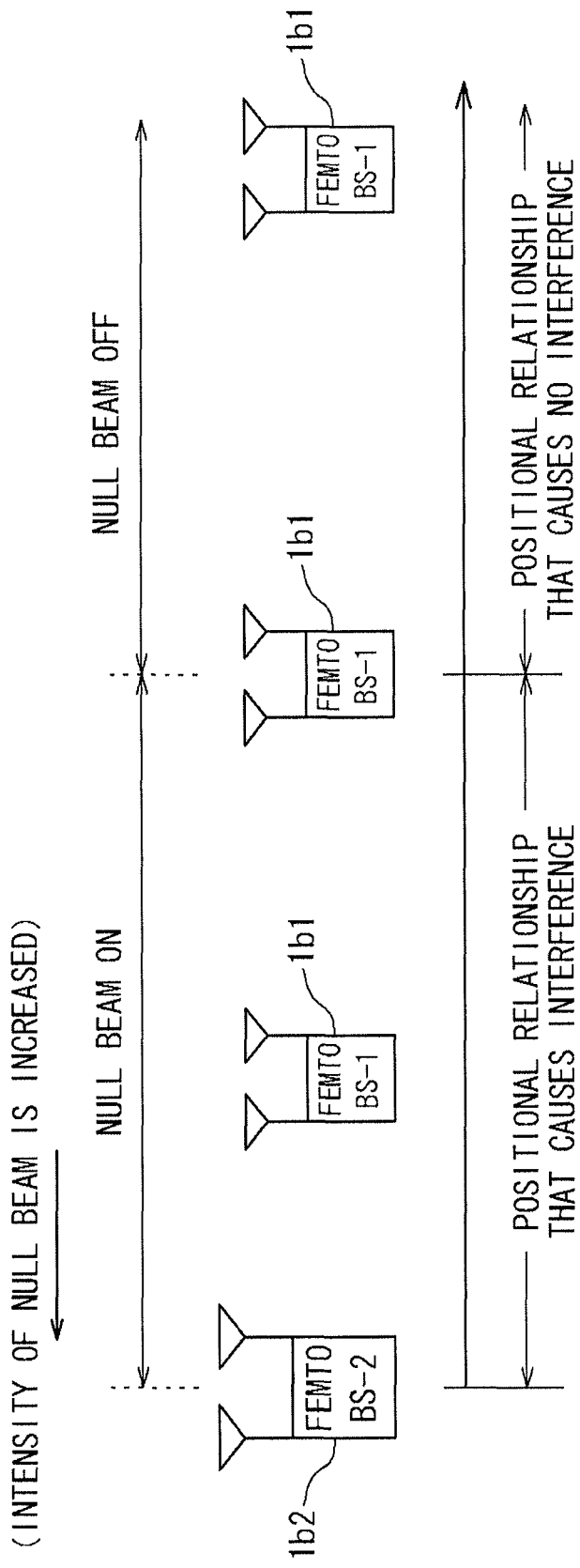
FIG. 34 is a diagram showing positional relationships among base station devices.
Figure 35:
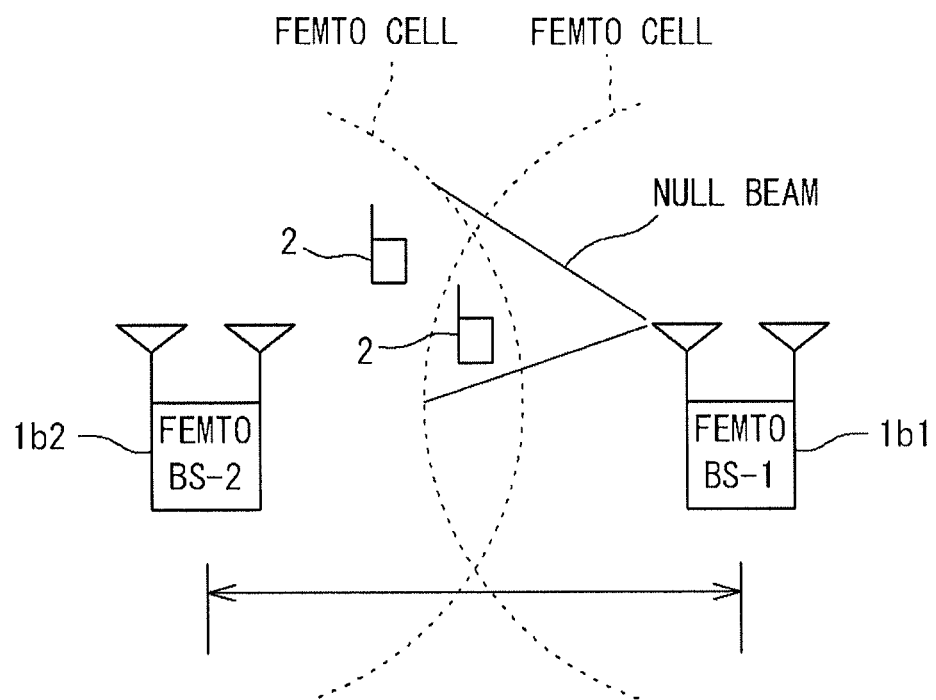
FIG. 35 is a diagram showing a positional relationship that can cause interference.
Figure 36:
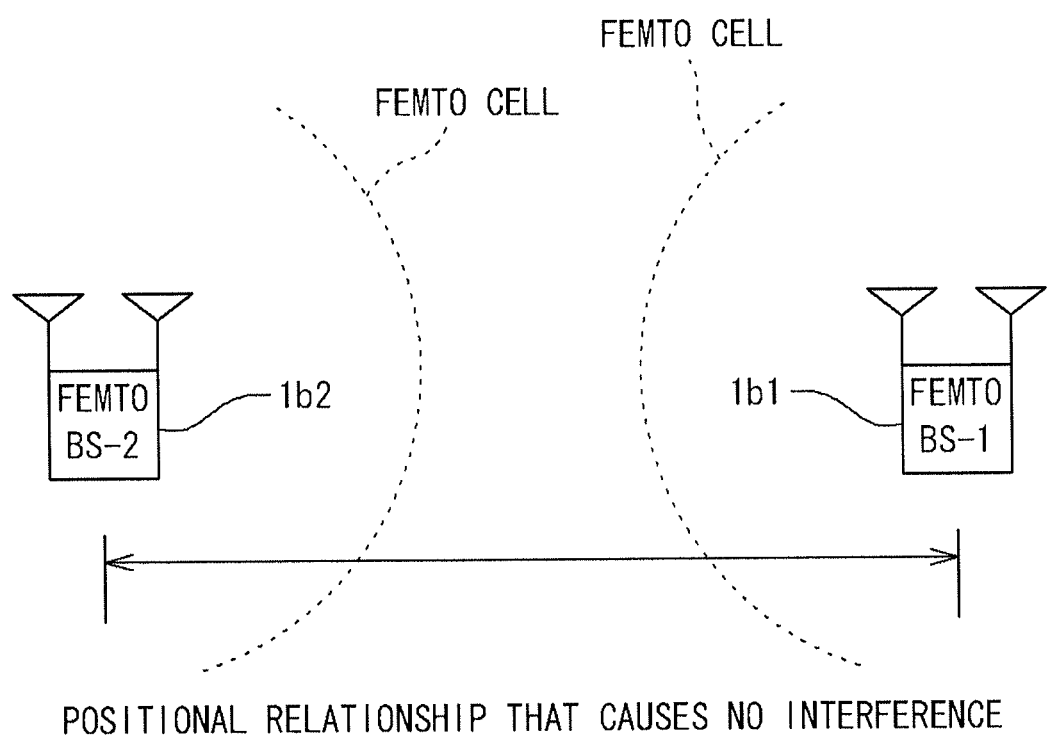
FIG. 36 is a diagram showing a positional relationship that never cause interference.

On the other hand, as shown in FIGS. 34 to 36, when the another base station device is a femto BS 1b2, the cell of the base station device 1b1 and the cell of the base station device 1a1 are less likely to be in the inclusion relationship, although the cells may partially overlap each other. That is, between the femto BSs 1b1 and 1b2, their cells partially overlap each other as shown in FIG. 35, or are separated from each other as shown in FIG. 36.

Figure 37:
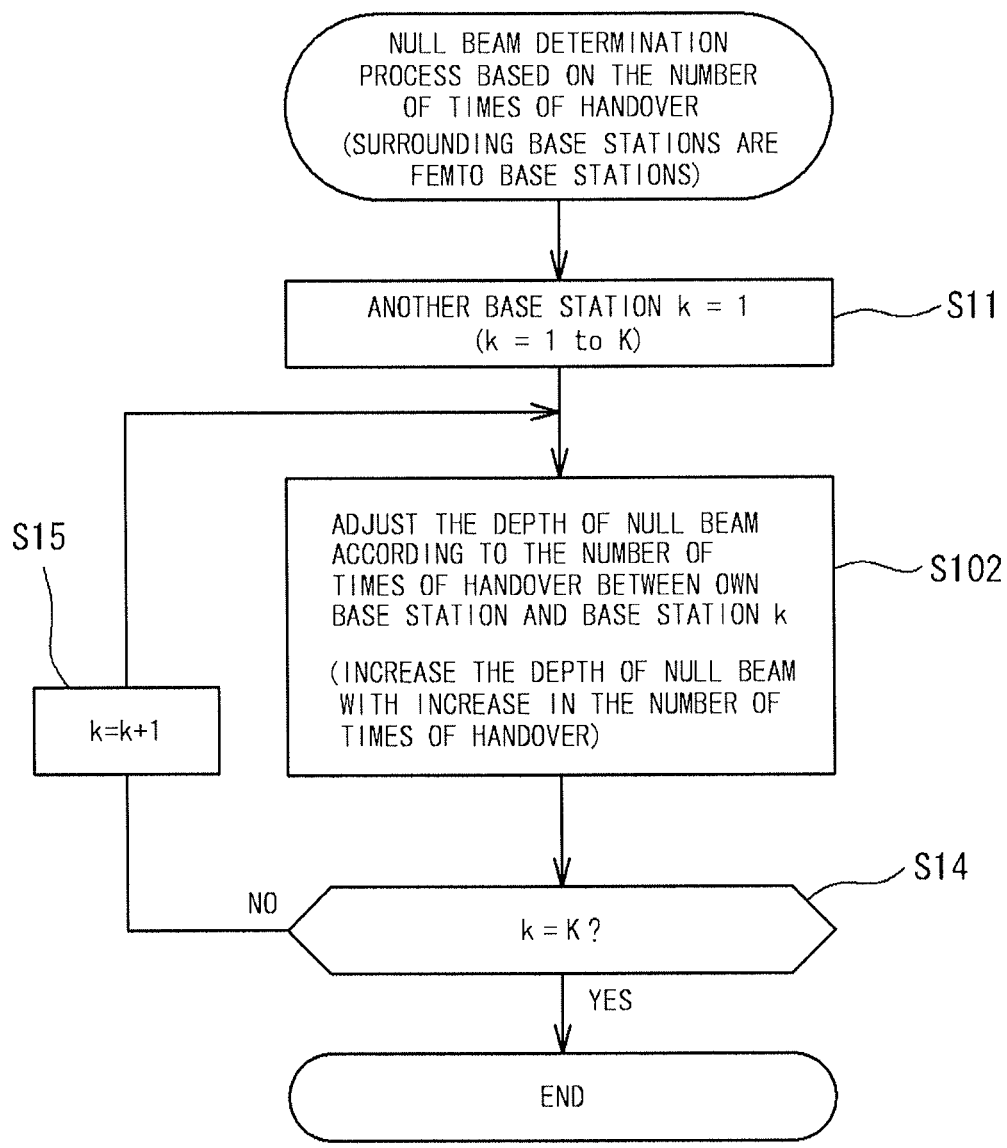
FIG. 37 is a flowchart showing a null beam determination process based on the number of times of handover.

So, when the another base station device is a femto BS, it is preferable that the null beam determination process in step S2 in FIG. 20 is performed as shown in FIG. 37.

In step S102 in FIG. 37, like step S82 in FIG. 26, the depth of a null beam is adjusted in accordance with the number of times of handover between the base station device 1b1 and the another base station device 1a1. In step S102 in FIG. 37, however, the depth of the null beam is increased (the intensity of the null beam is increased) with an increase in the number of times of handover. That is, between the femto BSs, as the base station devices 1b1 and 1b2 get closer to each other, the interference suppression effect by directing the null beam to the another base station device 1a1 is increased. Accordingly, it is preferable that the depth of the null beam to be directed to the another base station device 1a1 is increased with an increase in the number of times of handover.

[5.2.2.2 ON/OFF of Null Beam]

Figure 38:
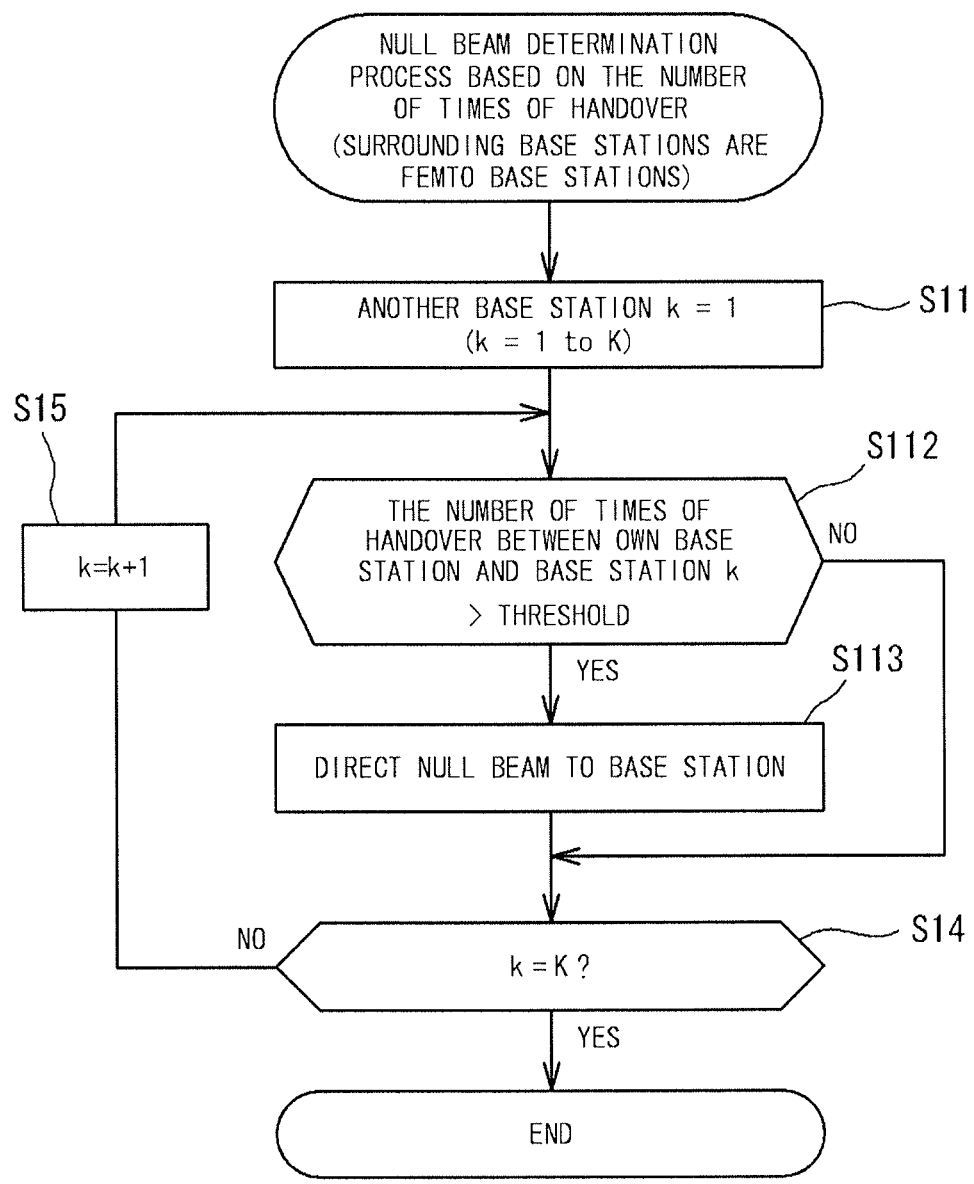
FIG. 38 is a flowchart showing a null beam determination process based on the number of times of handover.

FIG. 38 shows an example in which the number of times of handover is used for ON/OFF switching of a null beam, in the case where the base station devices surrounding the base station device 1b1 are only femto BSs (small base station devices).

That is, in step S112 shown in FIG. 38, the number of times of handover between the base station device 1b1 and the another base station device 1b2 is compared with a threshold. The threshold used in step S112 is for determining whether the base station device 1b1 and the another base station device 1b2 are close to each other to the extent that interference occurs. Upon determining in step S112 that the number of times of handover between the base station device 1b1 and the another base station device 1b2 is larger than the threshold, the BSs 1b1 and 1b2 are determined to be sufficiently close to each other, and the another base station device 1b2 is selected as a base station device to which a null beam should be directed.

On the other hand, when determining in step S112 that the number of times of handover between the base station device 1b1 and the another base station device 1b2 is smaller than the threshold, the base station devices 1b1 and 1b2 are determined to be far from each other, and the another base station device 1b2 is excluded from base station devices to which null beams should be directed.

[5.2.3 A Case where Surrounding Base Station Devices are Macro Base Station Devices and Femto Base Station Devices]

[5.2.3.1 Adjustment of Intensity of Null Beam]

Figure 39:
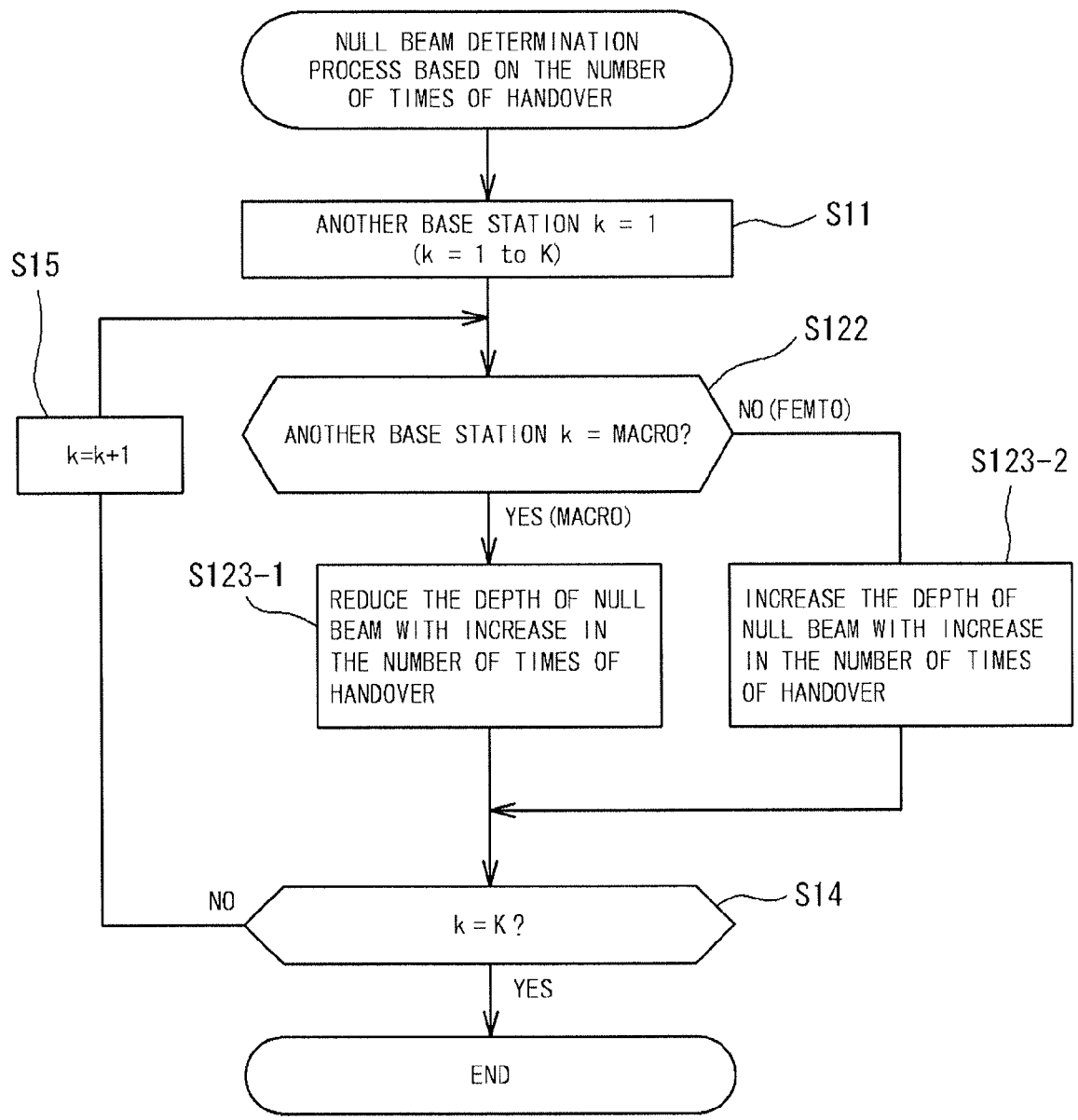
FIG. 39 is a flowchart showing a null beam determination process based on the number of times of handover.

FIG. 39 shows a manner of using the number of times of handover, in a case where both macro BSs 1a1 and femto BSs 1b2 exist around the base station device 1b1.

In FIG. 39, it is determined in step S122 whether the another base station device is a macro BS or a femto BS. Information indicating whether the another base station device is a macro BS or a femto BS (small base station) is obtained from a server such as the MME 203 on the inter-base-station network, or from the another base station device.

Upon determining in step S122 that the another base station device k is a macro BS, the depth of a null beam is reduced with an increase in the number of times of handover. This reduction in the depth of the null beam is based on the same reason as that in step S82 in FIG. 26.

On the other hand, when determining in step S122 that the another base station device k is a femto BS, the depth of the null beam is increased with an increase in the number of times of handover. This increase in the depth of the null beam is based on the same reason as that in step S102 in FIG. 37.

According to the process in FIG. 39, even when macro BSs and femto BSs coexist around the base station device 1b1, the depth of the null beam can be appropriately adjusted.

[5.2.3.2 ON/OFF of Null Beam]

ON/OFF switching of a null beam may be performed in addition to varying the manner of adjusting a null beam depending on whether the type of a base station device is macro or femto as shown in FIG. 39.

That is, steps S92 and S93 in FIG. 32 may be executed in step S123-1 in FIG. 39, and steps S112 and S113 in FIG. 38 may be executed in step S123-2 in FIG. 39.

[5.3 Use of Information Relating to Positional Relationship Other than the Number of Times of Handover]

[5.3.1 Time of Stay]

As information whose value is influenced by the positional relationship between the own base station device and another base station device, a time of stay (an average value or the like) in which a terminal device connected to the own base station device stays in the cell of the own base station device may be used in addition to the number of times of handover. The time of stay is a time interval (t2-t1) from time t1 at which handover has been performed to connect a terminal device to the own base station device to time t2 at which handover is performed to connect the terminal device to another base station device. The shorter the time of stay is, the more frequently handover is performed. So, the brevity of the time of stay serves as an index similar to the frequency of the number of times of handover. That is, the time of stay is information whose value is influenced by the number of times of handover.

The time of stay may be a time during which a terminal device stays in another cell adjacent to the cell of the own base station device. That is, the time of stay may be a time interval from time t1 at which handover has been performed to change connection of the terminal device from the own base station device to first another base station device, to time t2 at which handover is performed to change connection of the terminal device from the first another base station device to second another base station device or the own base station device (i.e., the time of stay within the cell of the first another base station device).

Alternatively, the time of stay may be a time interval from time t1 at which handover has been performed to change connection of the terminal device from the first another base station device to the second another base station device, to time t2 at which handover is performed to change connection of the terminal device from the first another base station device to the own base station device (i.e., the time of stay within the cell of the second another base station device).

[5.3.2 Reception Level]

As information whose value is influenced by the positional relationship between the own base station device and another base station device, the magnitude of a reception level of a transmission signal (downlink signal) transmitted by the another base station device may be used. The longer the distance from the another base station device to the reception position is, the lower the reception level of the transmission signal transmitted by the another base station device is. The shorter the distance is, the higher the reception level is. The magnitude of the reception level may be measured by the own base station device, or the terminal device 2 may be caused to measure the reception level and notify the own base station device of the measured reception level value, or alternatively, both of these manners may be combined.

Examples of signal channels that can be used for measuring the reception level may include: a Primary Synchronization Signal (PSS) and a Secondary Synchronization Signal (SSS), a BCH (Broadcast Channel), a control channel (such as PDCCH, PCFICH, or PHICH), and a reference signal.

[5.3.3 Path-Loss Value (Attenuation Value)]

As information whose value is influenced by the positional relationship between an own base station device and another base station device, a path-loss value may be used. The path-loss value is an attenuation value in a transmission path from the another base station device to the own base station device. Although the path-loss value has approximately the same meaning as the reception level of the transmission signal transmitted by the another base station device, the path-loss value is preferable to the reception level because it reflects, more accurately, whether the distance is long or short.

[5.3.4 Result of Detection of Another Base Station Device (Number of Times of Detection, or Detection Rate)]

As information whose value is influenced by the positional relationship between the own base station device and another base station device, the detection rate of the another base station device or the number of times of detection may be used. Detection of another base station device can be achieved by detecting a radio wave (downlink signal) from the another base station device. The shorter the distance between the own base station device and the another base station device is, the larger the detection rate or the number of times of detection is.

Although detection of another base station device may be performed by the own base station device alone, the terminal device 2 may be caused to perform detection of another base station device and notify the own base station device of the result of the detection.

For example the terminal device 2 performs measurement/detection of a downlink signal from another base station device to obtain a cell ID of the base station device (an identifier of the base station device) that has transmitted the downlink signal. A cell ID(s) of one or a plurality of other base station devices obtained by the terminal device 2 is transmitted as measurement result information to the own base station device. The own base station device is configured to count the number of times another base station device 1 has been detected within a predetermined time period, and obtain the number of times of detection and the detection rate as measurement result information. The detection rate is calculated as a ratio of the number of times a certain base station device has been detected, to the number of times the terminal device 2 has measured downlink signals.

That is, the number of times of cell detection and the detection rate configure information relating to the detection result obtained when the downlink signal from the another base station device is detected.

The larger the number of times of detection is, the higher the possibility that the another base station device corresponding to the number of times of detection is located in a position near the own base station device. That is, the number of times of detection of another base station device configures information whose value is influenced by the positional relationship between the own base station device and the another base station device.

Like the number of times of detection, the larger the detection rate is, the higher the possibility that the another base station device corresponding to the detection rate is located near the own base station device.

6. Third Embodiment; Use of Information Indicating Whether Interference can Occur In the second embodiment, information relating to the positional relationship is used as information indirectly indicating the interference suppression effect. In this third embodiment, however, information indicating whether interference can occur is used.

[6.1 Communication Frequency of Another Base Station Device]

Figure 40:
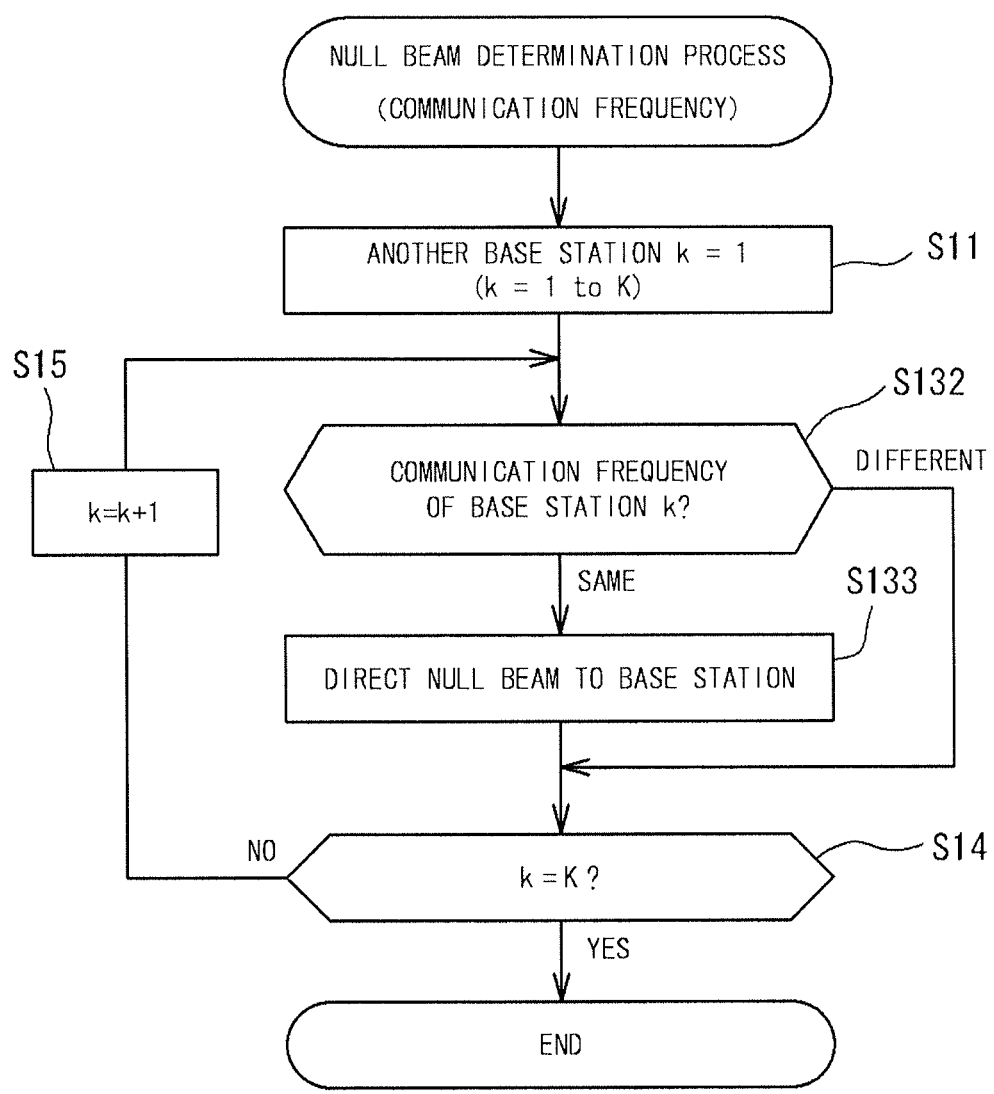
FIG. 40 is a flowchart showing a null beam determination process using a communication frequency.

FIG. 40 shows the null beam determination process (step S2 in FIG. 20) in a case where information indicating the communication frequency of another base station device is used as information indicating whether interference can occur.

Since no interference occurs when the own base station device and the another base station device use different communication frequencies, the communication frequency can be used as information indicating whether interference can occur.

In step S132 in FIG. 40, the communication frequency (downlink frequency) of the another base station device is compared with the communication frequency (downlink frequency) of the own base station device. When the frequencies match, the another base station device is selected as a base station device to which a null beam should be directed. On the other hand, when the frequencies do not match, the another base station device is excluded from base station devices to which null beams should be directed.

Note that the communication frequency of the another base station device is obtained from a server such as the MME 203 on the inter-base-station network, or from the another base station device.

[6.2 Power ON/OFF of Another Base Station Device]

Figure 41:
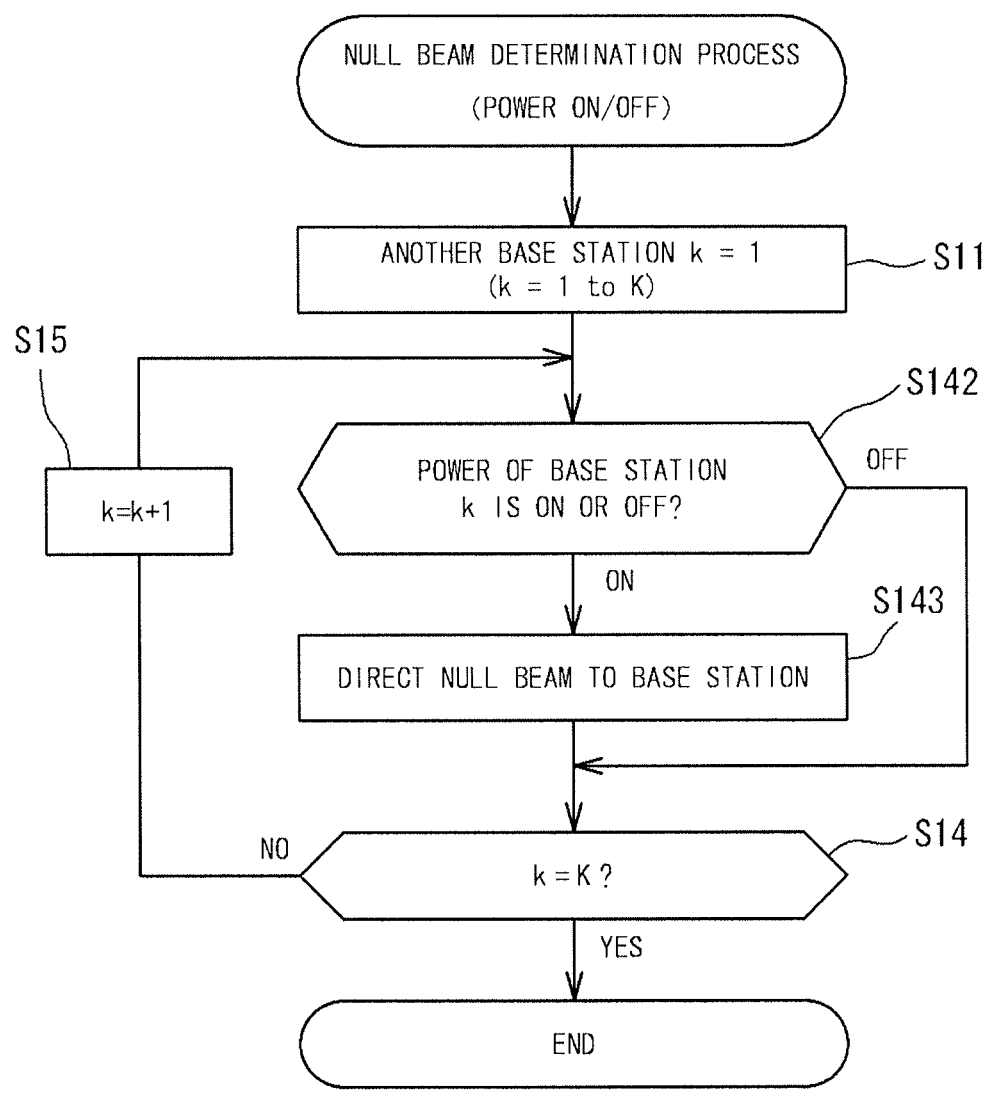
FIG. 41 is a flowchart showing a null beam determination process using power ON/OFF.

FIG. 41 shows the null beam determination process (step S2 in FIG. 20) in a case where information indicating the power ON/OFF state, i.e., whether the power of another base station device is ON or OFF, is used as information indicating whether interference can occur.

When the power of the another base station device is OFF, no interference occurs essentially. Therefore, the information indicating the power ON/OFF state can be used as information indicating whether interference can occur.

In step S142 in FIG. 41, the information indicating the power ON/OFF state of the another base station device is obtained, and when the power of the another base station device is ON, the another base station device is selected as a base station device to which a null beam should be directed. On the other hand, when the power of the another base station device is OFF, the another base station device is excluded from base station devices to which null beams should be directed.

Note that the information indicating the power ON/OFF state of the another base station device is obtained from a server such as the MME 203 on the inter-base-station network, or from the another base station device.

[6.3 Radio Access Technology (Rat) of Another Base Station Device]

Figure 42:
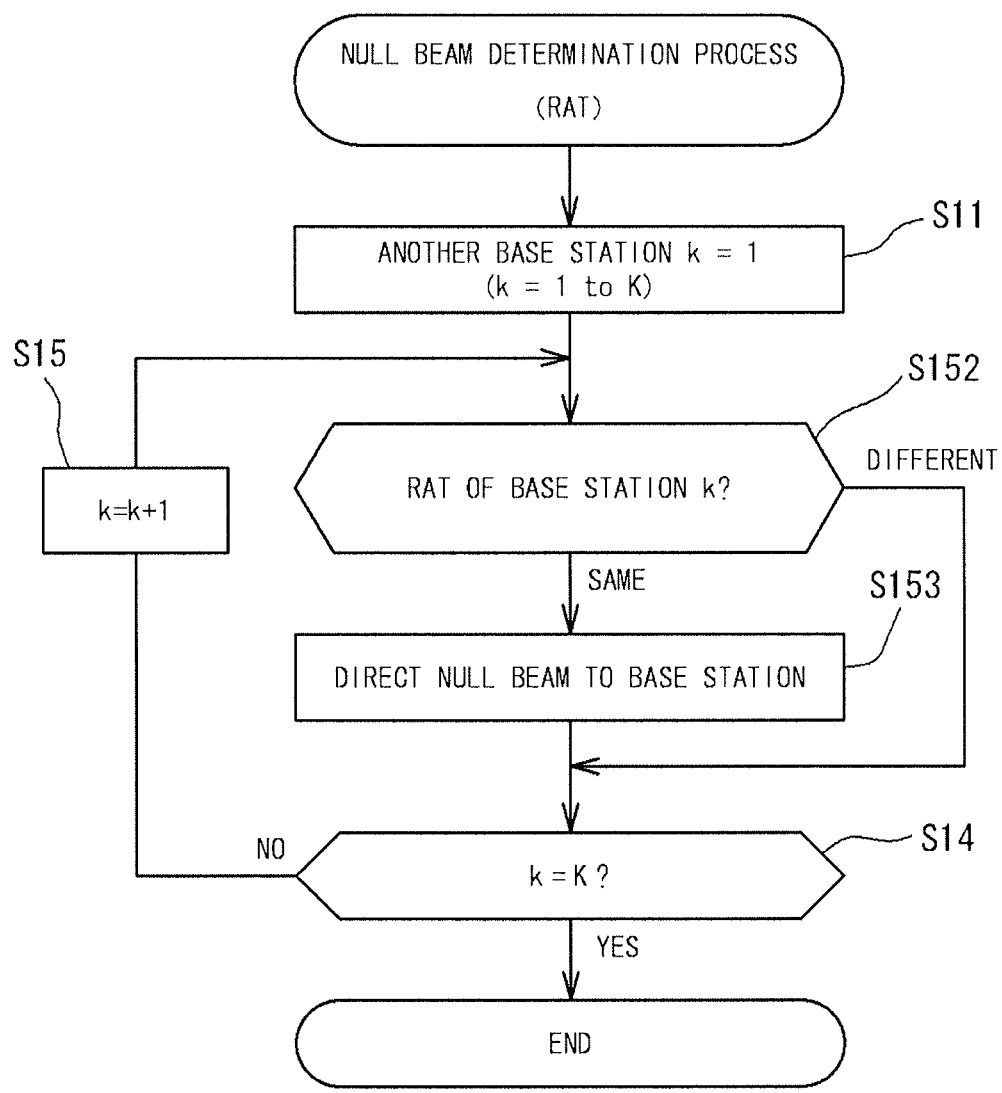
FIG. 42 is a flowchart showing a null beam determination process using a radio access technology.

FIG. 42 shows the null beam determination process (step S2 in FIG. 20) in a case where information indicating the type of a radio access technology (RAT) of another base station device is used as information indicating whether interference can occur.

When the own base station device adopts LTE, and then if the another base station device adopts another radio access technology such as W-CDMA, interference may not occur. Accordingly, information indicating the type of the radio access technology (RAT) is used as information indicating whether interference can occur.

In step S152 in FIG. 42, information indicating the type of the radio access technology of the another base station device is obtained, and when the radio access technology of the another base station device is the same as that of the own base station device, the another base station device is selected as a base station device to which a null beam should be directed. On the other hand, when the radio access technology of the another base station device is different from that of the own base station device, the another base station device is excluded from base station devices to which null beams should be directed.

The information indicating the type of the radio access technology of the another base station device is obtained from a server such as the MME 203 on the inter-base-station network, or from the another base station device.

7. Fourth Embodiment; Presence/Absence of Another Interference Suppression Means In the chapter [3.3.4 Weight calculation (step S4)], it is described that formation of a null beam may be limited to a radio resource allocated to an interference terminal. This is based on the premise that interference occurs when a radio resource (resource block) used by an interference terminal (a terminal device connected to the another base station device) is used for the downlink signal of the own base station device.

On the contrary, in this fourth embodiment, when interference avoidance (interference suppression) is performed so that the radio resource used by the terminal device connected to the another base station device is not used for the downlink signal of the own base station device, interference suppression by a null beam is not necessary, and therefore, a null beam is not directed to the another base station device.

That is, information indicating presence/absence of interference suppression means other than directing a null beam to the another base station device is information indirectly indicating the interference suppression effect by a null beam.

Figure 43:
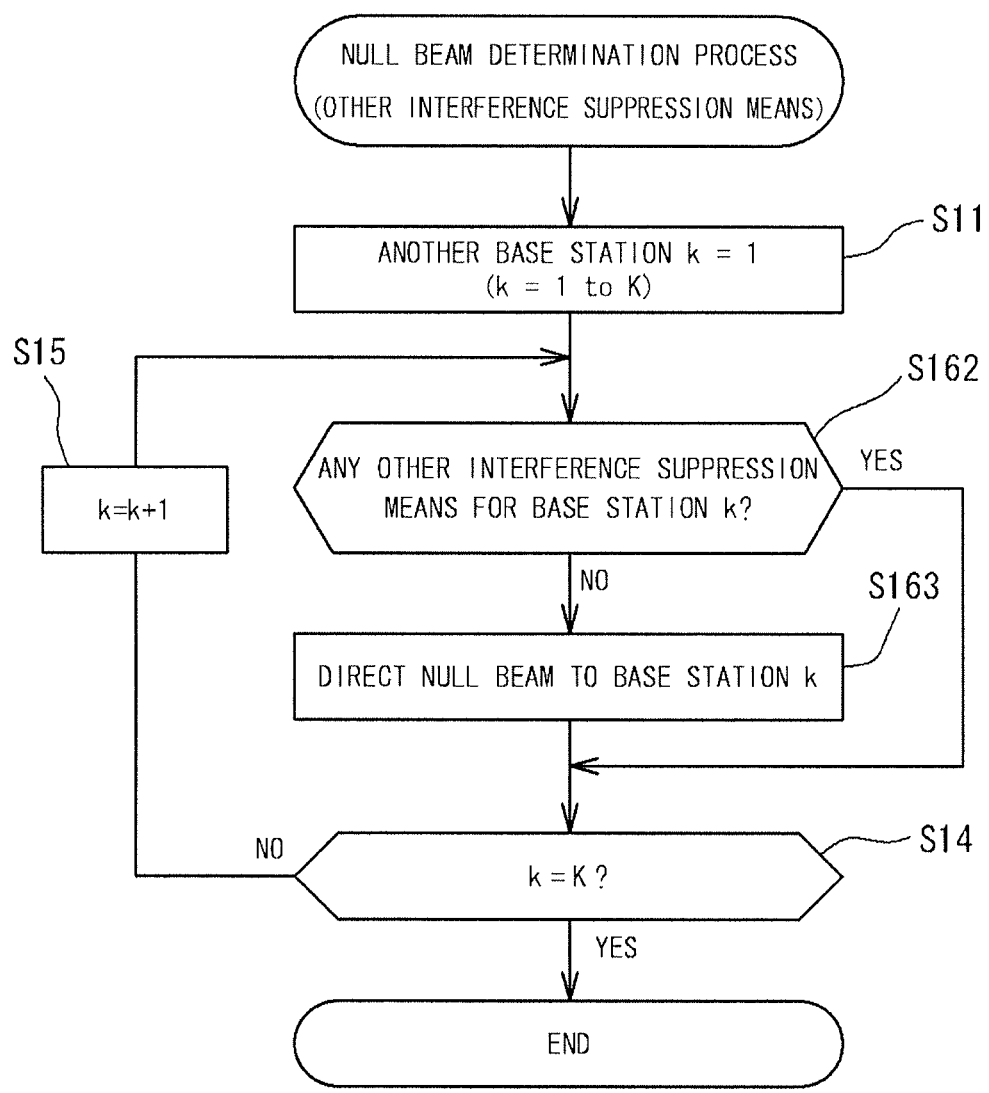
FIG. 43 is a flowchart showing a null beam determination process using presence/absence of another interference suppression means.

FIG. 43 shows the null beam determination process (step S2 in FIG. 20) using information indicating presence/absence of interference suppression means other than directing a null beam to the another base station device.

In step S162 in FIG. 43, it is checked whether another interference suppression means is performed (or can be performed) in the own base station device or the another base station device. When another interference suppression means is performed (or can be performed), the another base station device is excluded from base station devices to which null beams should be directed. When another interference suppression means is not performed, the another base station device is selected as a base station device to which a null beam should be directed.

Examples of the other interference suppression means include: means for selectively using a radio resource (time and/or frequency); and means for reducing the transmission power for overlapping radio resources.

In order to obtain information indicating that another interference suppression means is performed, information indicating whether another interference suppression means as described above is executed in the own base station device or the another base station device is obtained from the own base station device, or the another base station device, or a server such as the MME 203 on the inter-base-station network.

Examples of information indicating whether another interference suppression means can be performed include: information indicating whether synchronization of communication timing and/or communication frequency is achieved between the own base station device and the another base station device; and information indicating whether an inter-base-station network is provided between the own base station device and the another base station device. These pieces of information can be obtained from the own base station device, or the another base station device, or a server such as the MME 203 on the inter-base-station network.

When synchronization of communication timing and/or communication frequency is achieved between the own base station device and the another base station device, selective use of a radio resource (resource block) can be realized between the own base station device and the another base station device. Therefore, information indicating whether synchronization is achieved is information indicating whether another interference suppression means is used.

When an inter-base-station network is provided between the own base station device and the another base station device, these base station devices are allowed to achieve synchronization, and share information indicating radio resources used by the base station devices. Accordingly, information indicating whether an inter-base-station network is provided between the own base station device and the another base station device is information indicating whether another interference suppression means is executed.

8. Fifth Embodiment; Use of Access Mode

In this fifth embodiment, information indicating the access mode of the own base station device is used as information indirectly indicating the interference suppression effect.

The access mode is a mode by which a base station device defines a limitation of wireless access of terminal devices to the base station device. There are three types of access modes, an open access mode, a closed access mode, and a hybrid access mode. The base station device is set to any of these three types of access modes.

The open access mode is a mode in which all terminal devices are allowed to access. Since a macro BS installed by a telecommunications carrier or the like is highly public, it is usually set to the open access mode.

The closed access mode is a mode in which only terminal devices registered in a base station device 1 set in this mode are allowed to access.

The hybrid mode is a mode in which all terminal devices are fundamentally allowed to access, but a registered terminal device may be treated preferentially over an unregistered terminal device and the unregistered terminal device may not be connected.

A femto BS is set to any one of the above-mentioned three modes.

A femto BS is installed by an individual or a company in its own building or a specific space, and the individual or the company that installs the femto BS may desire to limit terminal devices to access to the femto BS to specific terminal devices. In this case, the femto BS is configured to be able to select and set any one of the above-mentioned three modes in accordance with the situation.

When the own base station device, which is a femto BS, is set in the closed access mode, and then if an unregistered terminal device exists very near the own base station device, the terminal device cannot access the own base station device. In this case, interference given to the terminal device is likely to be increased. Conversely, when the own base station device is set in the open or hybrid access mode, and then if a terminal device approaches the own base station device, the terminal device performs handover and access the own base station device. In this case, it is considered that interference to the terminal device is less likely to occur. That is, the interference suppression effect by a null beam is likely to occur when the own base station device is closed. However, when the own base station device is open or hybrid, interference is not likely to occur essentially, and therefore, the interference suppression effect is also not likely to occur.

Figure 44:
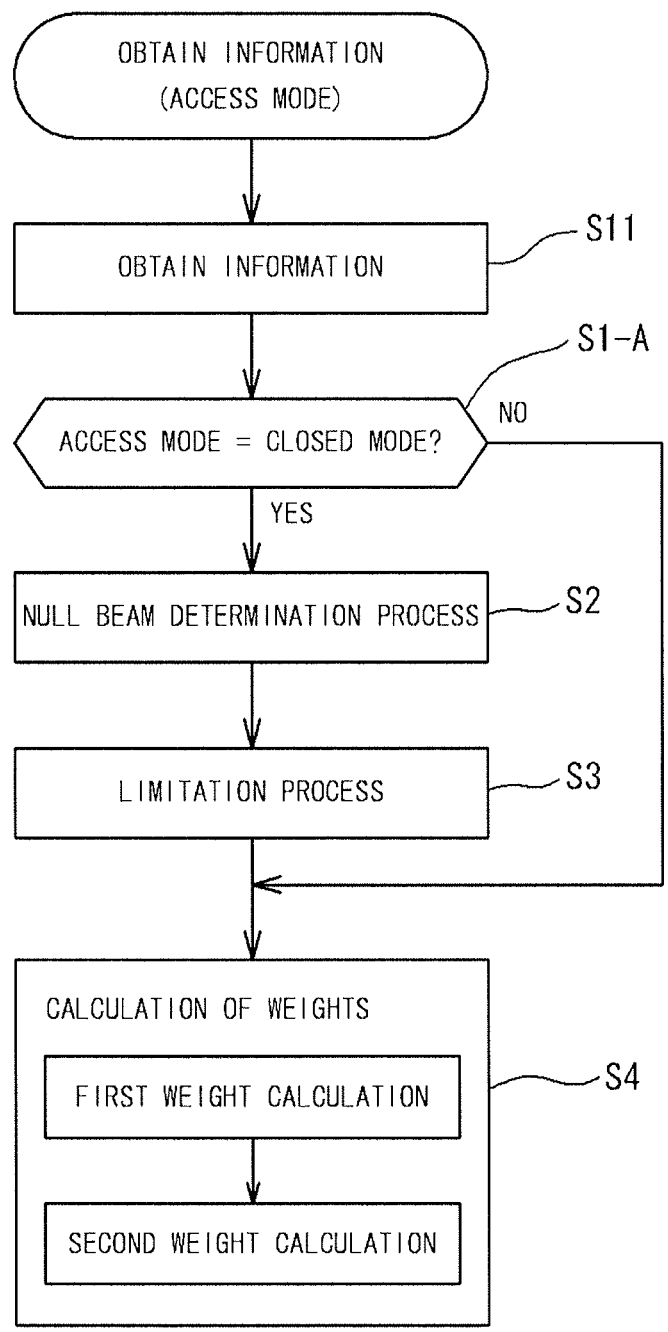
FIG. 44 is a flowchart showing a beam forming process using an access mode.

So, in the fifth embodiment, a beam forming process is performed by using information indicating the access mode set on the own base station device. Specifically, as shown in FIG. 44, in advance of the null beam determination process (step S2) shown in FIG. 20, a process of determining whether the access mode of the own base station device is the closed access mode (step S1-A) is executed. When the access mode is the closed access mode, the null beam determination process in step S2 is performed. On the other hand, when the access mode is not the closed access mode, weight calculation (step S4) is performed so as to perform beam forming including no null beam.

9. Sixth Embodiment; Use of Information Relating to Number of Terminals

The sixth embodiment adopts, as information indirectly indicating the interference suppression effect, information indicating the number of terminal devices wirelessly connected to another base station device, or information whose value is influenced by the number of terminal devices wirelessly connected to the another base station device.

In the sixth embodiment, the number of terminal devices connected to the another base station device can be obtained by calculating an average value of reception levels per resource block, from a downlink signal of the another base station device 1, which is received by the downlink signal reception unit 12. That is, the beam forming processing unit 5a determines, based on the reception level per resource block, whether a resource for a terminal device is allocated to each resource block, thereby grasping the state of resource allocation in the downlink signal. It is possible to estimate the number of terminal devices connected to the another base station device, based on the state of resource allocation in the downlink signal.

The larger the number of terminal devices 2 connected to the another base station device is, the higher the possibility of giving interference to the terminal devices 2 is. Therefore, the interference suppression effect by directing a null beam to the another base station device can be expected.

Figure 45:
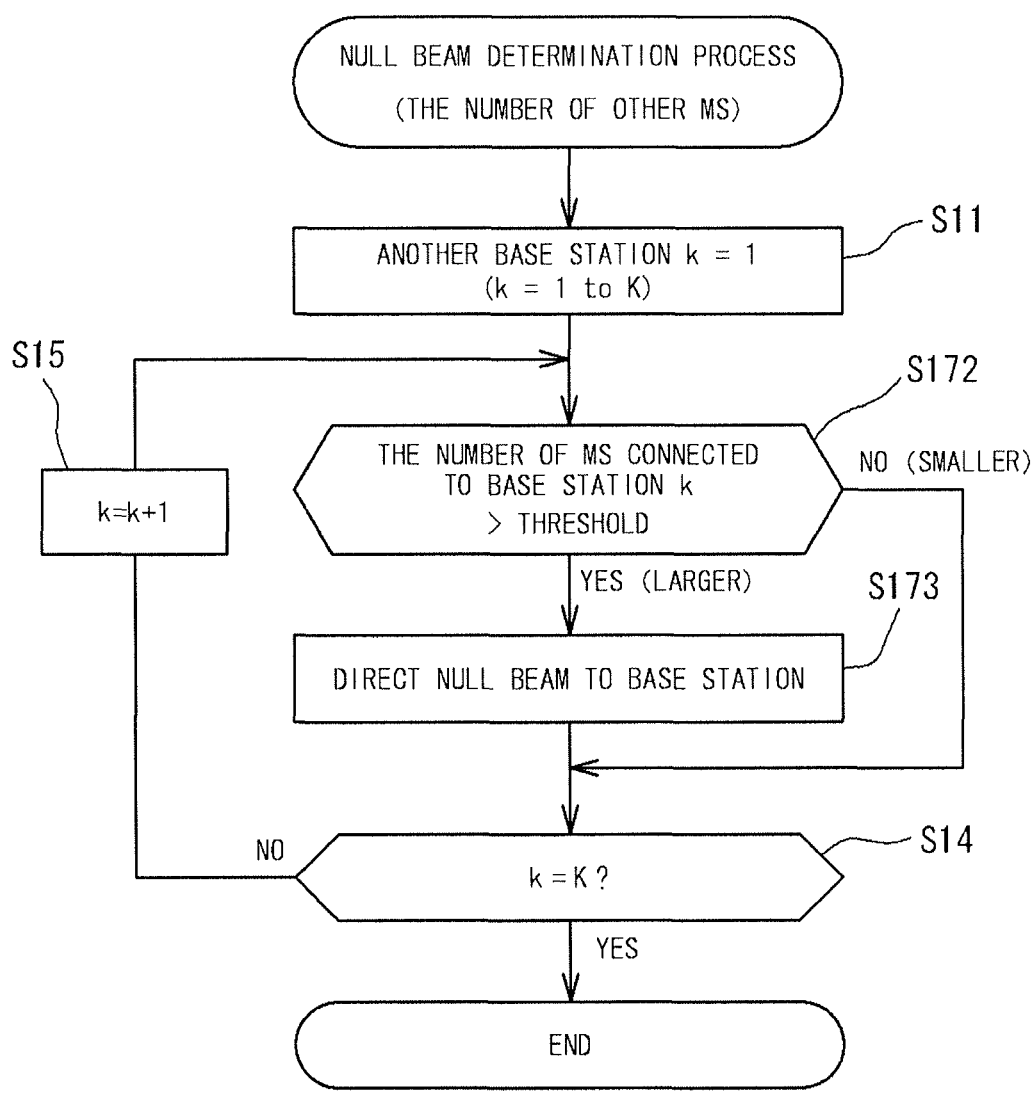
FIG. 45 is a flowchart showing a null beam determination process using the number of terminal devices connected to another base station device.

So, in the sixth embodiment, as shown in FIG. 45, the estimated number of terminal devices (MS) connected to the another base station device is compared with a threshold (step S172). When the number of terminal devices connected to the another base station device is larger than the threshold, the base station device is selected as a base station device to which a null beam should be directed.

On the other hand, when the number of terminal devices connected to the another base station device is equal to or smaller than the threshold, the base station device is excluded from base station devices to which null beams should be directed.

As information whose value is influenced by the number of terminal devices wirelessly connected to the another base station device, the above-mentioned handover success rate may be used. When the number of terminal devices wirelessly connected to the another base station device is large, handover to the another base station device might be refused by the another base station device, leading to a reduction in the handover success rate. That is, the lower the handover success rate is, the larger the number of terminal devices wirelessly connected to the another base station device is.

10. Seventh Embodiment; the Number of Terminals Near the Own Base Station Device The seventh embodiment adopts, as information indirectly indicating the interference suppression effect, information indicating presence of a terminal device wirelessly connected to another base station device, which terminal device is located near the own base station device that is a femto BS.

When a terminal device wirelessly connected to another base station device is located near the own base station device, interference to the terminal device is likely to occur. Therefore, the interference suppression effect can be easily achieved by directing a null beam to the another base station device.

Figure 46:
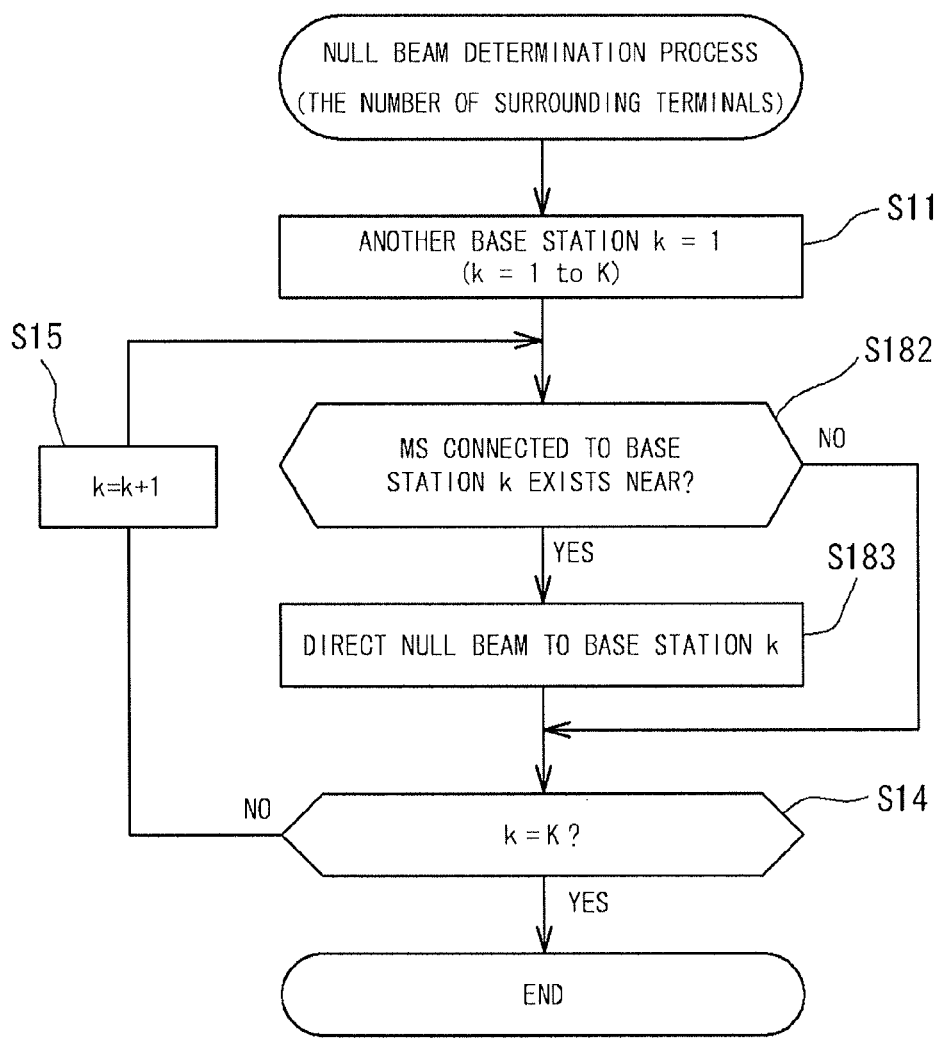
FIG. 46 is a flowchart showing a null beam determination process using the number of terminal devices located in the vicinity of a base station device.

So, in the seventh embodiment, as shown in FIG. 46, it is determined whether a terminal device (MS) connected to another base station device exists near the own base station device (step S182). When a terminal device (MS) connected to another base station device exists near the own base station device, the another base station device is selected as a base station device to which a null beam should be directed.

On the other hand, when a terminal device (MS) connected to another base station device does not exist near the own base station device, the another base station device is excluded from base station devices to which null beams should be directed.

Presence of a terminal device (the number of terminal devices) which is connected to another base station device and is located near the own base station device can be detected as follows.

Figure 47:
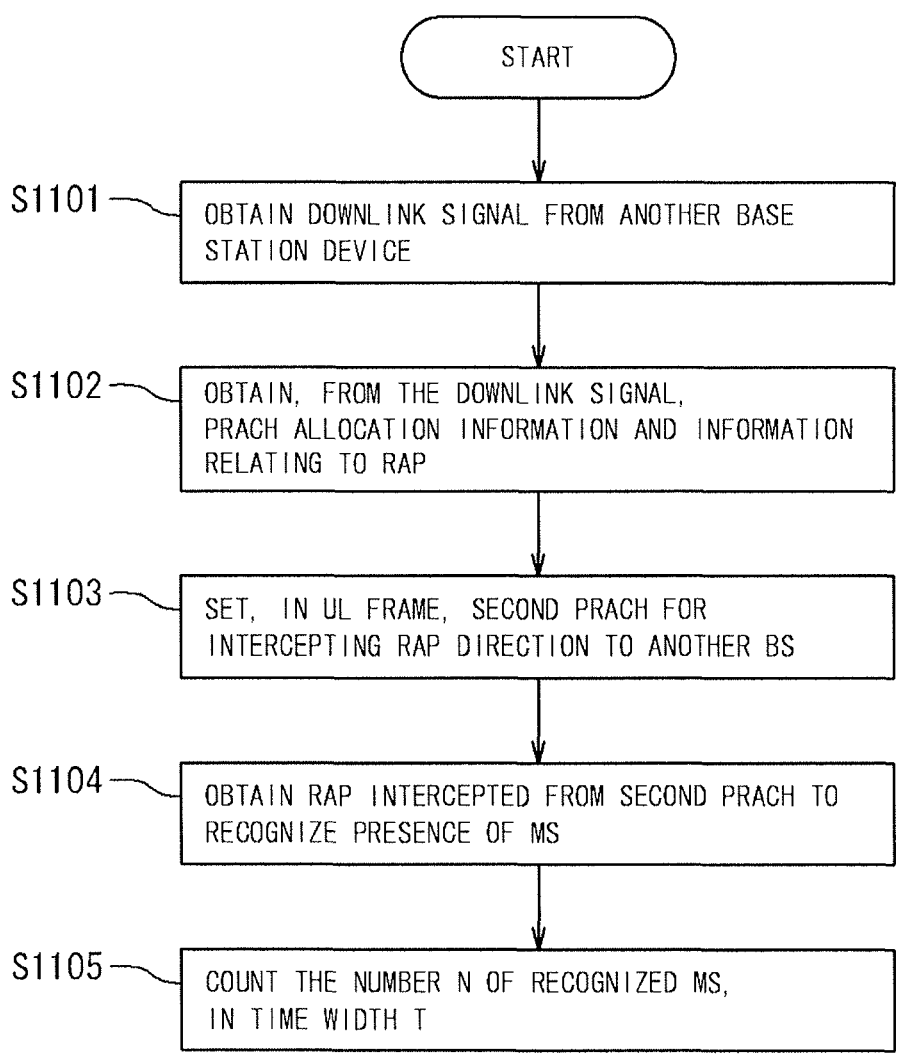
FIG. 47 is a flowchart showing a process of detecting the number of terminals located in the vicinity of a base station device.

As shown in FIG. 47, the own base station device as a femto BS firstly obtains a downlink reception signal from the another base station device (step S1101). The own base station device obtains, from the system information of the another base station device included in the downlink reception signal, control information required for transmitting a RAP (Random Access Preamble) from the own base station device to the another base station device, such as allocation information of PRACH (Physical Random Access Channel) in the another base station device, and information relating to the format of the RAP (step S1102).

Next, based on the PRACH allocation information obtained in step S1102, the own base station device sets, in an UL (Up Link) frame of the own base station device, a first PRACH for receiving a RAP of a terminal device that tries to access the own base station device, and a second PRACH for intercepting a RAP of a terminal device that tries to access the another base station device (step S103).

FIG. 48 is a diagram showing an example of a case where the first PRACH and the second PRACH are set on the UL frame. In FIG. 48, each of the PRACHs is set within a range of a band width corresponding to 72 subcarriers in the frequency axis direction, and a range of one sub-frame width in the time axis direction.

Setting the first and second PRACHs as described above allows the femto BS1*b* to receive the RAP transmitted by the terminal device that tries to access the own base station device, and to reliably intercept the RAP transmitted by the terminal device that tries to access the another base station device.

Referring back to FIG. 47, after setting the second PRACH in step S1103, when the own base station device intercepts the RAP transmitted by using the second PRACH, the own base station device as a femto BS obtains, from the received uplink reception signal, the RAP of the terminal device that tries to access the another base station device, and recognizes that the terminal device (the terminal device connected to the another base station device) exists in the range where the RAP reaches the own base station device (step S1104). At this time, by using the information relating to the format of the RAP obtained in step S1102, the own base station device can obtain the RAP transmitted from the terminal device to the another base station device.

Next, the own base station device counts the number N of the recognized terminal devices in a range of time width T from the present time back to the past by time T (step S1105), and obtains the number N of terminal devices, which is a result of the count, as information indicating the presence of terminal devices (terminal devices connected to the another base station device) located near the own base station device. That is, the number N of terminal devices corresponds to a value obtained by counting the terminal devices located in the range in which the RAP reaches the own base station device, as those being located near the own base station device.

Note that the embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

DESCRIPTION OF THE REFERENCE CHARACTERS

1 base station device
2 terminal device
3 antenna
4 transmission/reception circuit
5 signal processing unit
5*a* beam forming processing unit
5*b* synchronization processing unit
11 uplink signal reception unit
12 downlink signal reception unit
13 transmission unit

The invention claimed is:

1. A base station device that performs communication by frequency division duplex, comprising:
   a downlink signal reception unit that receives a downlink signal transmitted from another base station device; and
   a beam forming processing unit that performs a beam forming process for directing a null beam to an arrival direction of the downlink signal from the another base station device, by using transmission path information between the base station device and the another base station device, the information being available from the received downlink signal, wherein
   the beam forming processing unit obtains, from the another base station device, determination information for determining whether there is a terminal device wirelessly connected to the another base station device, and determines whether a null beam should be directed to the another base station device, based on the determination information.

2. The base station device according to claim 1 further comprising:
   an obtainment unit for obtaining information from the another base station device via a backhaul line connecting the base station device and the another base station device.

3. The base station device according to claim 1 further comprising:
   an obtainment unit for obtaining information included in wireless broadcast information transmitted by the another base station device.

4. The base station device according to claim 1, wherein
   the beam forming processing unit determines the number of formable null beams within the range of the total number of antennas of the base station device, and forms beams to terminal devices wirelessly connected to the base station device, within a restriction on the beam forming by null-beam forming.

5. The base station device according to claim 1, wherein
   the beam forming processing unit determines the number of terminal devices wirelessly connected to the base station device within the range of the total number of antennas of the base station device, and forms null beams within a restriction on the null-beam forming by beam forming to the terminal devices.

6. The base station device according to claim 1, wherein the downlink signal reception unit receives the downlink signal from the another base station device, at a timing when transmission of a downlink signal from the base station device is suspended.

7. A base station device that performs communication by frequency division duplex, comprising:
a downlink signal reception unit that receives a downlink signal transmitted from another base station device; and
a beam forming processing unit that performs a beam forming process for directing a null beam to an arrival direction of the downlink signal from the another base station device, by using transmission path information between the base station device and the another base station device, the information being available from the received downlink signal, wherein
the beam forming processing unit obtains, from the another base station device, determination information that allows the beam forming processing unit to determine the degree of effect of suppressing interference to a terminal device wirelessly connected to the another base station device, the effect being obtained when a null beam is directed to the arrival direction of the downlink signal from the another base station device, and determines whether a null beam should be directed to the another base station device, based on the determination information.

8. The base station device according to claim 7, wherein the beam forming processing unit selects another base station device to which a null beam should be actually directed, based on the determination information, when the number of other base station devices to which null beams should be directed exceeds the number of formable null beams.

9. The base station device according to claim 7, wherein the determination information is information indicating a distance between the another base station device and a terminal device wirelessly connected to the another base station device.

10. The base station device according claim 7, wherein the determination information is information indicating a signal reception condition in a terminal device wirelessly connected to the another base station device.

11. The base station device according to claim 7, wherein the determination information is information indicating a signal reception condition in a terminal device wirelessly connected to the another base station device, and the signal reception condition includes a first reception condition when a null beam is directed to the another base station device, and a second reception condition when no null beam is directed to the another base station device.

12. The base station device according to claim 7, wherein the determination information is information indicating a distance between the base station device and the another base station device, or information indicating the degree of signal attenuation in a transmission path between the base station device and the another base station device, or information indicating a reception signal power when the base station device receives at least one of the downlink signal from the another base station device and a transmission signal power of the downlink signal from the another base station device.

13. The base station device according to claim 7, wherein the determination information directly or indirectly indicates the interference suppression effect to a terminal device that is wirelessly connected to the another base station device when a null beam is directed to the arrival direction of the downlink signal from the another base station device.

14. The base station device according to claim 13, wherein the information that indirectly indicates the interference suppression effect is information indicating a positional relationship between the base station device and the another base station device, or information whose value is influenced by the positional relationship between the base station device and the another base station device.

15. The base station device according to claim 14, wherein the information that indirectly indicates the interference suppression effect is information indicating a positional relationship between the base station device and the another base station device, or information whose value is influenced by the positional relationship between the base station device and the another base station device, and
the beam forming processing unit performs the determination based on the information indicating the positional relationship between the base station device and the another base station device or the information whose value is influenced by the positional relationship between the base station device and the another base station device, thereby determining whether the base station device and the another base station device are in a first positional relationship or in a second positional relationship,
the first positional relationship being a positional relationship in which the base station device is close to the another base station device to an extent that interference suppression is necessary, and the base station device is separated from the another base station device to an extent that the interference suppression effect to the terminal device wirelessly connected to the another base station device can be obtained by directing a null beam to the arrival direction of the downlink signal from the another base station device, and
the second positional relationship being a positional relationship in which the base station device is close to the another base station device to an extent that interference suppression is necessary, and the base station device is so close to the another base station device that the interference suppression effect to the terminal device wirelessly connected to the another base station device cannot be obtained even when a null beam is directed to the arrival direction of the downlink signal from the another base station device.

16. The base station device according to claim 13, wherein the information that indirectly indicates the interference suppression effect is information indicating a positional relationship between the base station device and the another base station device, or information whose value is influenced by the positional relationship between the base station device and the another base station device, and
the beam forming processing unit performs the determination based on the information indicating the positional relationship between the base station device and the another base station device or the information whose value is influenced by the positional relationship between the base station device and the another base station device, and excludes the another base station device from base station devices to which null beams should be directed, when the base station device is so close to the another base station device that the interference suppression effect to the terminal device wirelessly connected to the another base station device cannot be achieved even when a null beam is directed to the arrival direction of the downlink signal from the another base station device.

17. The base station device according to claim 13, wherein the information that indirectly indicates the interference suppression effect is information indicating a positional relationship between the base station device and the another base station device, or information whose value is influenced by the positional relationship between the base station device and the another base station device, and the beam forming processing unit performs the determination based on the information indicating the positional relationship between the base station device and the another base station device or the information whose value is influenced by the positional relationship between the base station device and the another base station device, and excludes the another base station device from base station devices to which null beams should be directed, when the base station device and the another base station device are separated from each other to an extent that no interference occurs.

18. The base station device according to claim 13, which is a small base station device having a transmission signal power smaller than that of a macro base station device, wherein the information that indirectly indicates the interference suppression effect is information indicating a positional relationship between the base station device and the another base station device, or information whose value is influenced by the positional relationship between the base station device and the another base station device, and the beam forming processing unit determines whether the another base station device is a macro base station device or a small base station device, and performs determination of interference suppression effect, based on the information indicating the positional relationship between the base station device and the another base station device, or the information whose value is influenced by the positional relationship between the base station device and the another base station device, and then performs the beam forming process based on the results of the both determinations.

19. The base station device according to claim 13, wherein the information that indirectly indicates the interference suppression effect is information indicating whether interference can occur, and is information allowing determination as to whether interference can occur.

20. The base station device according to claim 19, wherein the information indicating whether interference can occur is information indicating a communication frequency of the another base station device, or information indicating a power ON/OFF state of the another base station device, or information indicating the type of a radio access technology of the another base station device.

21. The base station device according to claim 13, wherein the information that indirectly indicates the interference suppression effect is information indicating whether or not interference suppression means other than directing a null beam to the arrival direction of the downlink signal from the another base station device is executed or can be executed.

22. The base station device according to claim 13, wherein the information that indirectly indicates the interference suppression effect is information indicating the number of terminal devices wirelessly connected to the another base station device, or information whose value is influenced by the number of terminal devices wirelessly connected to the another base station device.

23. The base station device according to claim 13, wherein the information that indirectly indicates the interference suppression effect is information indicating presence of a terminal device that is located near the base station device among terminal devices wirelessly connected to the another base station device.

24. The base station device according to claim 7, wherein the beam forming processing unit adjusts the intensity of a null beam to be directed to the another base station device, based on the determination information.

25. The based station device according to claim 7 comprising:
an obtainment unit for obtaining information from the another base station device via a backhaul line connecting the base station device and another base station device.

26. The base station device according to claim 7 further comprising:
an obtainment unit for obtaining information included in wireless broadcast information transmitted by the another base station device.

27. The base station device according to claim 7, wherein the beam forming processing unit determines the number of formable null beams within the range of the total number of antennas of the base station device, and forms beams to terminal devices wirelessly connected to the base station device, within a restriction on the beam forming by null-beam forming.

28. The base station device according to claim 7, wherein the beam forming processing unit determines the number of terminal devices wirelessly connected to the base station device within the range of the total number of antennas of the base station device, and forms null beams within a restriction on the null-beam forming by beam forming to the terminal devices.

29. The base station device according to claim 7, wherein the downlink signal reception unit receives the downlink signal from the another base station device, at a timing when transmission of a downlink signal from the base station device is suspended.

30. A base station device that performs communication by frequency division duplex, comprising:
a downlink signal reception unit that receives a downlink signal transmitted from another base station device; and
a beam forming processing unit that performs a beam forming process for directing a null beam to an arrival direction of the downlink signal from the another base station device, by using transmission path information between the base station device and the another base station device, the information being available from the received downlink signal, wherein
the beam forming processing unit obtains, from the another base station device, radio resource allocation information indicating at least one of a time and a frequency allocated to a terminal device by the another base station device, and performs a beam forming process such that a null beam is directed toward the another base station device in at least one of the time and at the frequency indicated by the radio resource allocation information.

31. The base station device according to claim 30 further comprising:
an obtainment unit for obtaining information from the another base station device via a backhaul line connecting the base station device and the another base station device.

32. The base station device according to claim 30 further comprising:
an obtainment unit for obtaining information included in wireless broadcast information transmitted by the another base station device.

33. The base station device according to claim 30, wherein the beam forming processing unit determines the number of formable null beams within the range of the total number of antennas of the base station device, and forms beams to terminal devices wirelessly connected to the base station device, within a restriction on the beam forming by null-beam forming.

34. The base station device according to claim 30, wherein the beam forming processing unit determines the number of terminal devices wirelessly connected to the base station device within the range of the total number of antennas of the base station device, and forms null beams within a restriction on the null-beam forming by beam forming to the terminal devices.

35. The base station device according to claim 30, wherein the downlink signal reception unit receives the downlink signal from the another base station device at a timing when transmission of a downlink signal from the base station device is suspended.

\* \* \* \* \*